(12) United States Patent
Meyer et al.

(10) Patent No.: US 7,640,451 B2
(45) Date of Patent: *Dec. 29, 2009

(54) FAILOVER PROCESSING IN A STORAGE SYSTEM

(75) Inventors: Richard Meyer, San Francisco, CA (US); Kumar Gajjar, San Jose, CA (US); Chan Ng, San Jose, CA (US); Andre Gusev, Fremont, CA (US)

(73) Assignee: NetApp, Inc., Sunnyvale, CA (US)

( * ) Notice: Subject to any disclaimer, the term of this patent is extended or adjusted under 35 U.S.C. 154(b) by 741 days.

This patent is subject to a terminal disclaimer.

(21) Appl. No.: 11/325,578

(22) Filed: Jan. 3, 2006

(65) Prior Publication Data

US 2006/0117212 A1    Jun. 1, 2006

Related U.S. Application Data

(63) Continuation of application No. 10/076,906, filed on Feb. 13, 2002, now Pat. No. 7,039,827.

(51) Int. Cl.
*G06F 11/00* (2006.01)

(52) U.S. Cl. ............................................. 714/4; 714/43

(58) Field of Classification Search ...................... 714/4, 714/43, 5–7, 8, 13, 42
See application file for complete search history.

(56) References Cited

U.S. PATENT DOCUMENTS

| | | | |
|---|---|---|---|
| 5,704,032 A | 12/1997 | Badovinatz et al. | |
| 5,996,086 A | 11/1999 | Delaney et al. | |
| 6,104,871 A | 8/2000 | Badovinatz et al. | |
| 6,185,695 B1 | 2/2001 | Murphy et al. | |
| 6,247,077 B1 | 6/2001 | Muller et al. | |
| 6,571,354 B1 | 5/2003 | Parks et al. | |
| 6,598,174 B1 | 7/2003 | Parks et al. | |
| 6,609,213 B1* | 8/2003 | Nguyen et al. | 714/4 |
| 6,625,747 B1 | 9/2003 | Tawil et al. | |
| 6,629,264 B1 | 9/2003 | Sicola et al. | |
| 6,658,590 B1 | 12/2003 | Sicola et al. | |
| 6,691,244 B1 | 2/2004 | Kampe et al. | |
| 6,769,071 B1 | 7/2004 | Cheng et al. | |
| 6,775,230 B1 | 8/2004 | Watanabe et al. | |
| 6,871,296 B2 | 3/2005 | Kashyap | |
| 7,039,827 B2* | 5/2006 | Meyer et al. | 714/4 |
| 2002/0007468 A1 | 1/2002 | Kampe et al. | |

(Continued)

OTHER PUBLICATIONS

M. Pease et al., "Reaching Agreement in the Presence of Faults", Journal of the Association for Computing Machinery, vol. 27, No. 2, Apr. 1980, (Abstract) 1pg.

(Continued)

*Primary Examiner*—Dieu-Minh Le
(74) *Attorney, Agent, or Firm*—Wiesner and Associates; Leland Wiesner

(57) ABSTRACT

Failover processing in storage server system utilizes policies for managing fault tolerance (FT) and high availability (HA) configurations. The approach encapsulates the knowledge of failover recovery between components within a storage server and between storage server systems. This knowledge includes information about what components are participating in a Failover Set, how they are configured for failover, what is the Fail-Stop policy, and what are the steps to perform when "failing-over" a component.

29 Claims, 37 Drawing Sheets

Creating a Failover Set

U.S. PATENT DOCUMENTS

2002/0188711 A1  12/2002  Meyer et al.

OTHER PUBLICATIONS

Leslie Lamport et al., "The Byzantine Generals Problem", ACM Transactions on Programming Languages and Systems, vol. 4, No. 3, Jul. 1982, (Abstract) 1pg.

Fred B. Schneider, "Implementing Fault Tolerant Services Using the State Machine Approach: A Tutorial", ACM Computing Surveys, vol. 22, No. 4, Dec. 1990, (Abstract) 1pg.

Network Appliance, "Network Appliance SyncMirror Software", Storage Solutions, Sep. 20, 2002, 2 pgs.

Network Appliance, "Cluster Failover High-Availability Solution", Storage Solutions, Apr. 5, 2005, 2 pgs.

* cited by examiner

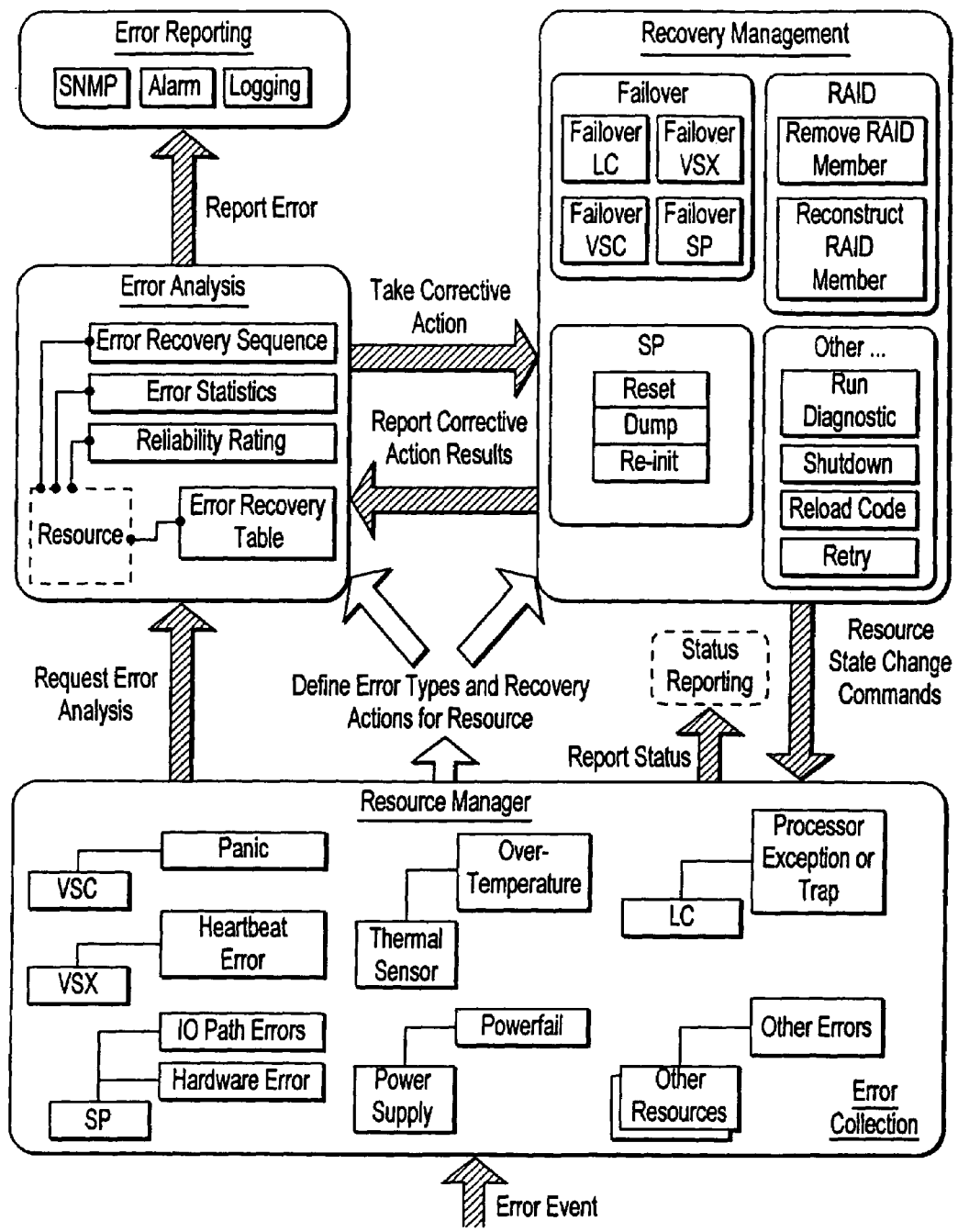
FIG. 1 Error Recovery Architecture

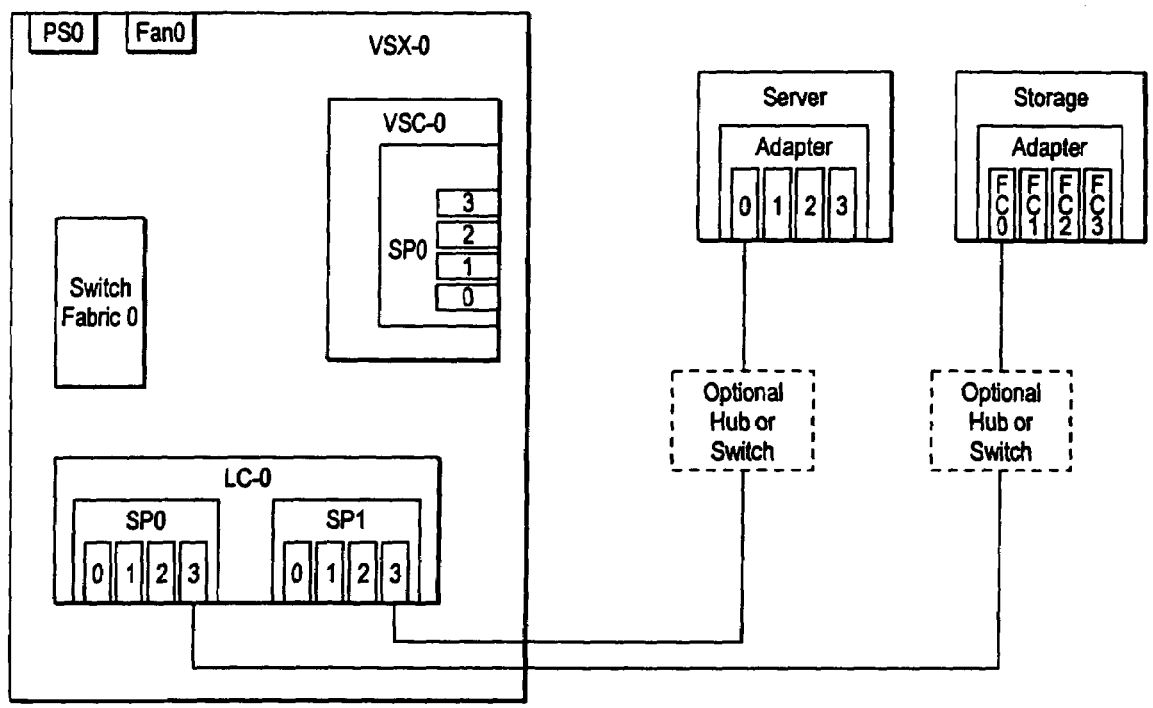
FIG. 2 Non-Fault Tolerant Configuration

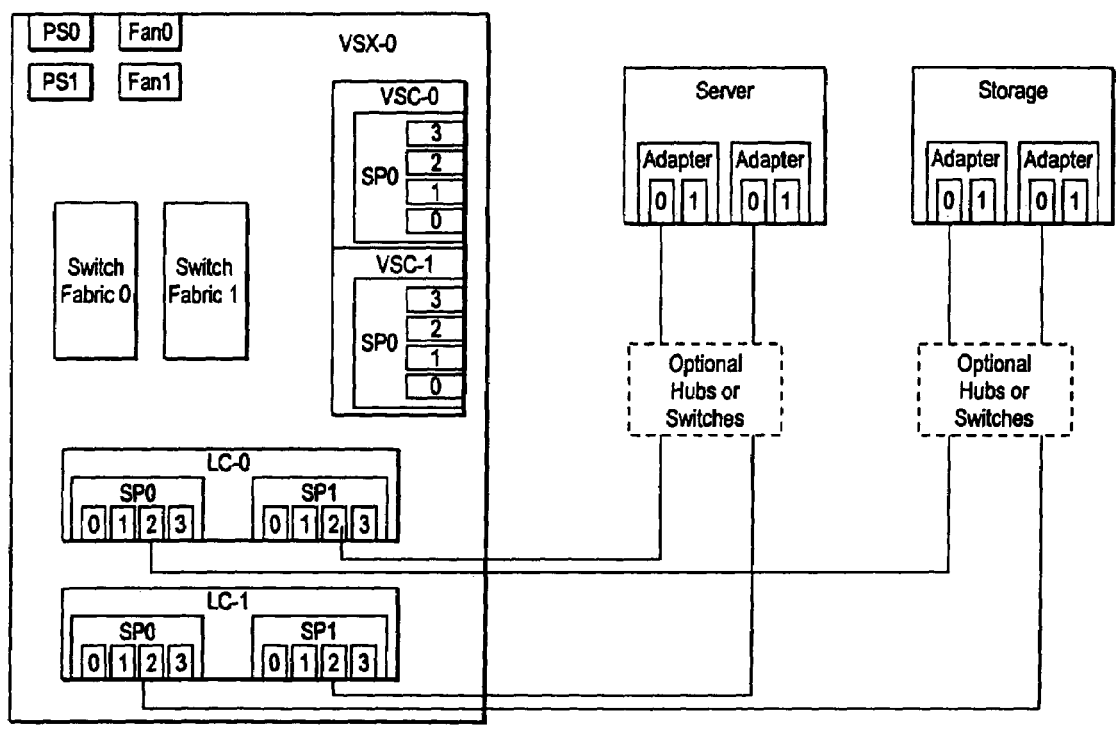
FIG. 3 Fault Tolerant Configuration

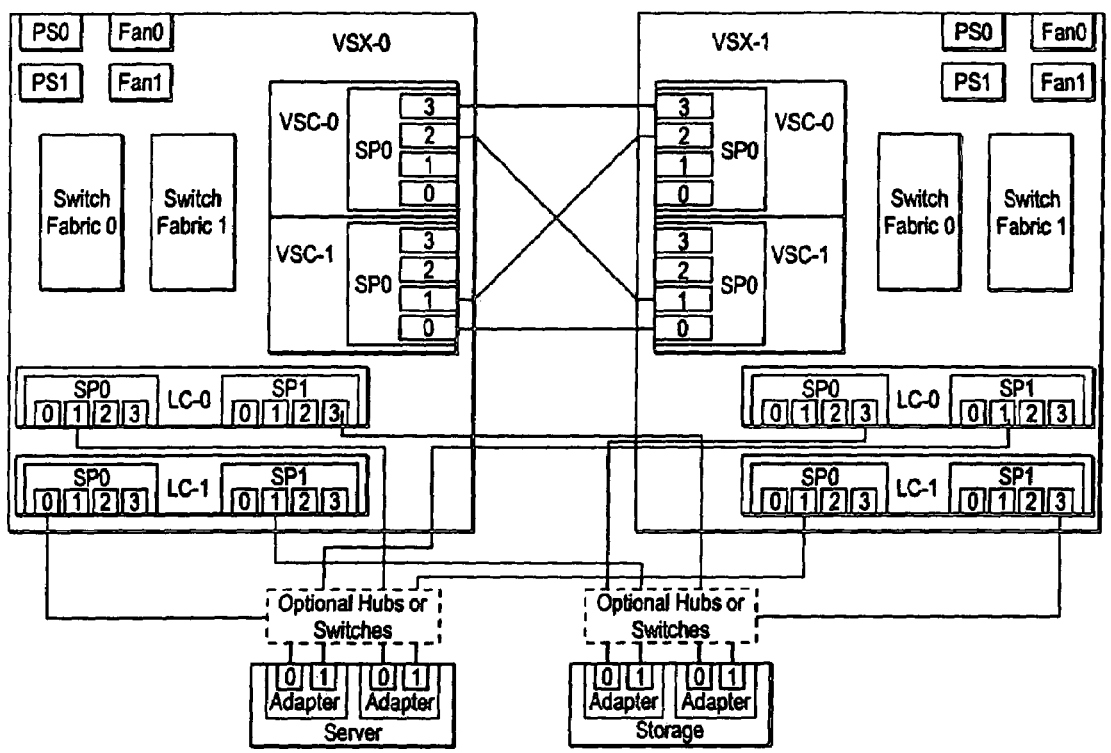
FIG. 4 High Availability Configuration

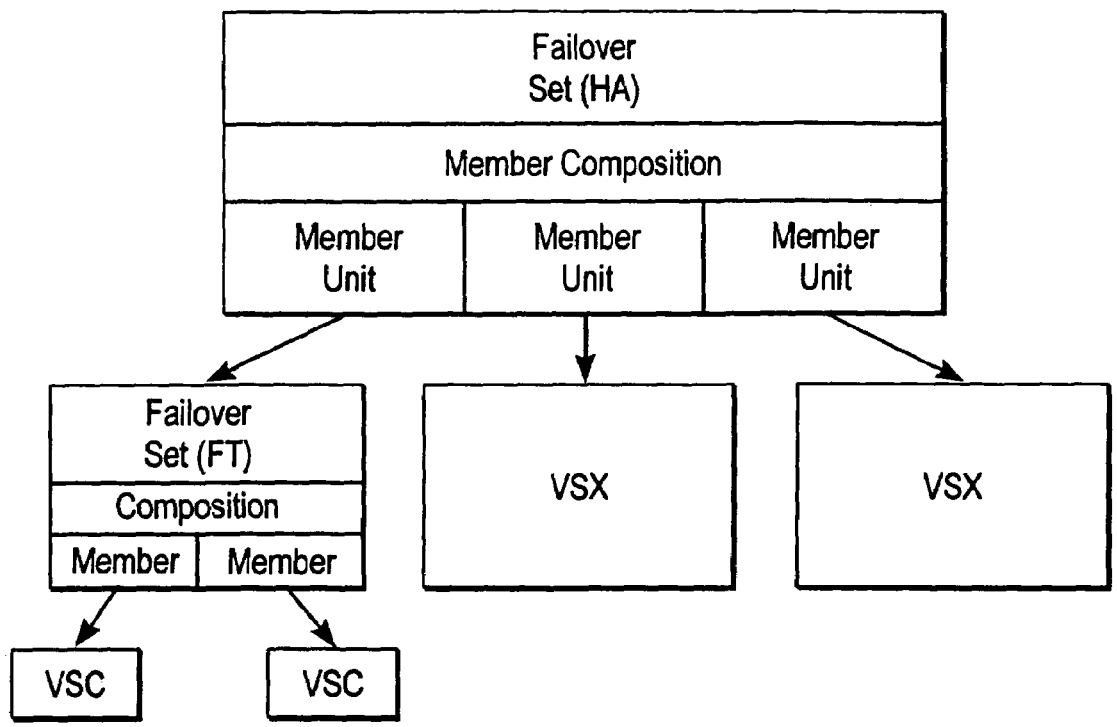
FIG. 5 Components of a Failover Set
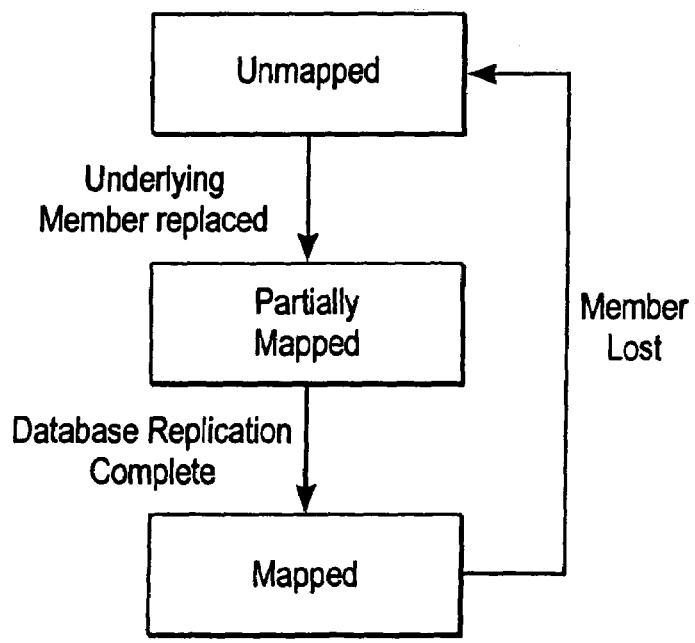
FIG. 6 Member Unit State Diagram

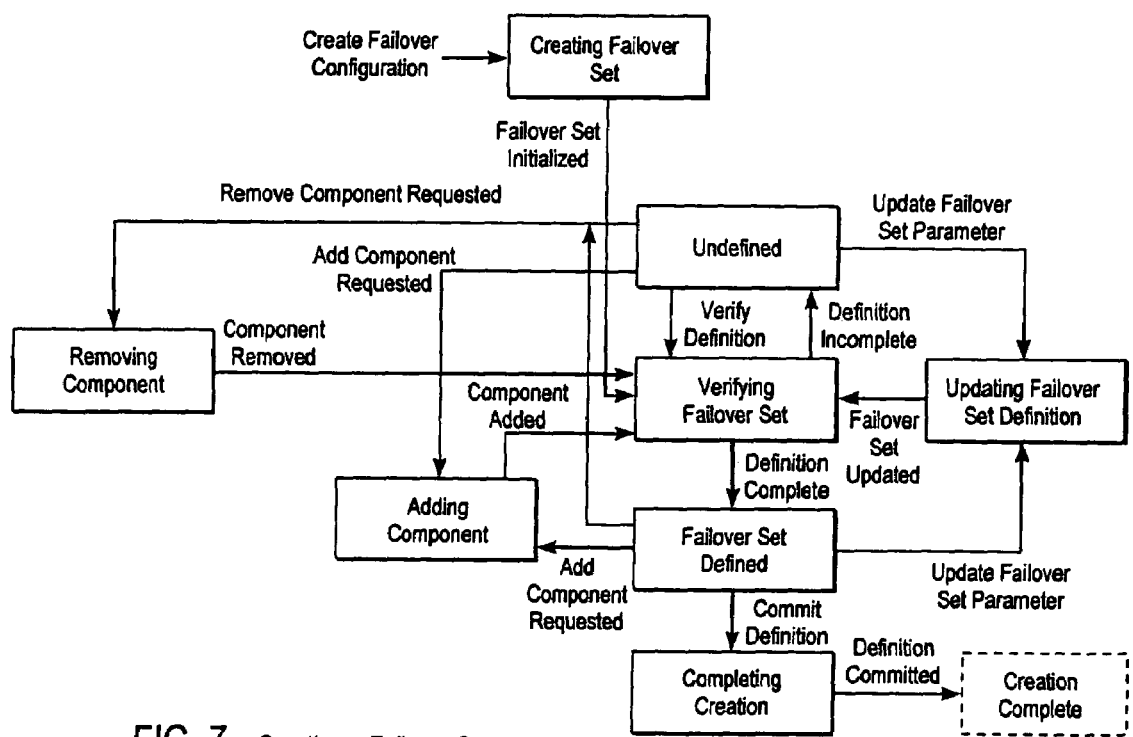
FIG. 7 Creating a Failover Set

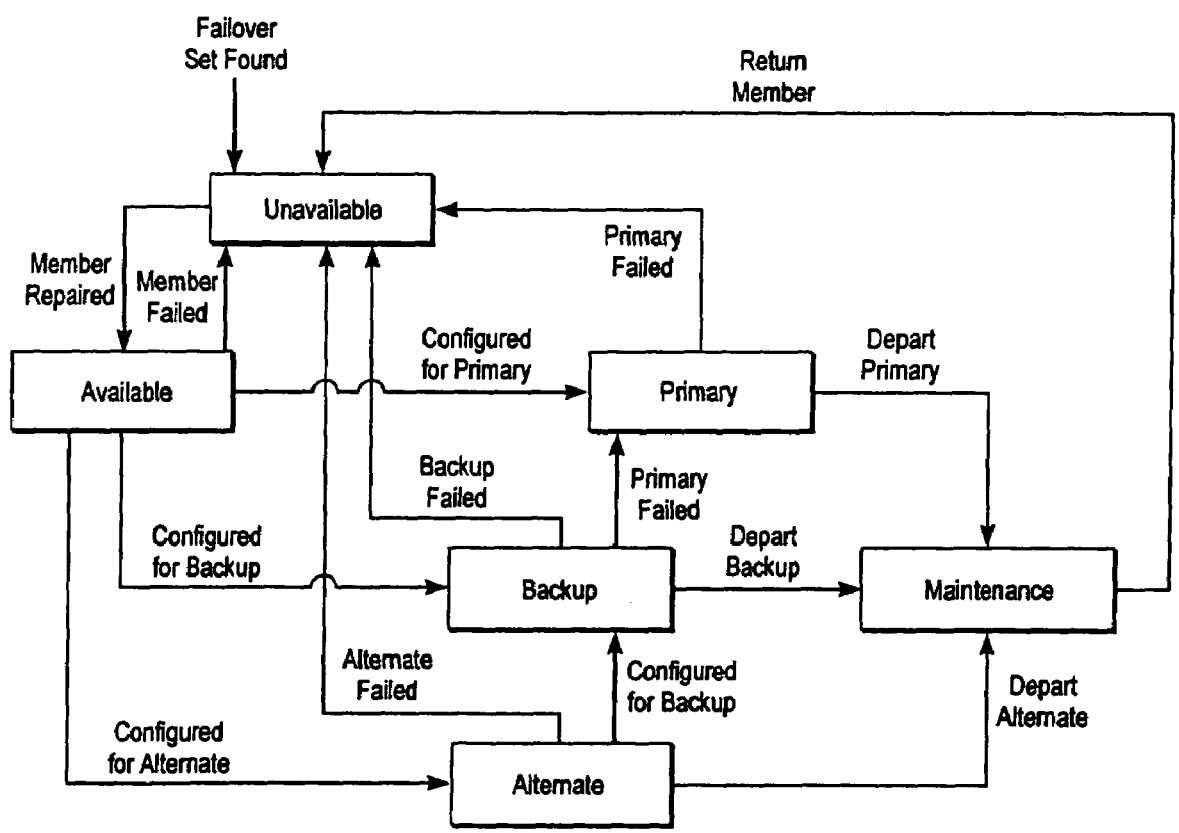
FIG. 8  Member State Diagram

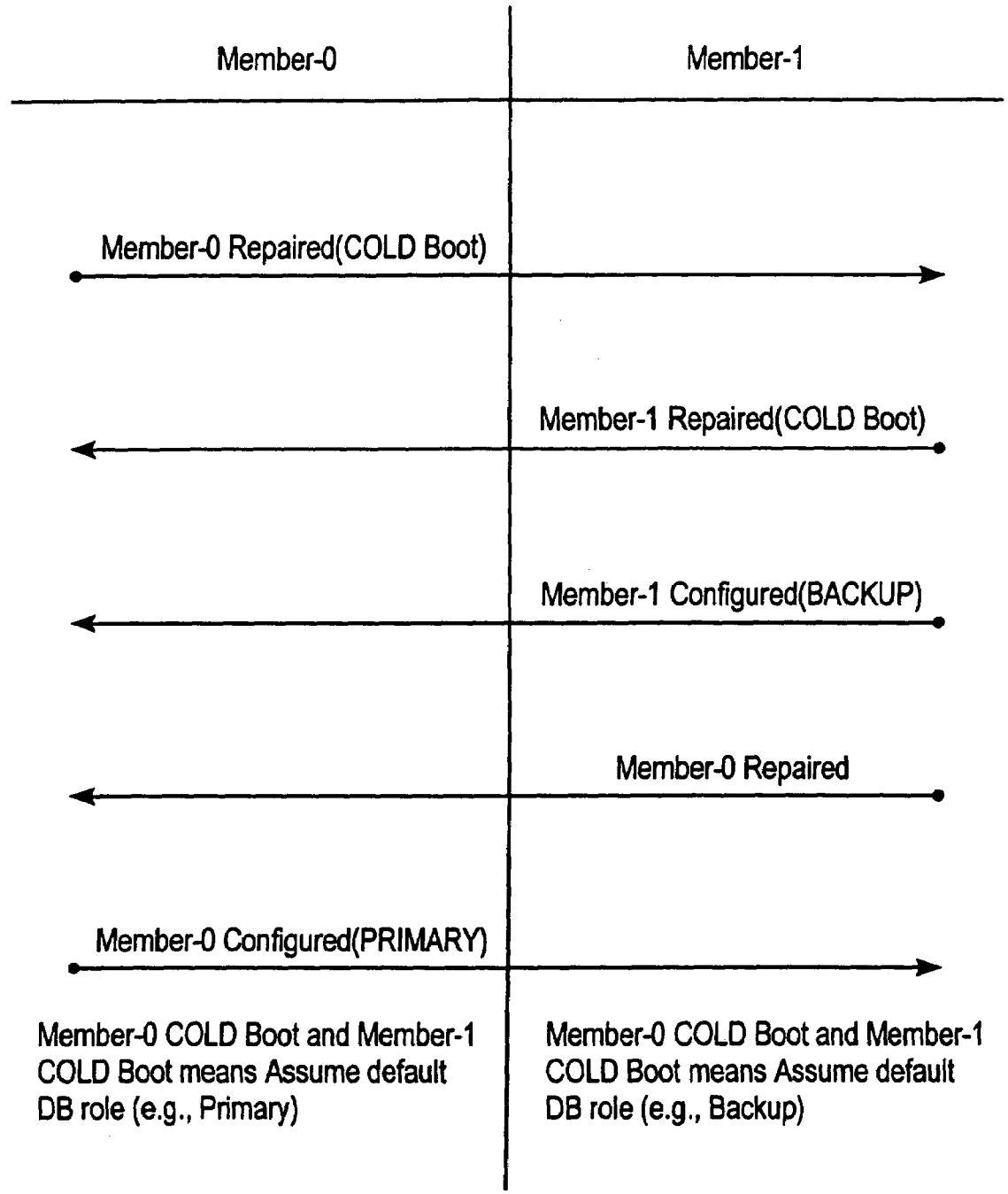
FIG. 9  Member Arbitration for COLD Boot

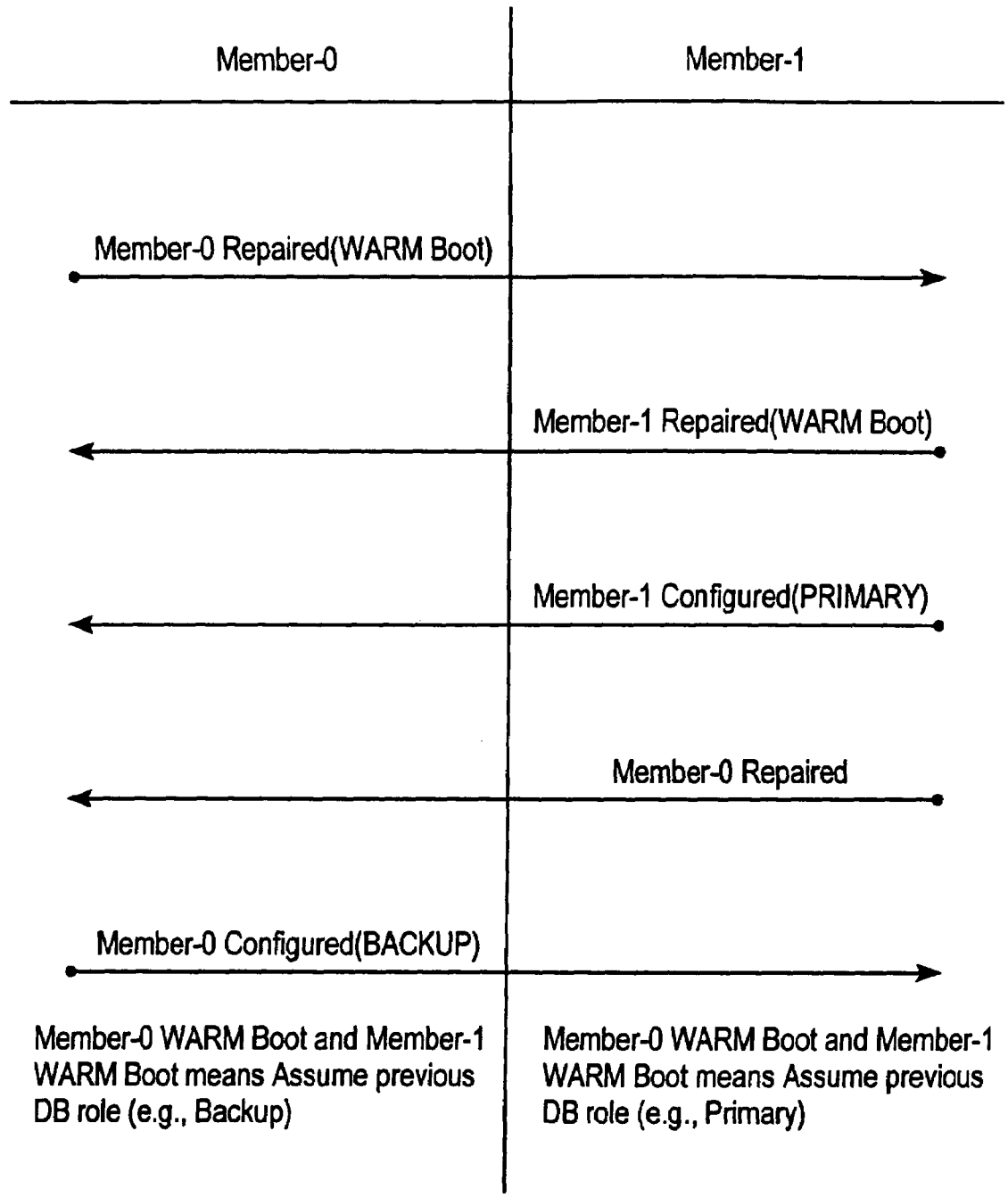
FIG. 10  Member Arbitration for WARM Boot

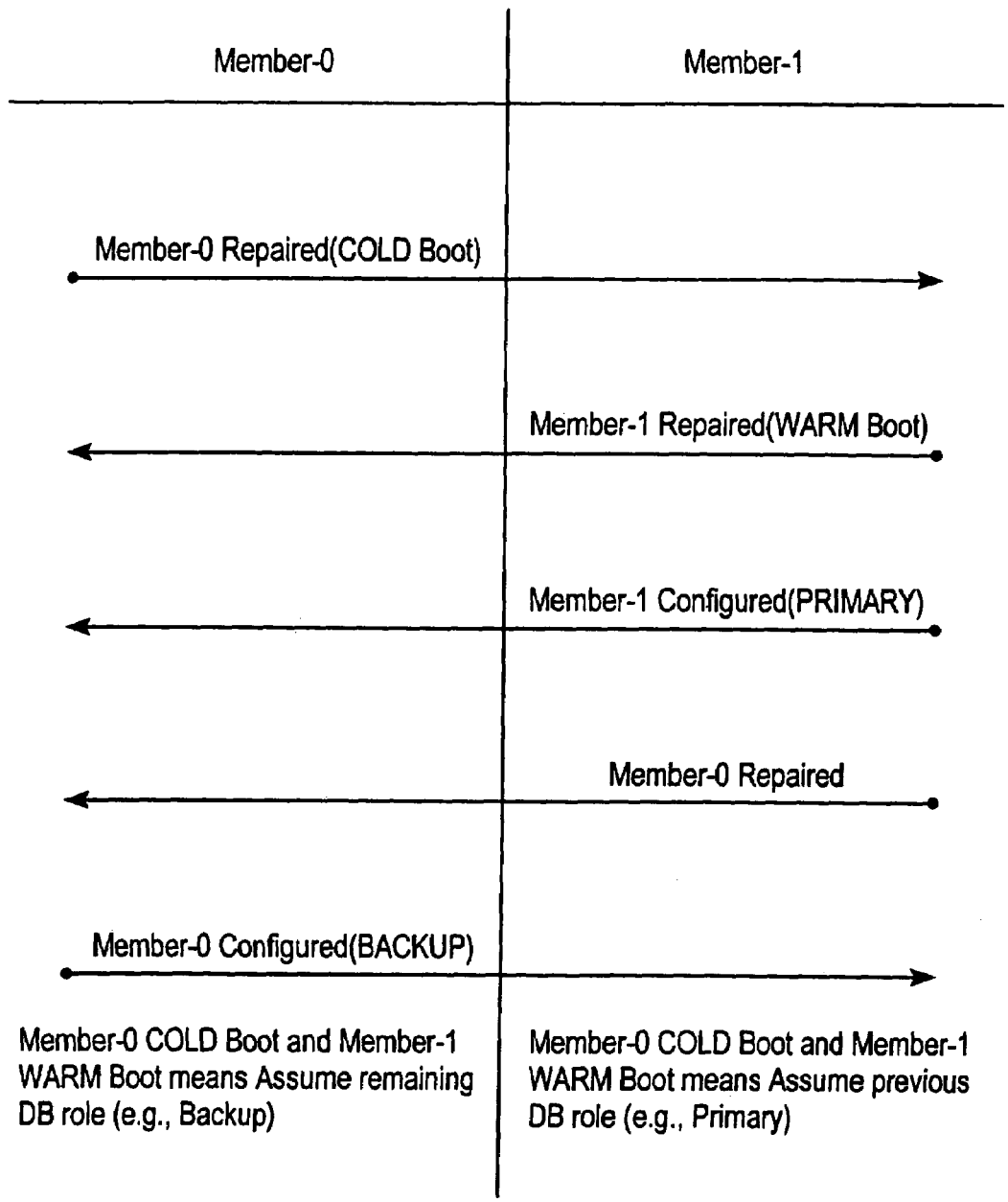
FIG. 11 Member Arbitration for Mixed Boot

| Old State | Event | | | | | |
|---|---|---|---|---|---|---|
| | Mi Repaired | Mj Repaired | Mi Configured | Mj Configured | Mi Failed | Mj Failed |
| 1. {Mi,Mj} Unavail, {} Avail, {} Primary, {} Backup° | New St: 3 Action: A | New St: 2 Action: B | | | New St: 1 Action: S | New St: 1 Action: T |
| 2. {Mi} Unavail, {Mj} Avail, {} Primary, {} Backup | New St: 4 Action: C | | | New St: 8 Action: D | New St: 2 Action: S | |
| 3. {Mj} Unavail, {Mi} Avail, {} Primary, {} Backup | | New St: 4 Action: E | New St: 9 Action: F | | | New St: 3 Action: T |
| 4. {} Unavail, {Mi,Mj} Avail, {} Primary, {} Backup | | | New St: 7 Action: G | New St: 6 Action: H | | |
| 5a. {} Unavail, {} Avail, {Mi} Primary, {Mj} Backup | | | | | New St: 8 Action: I | New St: 9 Action: J |
| 5b. {} Unavail, {} Avail, {Mj} Primary, {Mi} Backup | | | | | New St: 8 Action: I | New St: 9 Action: J |
| 6. {} Unavail, {Mi} Avail, {Mj} Pri, {} Backup | New St: 6 Action: K | | New St 5a,5b Action: L | | | New St: 3 Action: M |
| 7. {} Unavail, {Mj} Avail, {Mi} Pri, {} Backup | | New St: 7 Action: N | | New St 5a,5b Action: O | New St: 2 Action: P | |
| 8. {Mi} Unavail, {} Avail, {Mj} Pri, {} Backup | New St: 6 Action: C | | | | | New St: 1 Action: Q |
| 9. {Mj} Unavail, {} Avail, {Mi} Pri, {} Backup | | New St: 7 Action: E | | | New St: 1 Action: R | |
| ° Initial State | | | | | | |

FIG. 12  2 Member State Table

| Action Routines | Description |
|---|---|
| 1 | 1. Send "Mi repaired" to Mj, if Mj is not failed. 2. Set timer to send "Mi repaired" to Mi |
| 2 | 1. Send "Mj repaired" to Mi, if Mi is not failed. 2. Set timer to send "Mj repaired" to Mj |
| A | 1. If Mi and configured send "Mi configured" to Mj. 2. Set timer to send "Mi configured" to Mi. 3. |
| B | 1. If Mj and configured send "Mj configured" to Mi. 2. Set timer to send "Mj configured" to Mj. 3. |
| C | 1. If Mj, echo event back to Mi. 2. If Mi and configured send "Mi configured" to Mj. 3. Set timer to |
| D | 1. If Mj, become Primary. 2. Otherwise, nop. |
| E | 1. If Mi, echo event back to Mj. 2. If Mj and configured send "Mj configured" to Mi. 3. Set timer to |
| F | 1. If Mi, become Primary. 2. Otherwise, nop. |
| G | 1. If Mi, become Primary. 2. Otherwise, echo event back to Mi. |
| H | 1. If Mj, become Primary. 2. Otherwise, echo event back to Mj. |
| I | 1. If Mj, become Primary. 2. If Mi become Backup. |
| J | 1. If Mi, become Primary. 2. If Mj become Backup. |
| K | 1. If Mj, echo event back to Mi. 2. Otherwise, nop |
| L | 1. If Mj, determine Member Role. 2. SEnd "Mi configured" to Mi when done. 3. If Mi determine |
| M | 1. If Mj, perform Fail-Stop processing. 2. Send "Mj Failed" to Mi. 3. Otherwise become Primary after |
| N | 1. If Mi, echo event back to Mj. 2. Otherwise, nop |
| O | 1. If Mi, determine Member role. 2. Send "Mj configured" to Mj when done. 3. If Mj determine |
| P | 1. If Mi, perform Fail-Stop processing. 2. Send "Mi Failed" to Mj. 3. Otherwise become Primary after |
| Q | 1. If Mj, perform Fail-Stop processing for Mj. 2. Otherwise nop. |
| R | 1. If Mi, perform Fail-Stop processing for Mi. 2. Otherwise nop. |
| S | 1. Perform Fail-Stop processing for Mi |
| T | 1. Perform Fail-Stop processing for Mj |

FIG. 13 Action Routines for a 2 Node Configuration

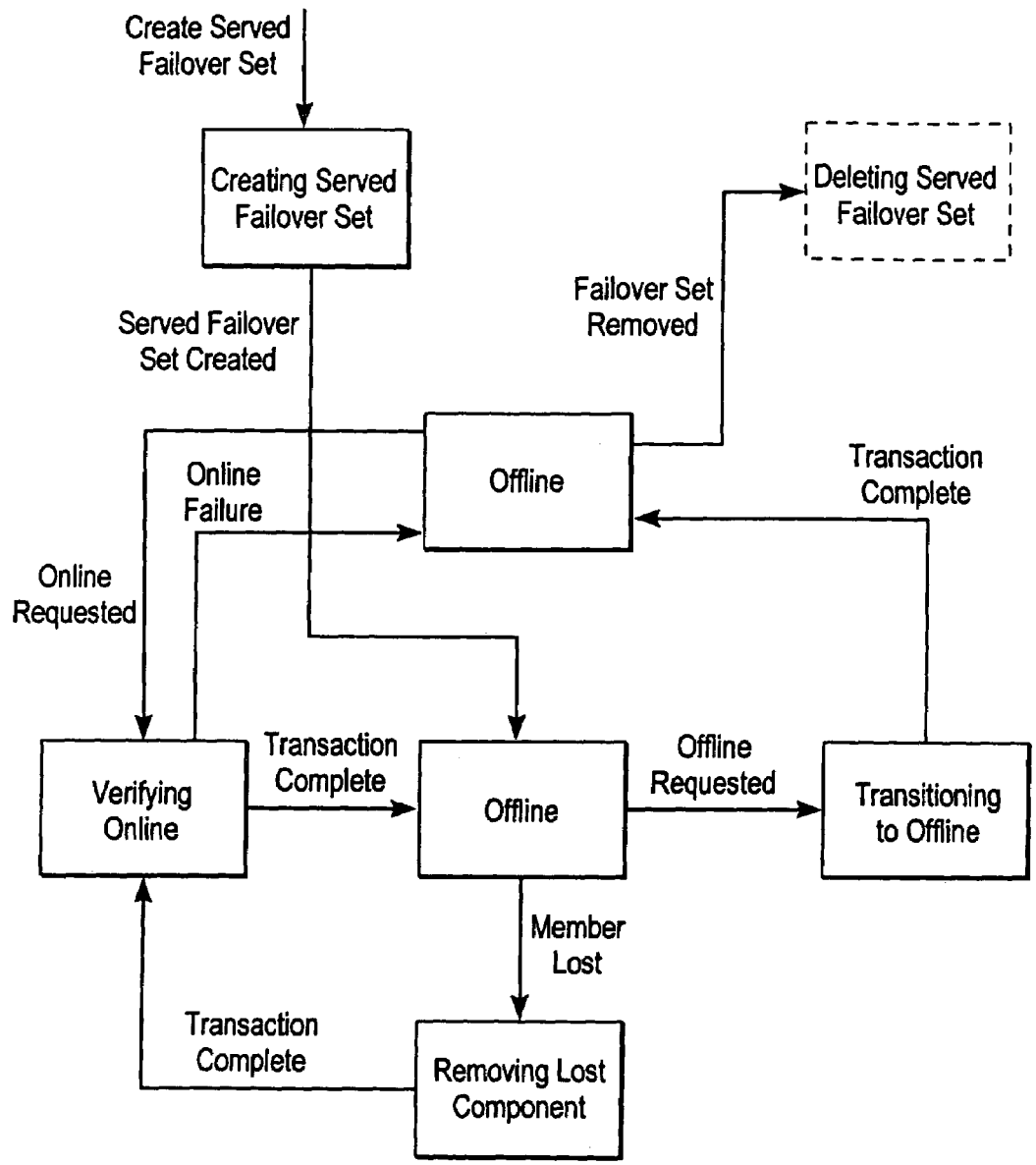
FIG. 14 Served Failover Set State Machine Diagram

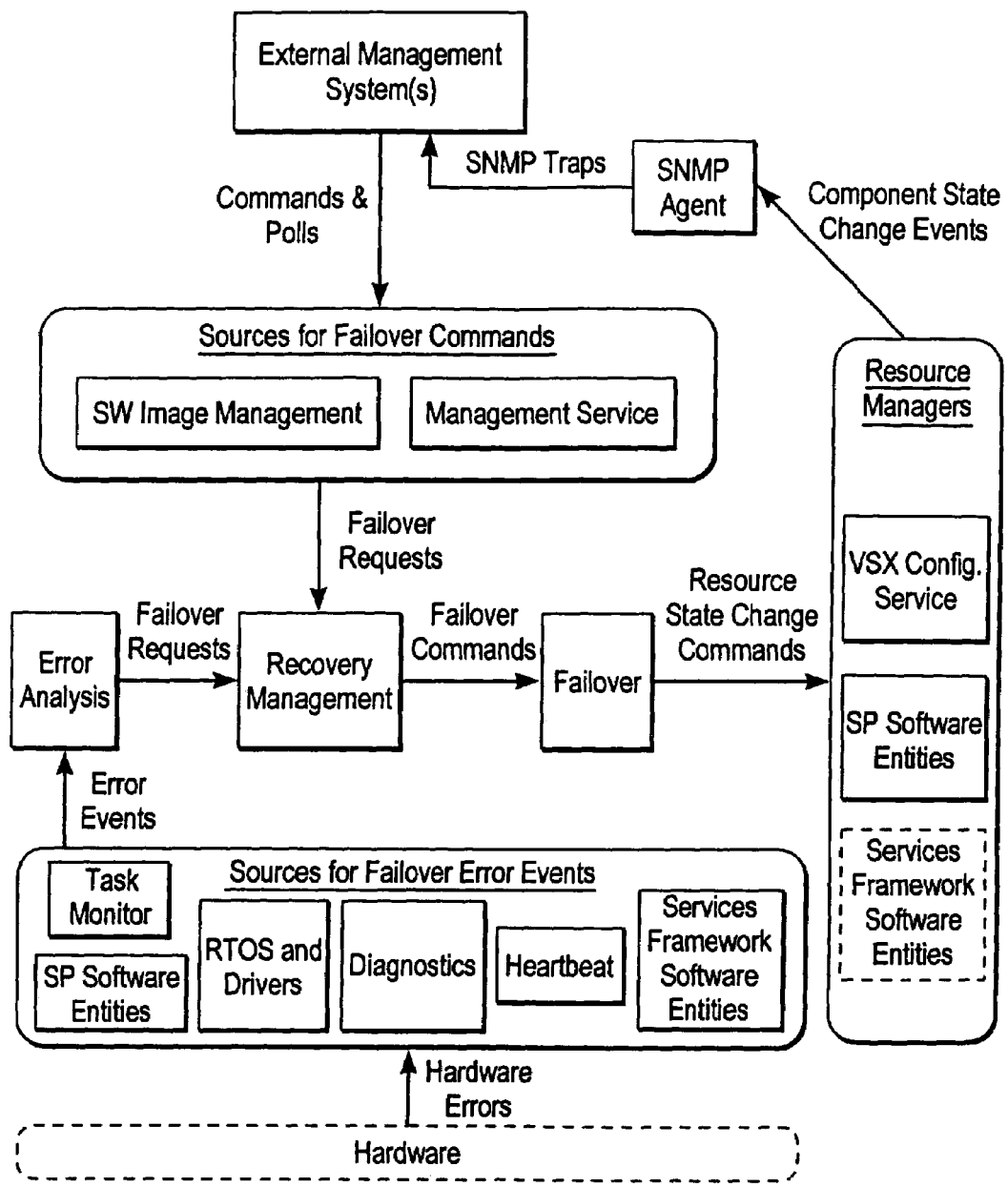
FIG. 15  Fault Detection and Analysis Architecture

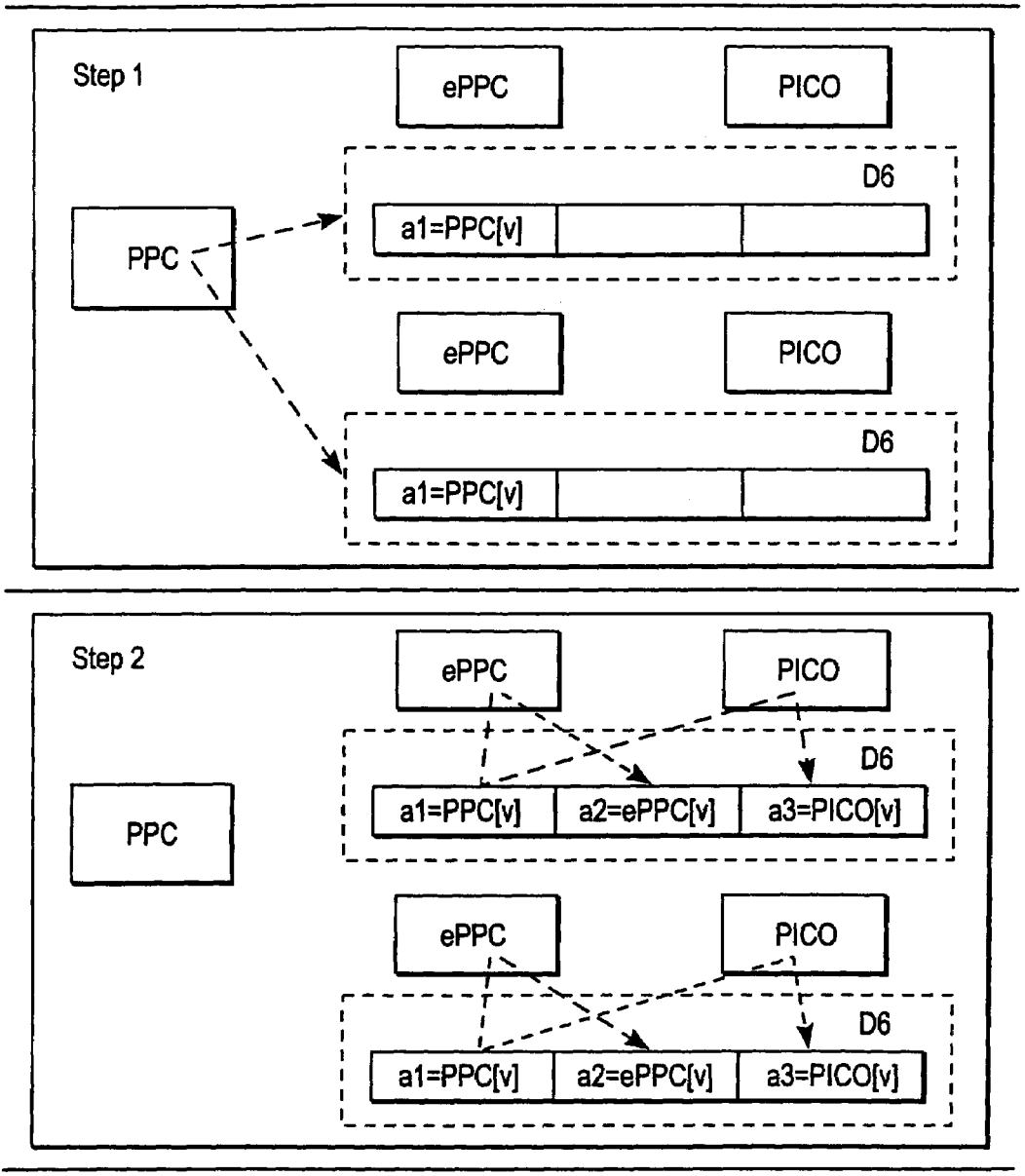
FIG. 16 No Faults

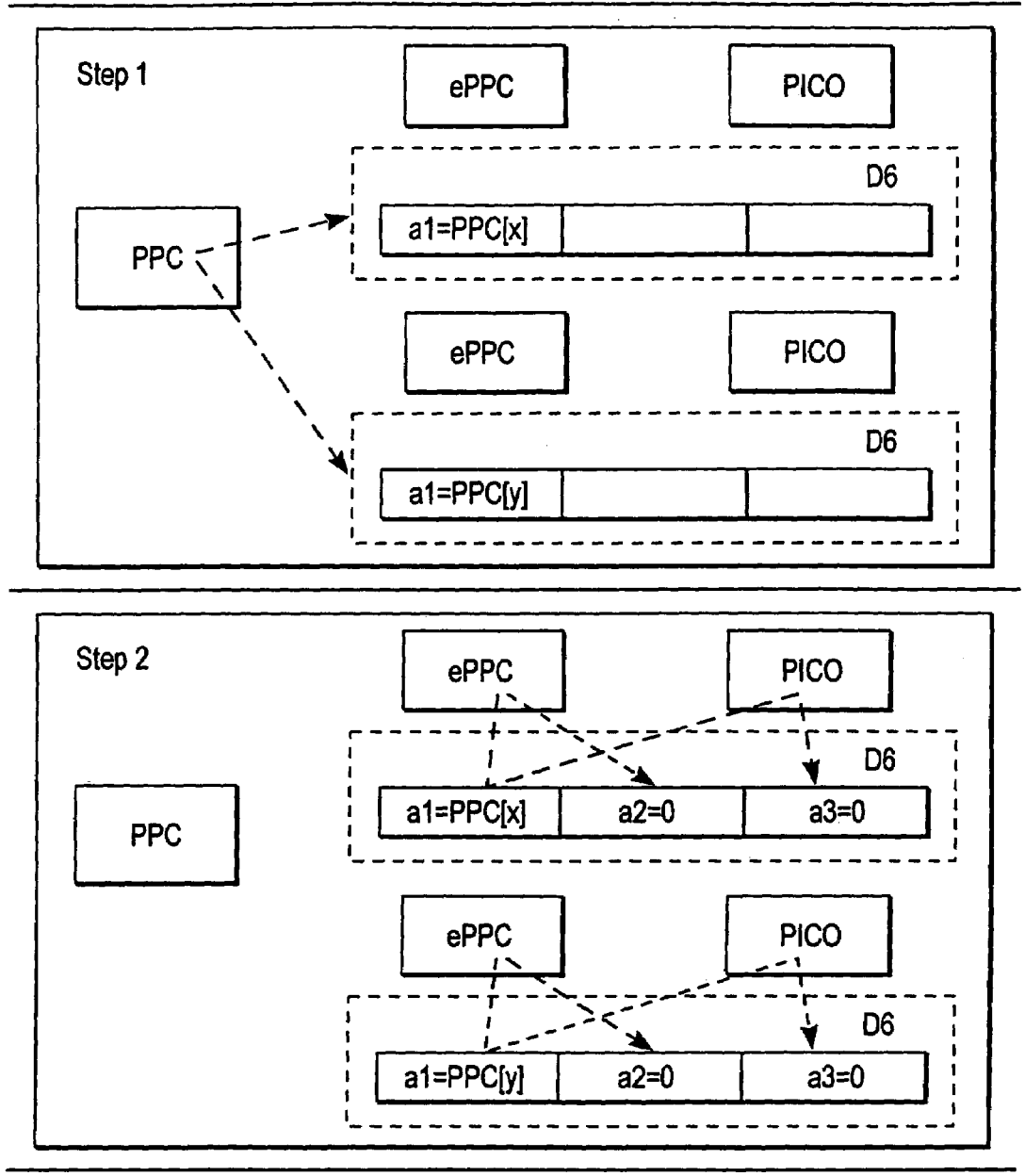
FIG. 17 Transmitter fault (sends a bad value)

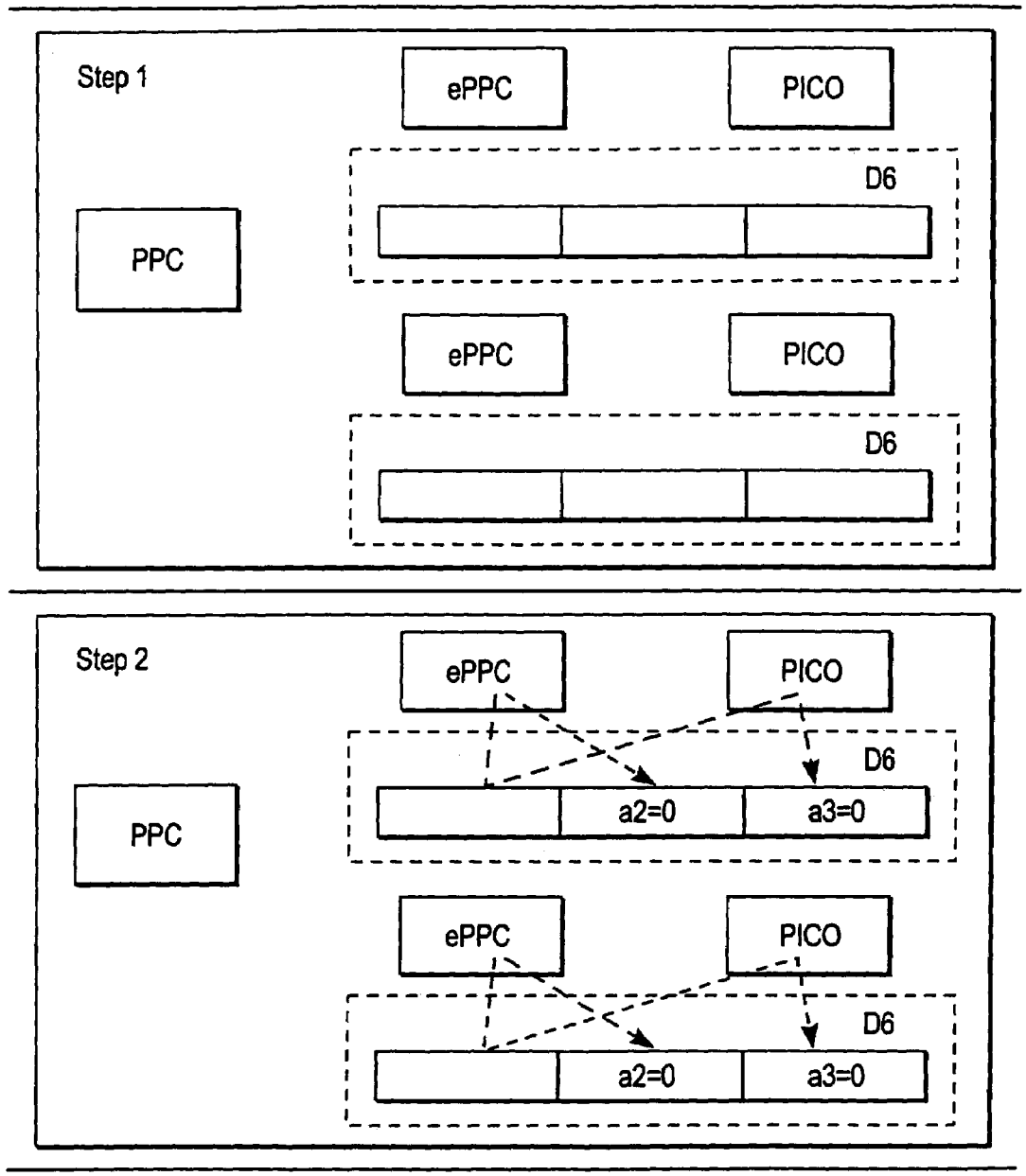
Step 3
majority(a1,a2,a3) = majority(0,0,0) = 0, transmitter fault
FIG. 18 Transmitter fault (doesn't send a value)

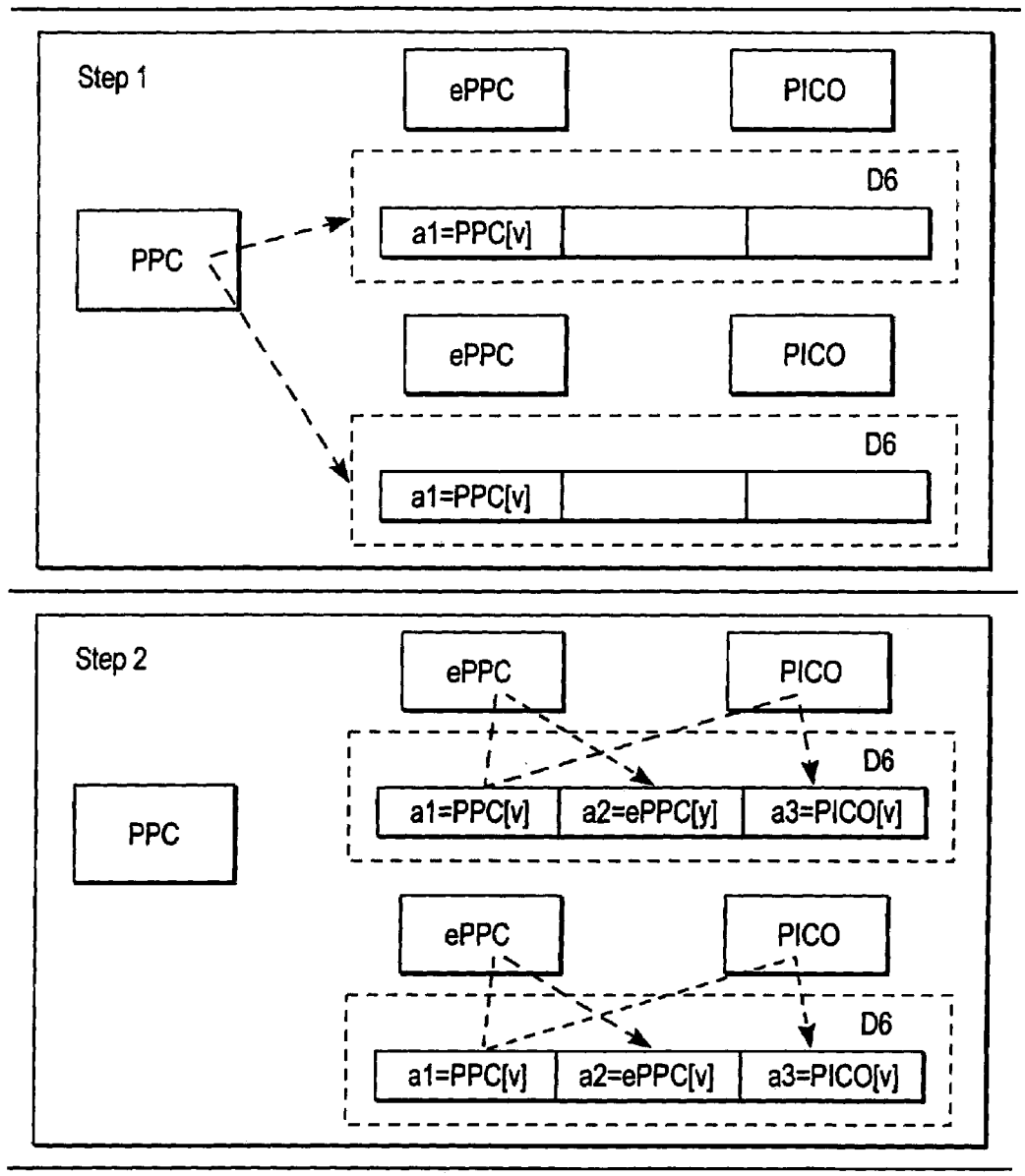
FIG. 19 Receiver fault (relays wrong value)

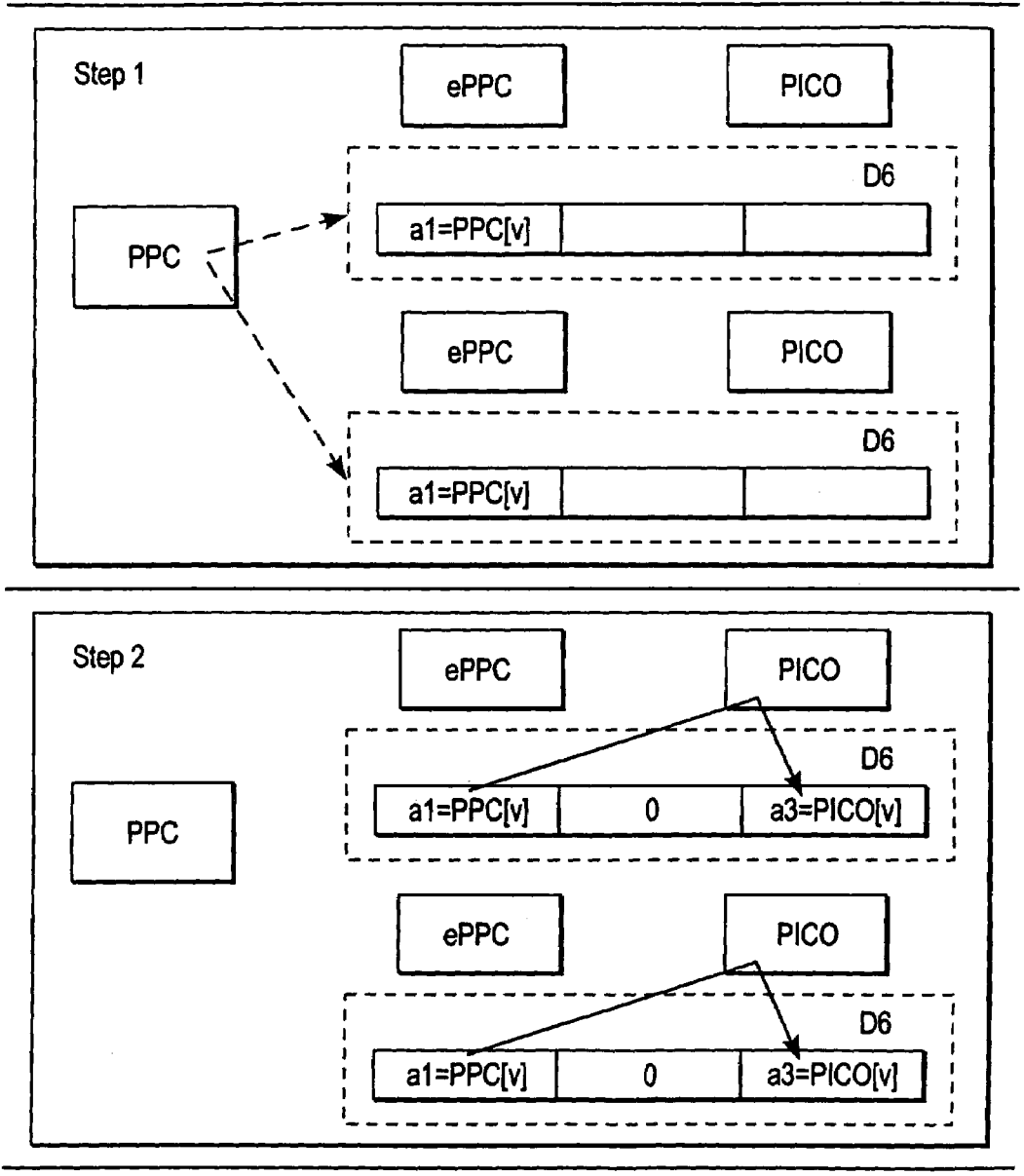
FIG. 20 Receiver fault (doesn't relay a value)

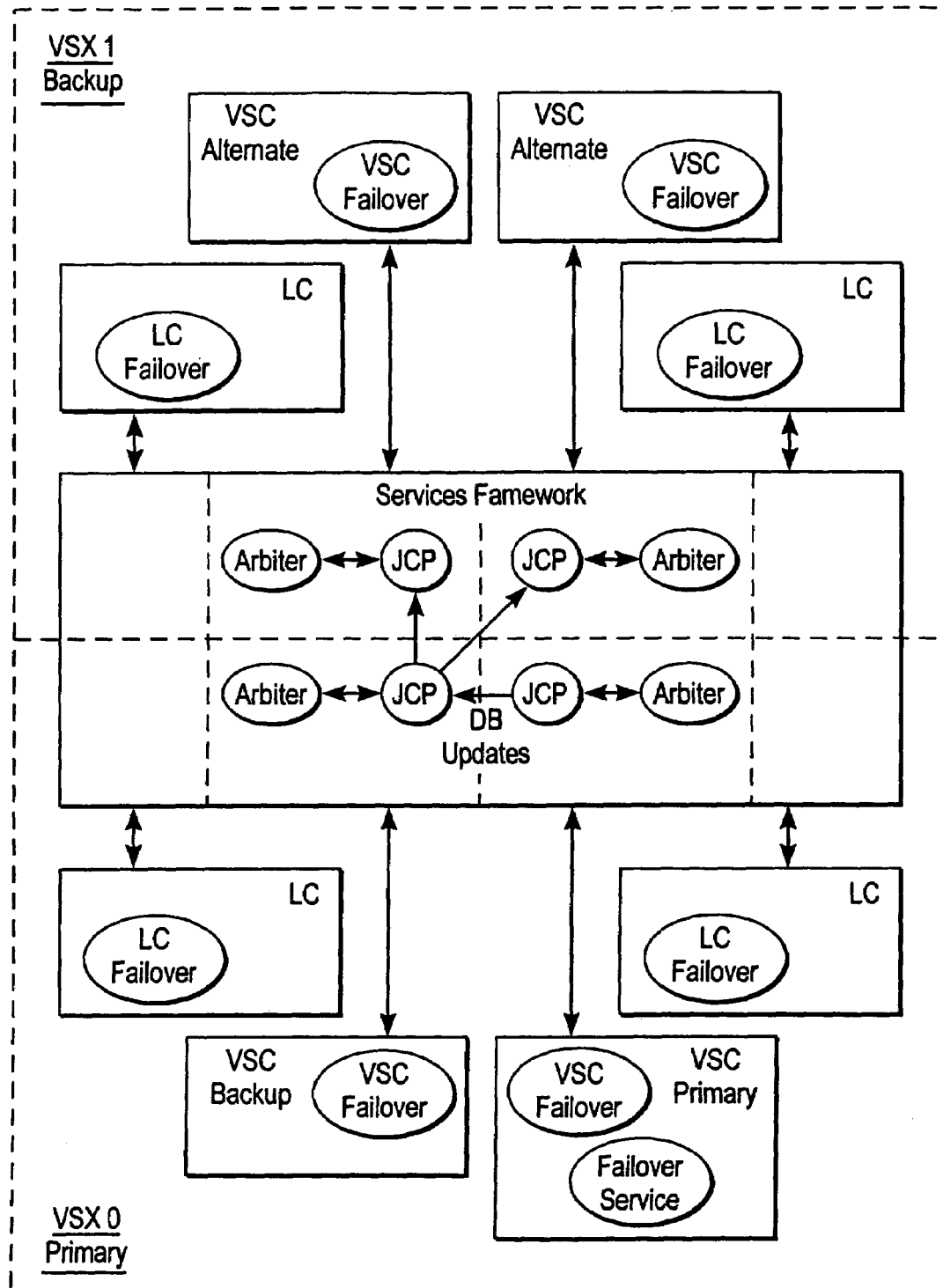
FIG. 21A  Failover Service Architecture

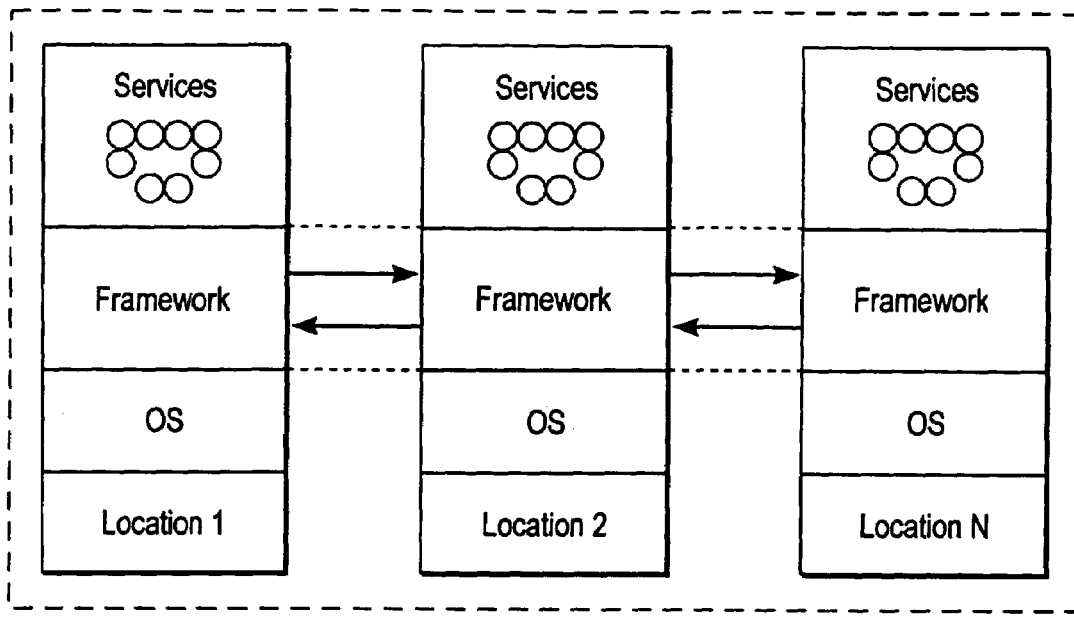
FIG. 21B
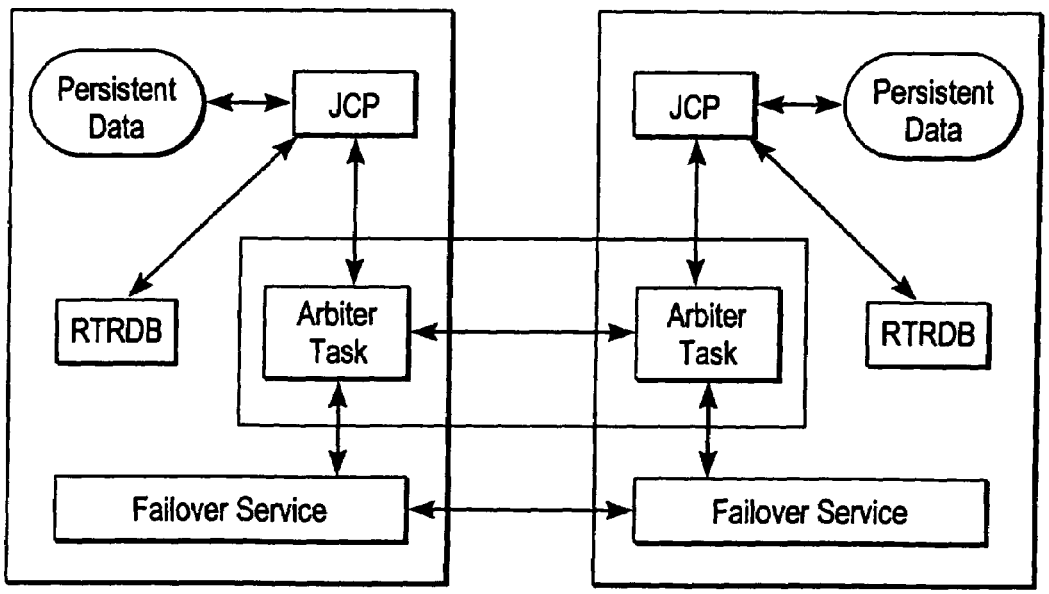
FIG. 22  An Arbiter for the Database

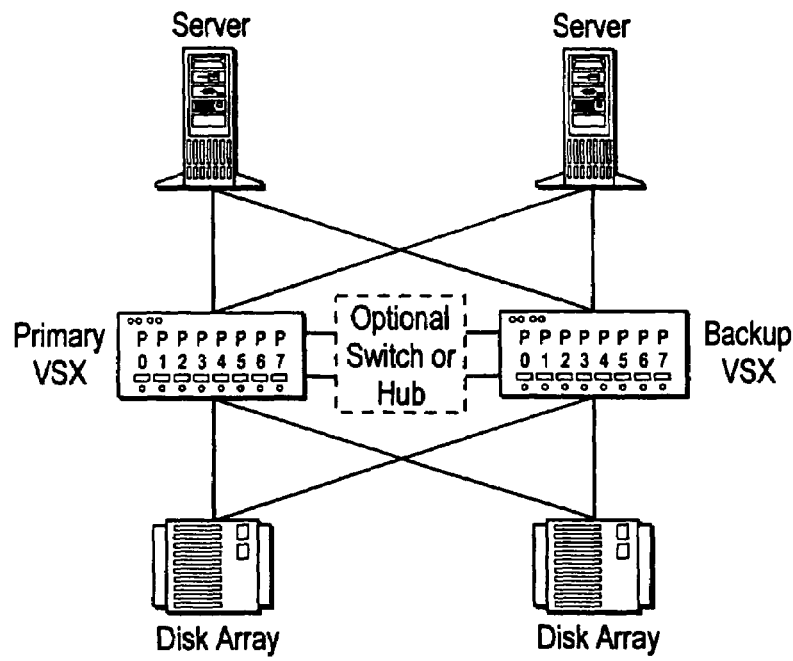
FIG. 23 Shared Link
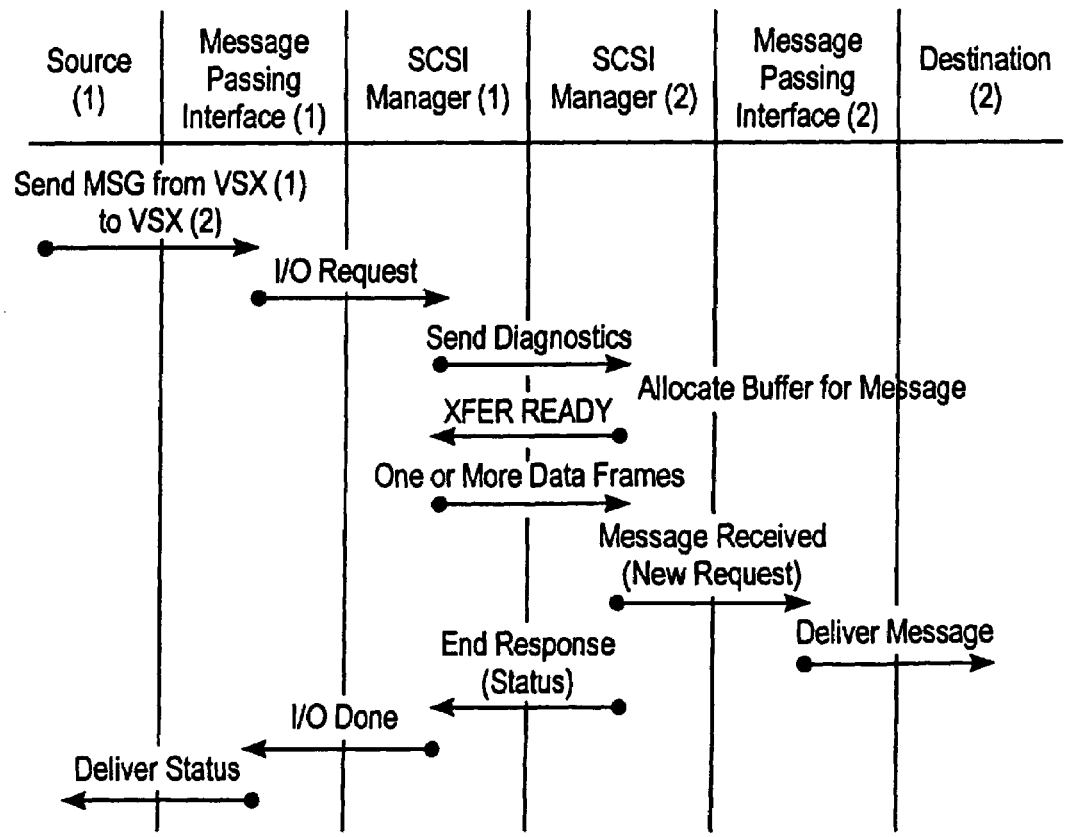
FIG. 24 VSX to VSX Message Passing

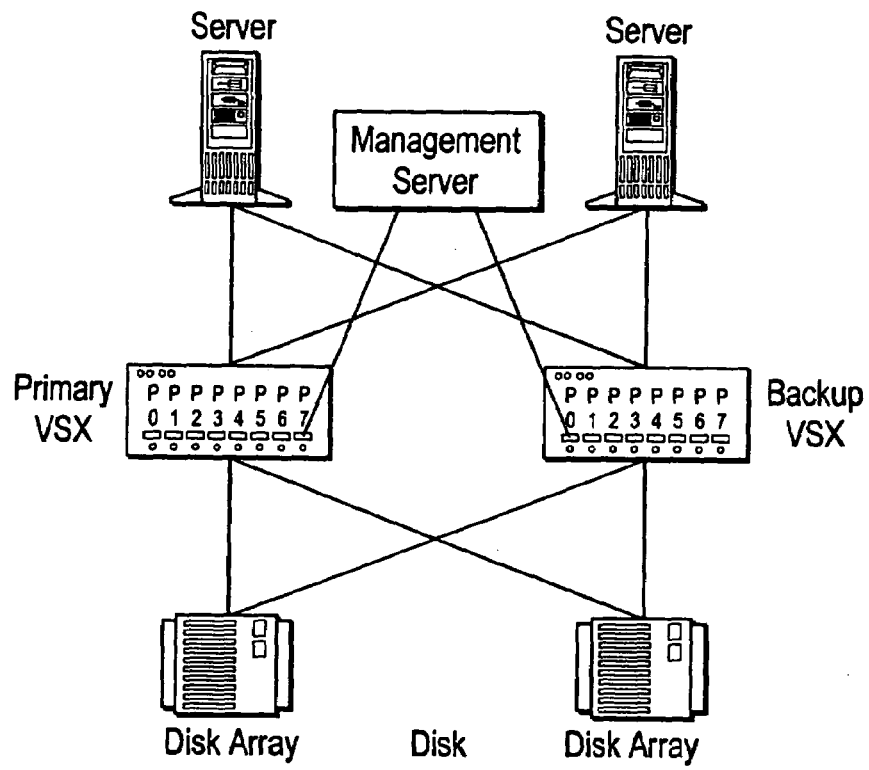
FIG. 25 Management Link
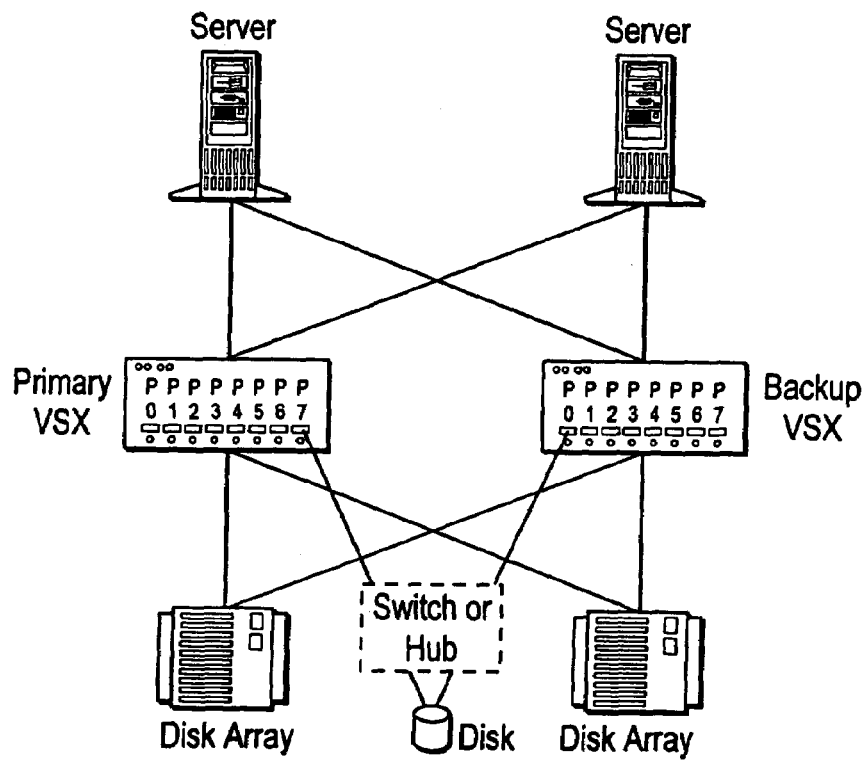
FIG. 26 Shared Disk

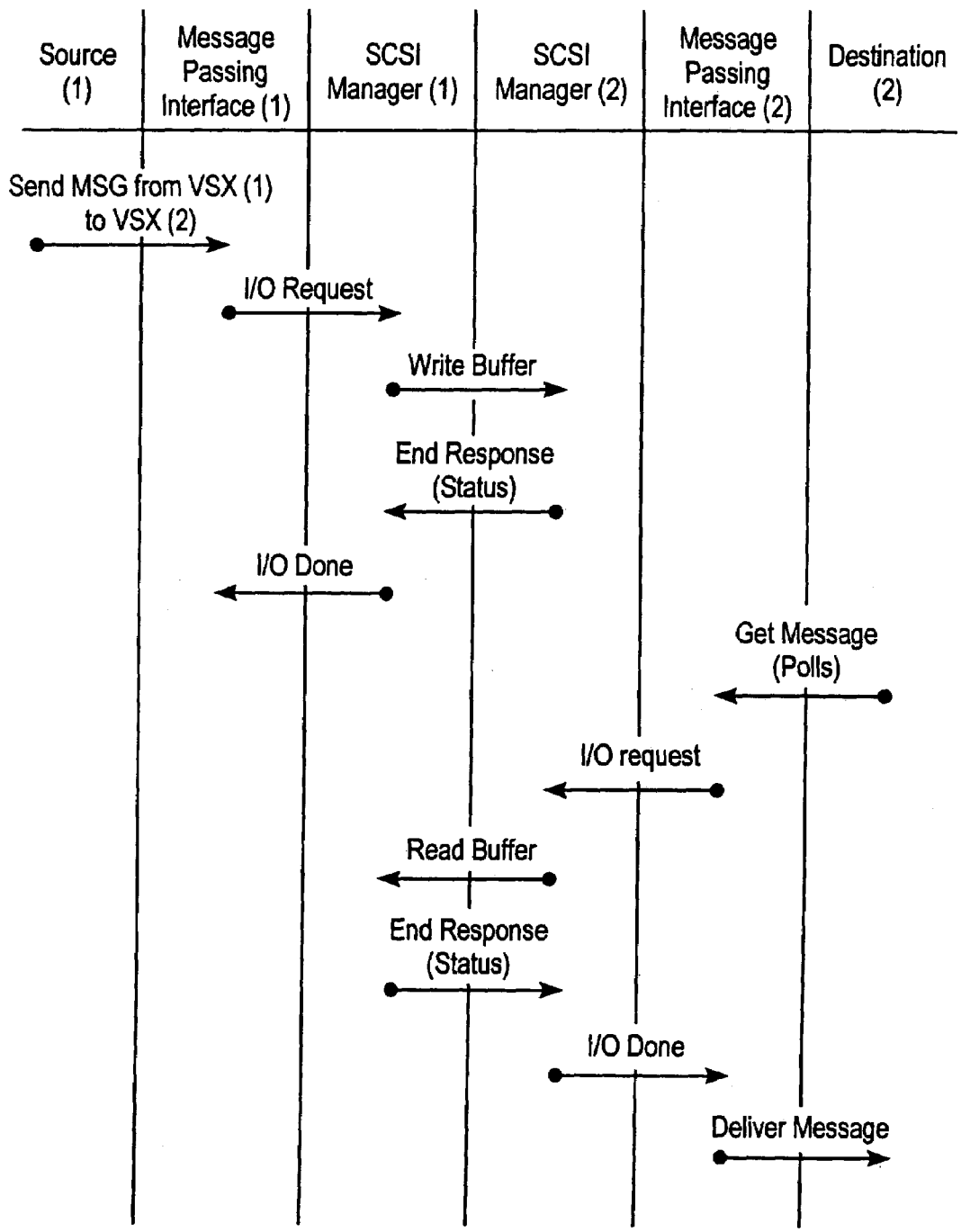
FIG. 27 VSX to VSX Communication Using Shared Disk

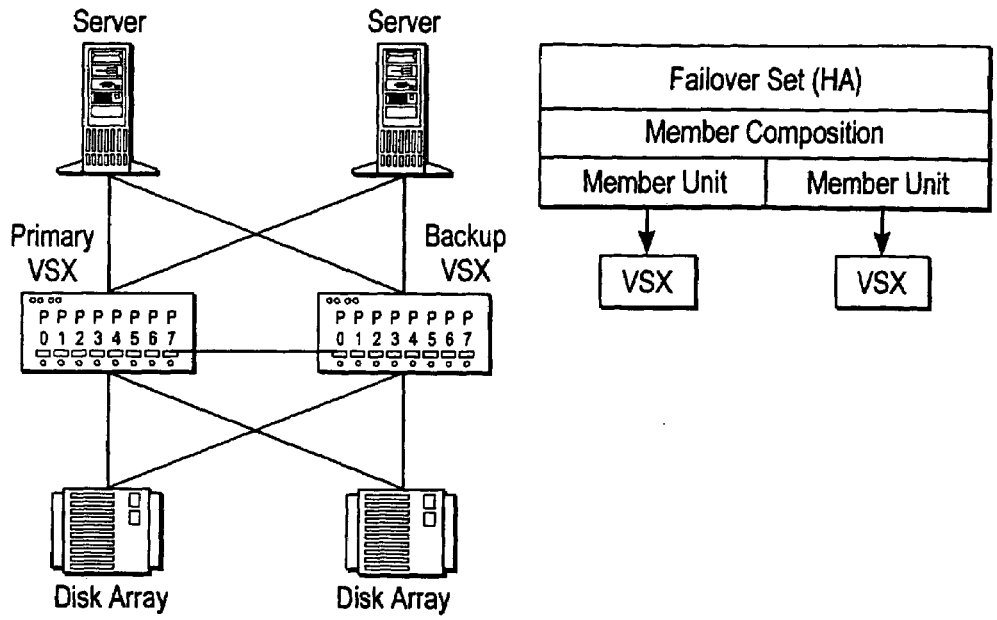
FIG. 28  2 Node HA Configuration
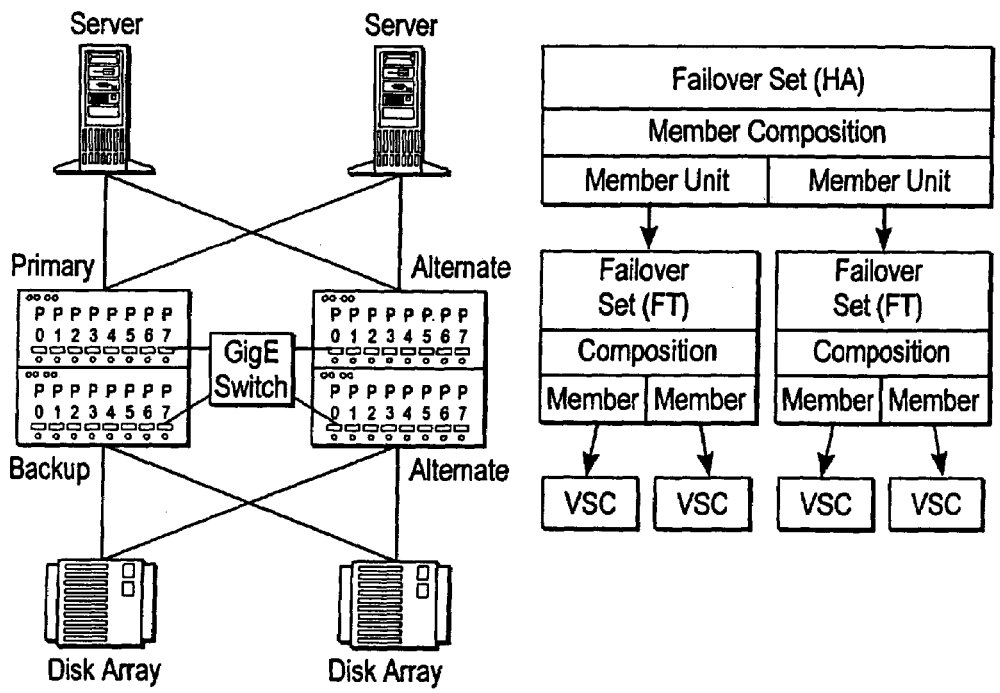
FIG. 29  Hierarchical HA Configuration

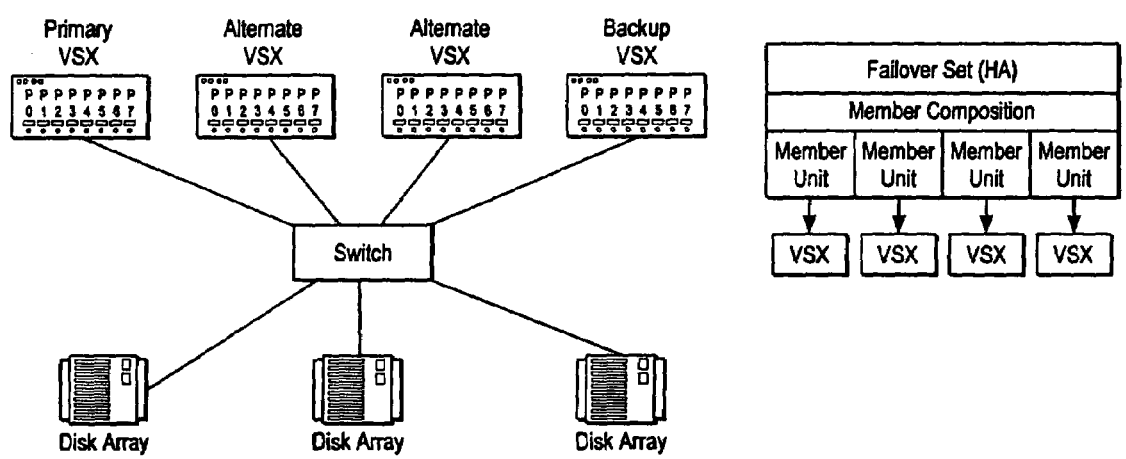
FIG. 30 N + 1 Nodes

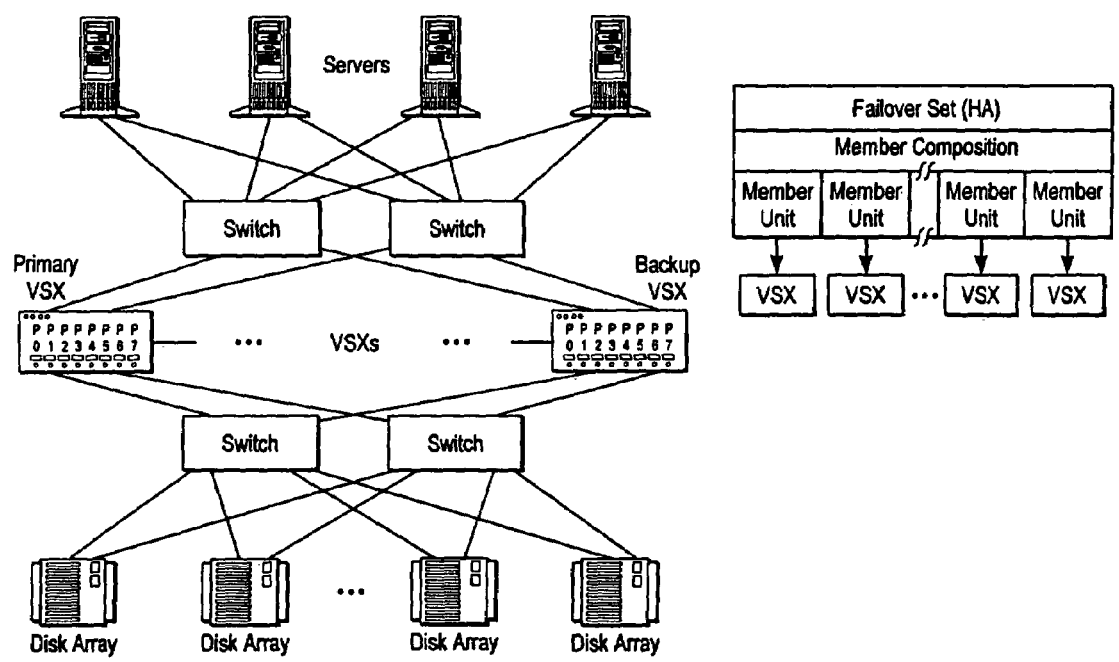
FIG. 31 N – Nodes

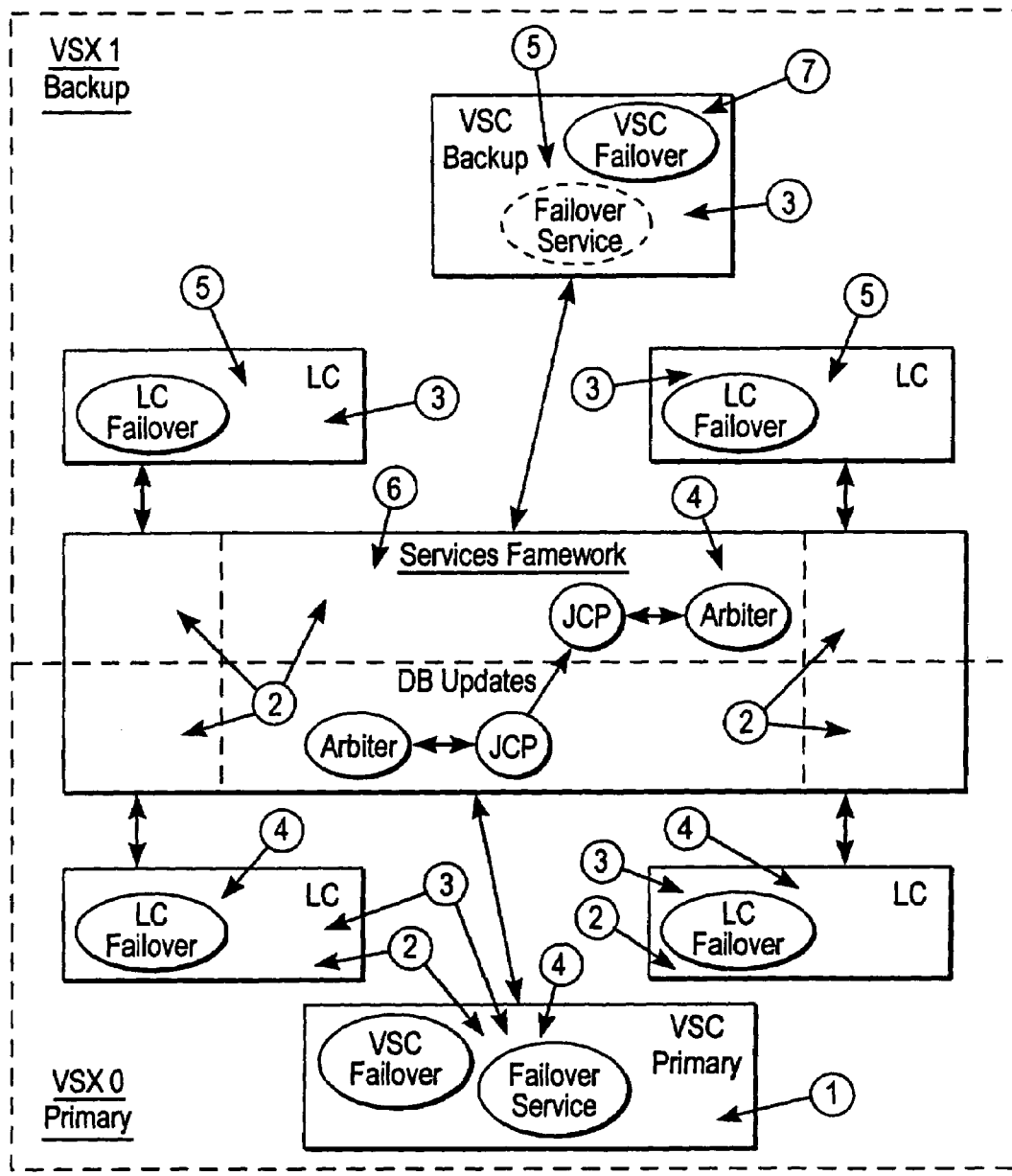

1. VSC Crashes (Host Processor)
2. Rest of system detects VSC crash
3. Error Analysis determines Member fails, which translates into a "Primary Lost" event
4. Activate JCP in Master mode and enable the virtual services, Stop Ports on failed Primary
5. Reset affected devices, Cleanup reservations and locks, Set Unit Attention
6. Restart management requests
7. Restart RCON and FORMAT FIG. 32  VSX Failover, Primary Fails

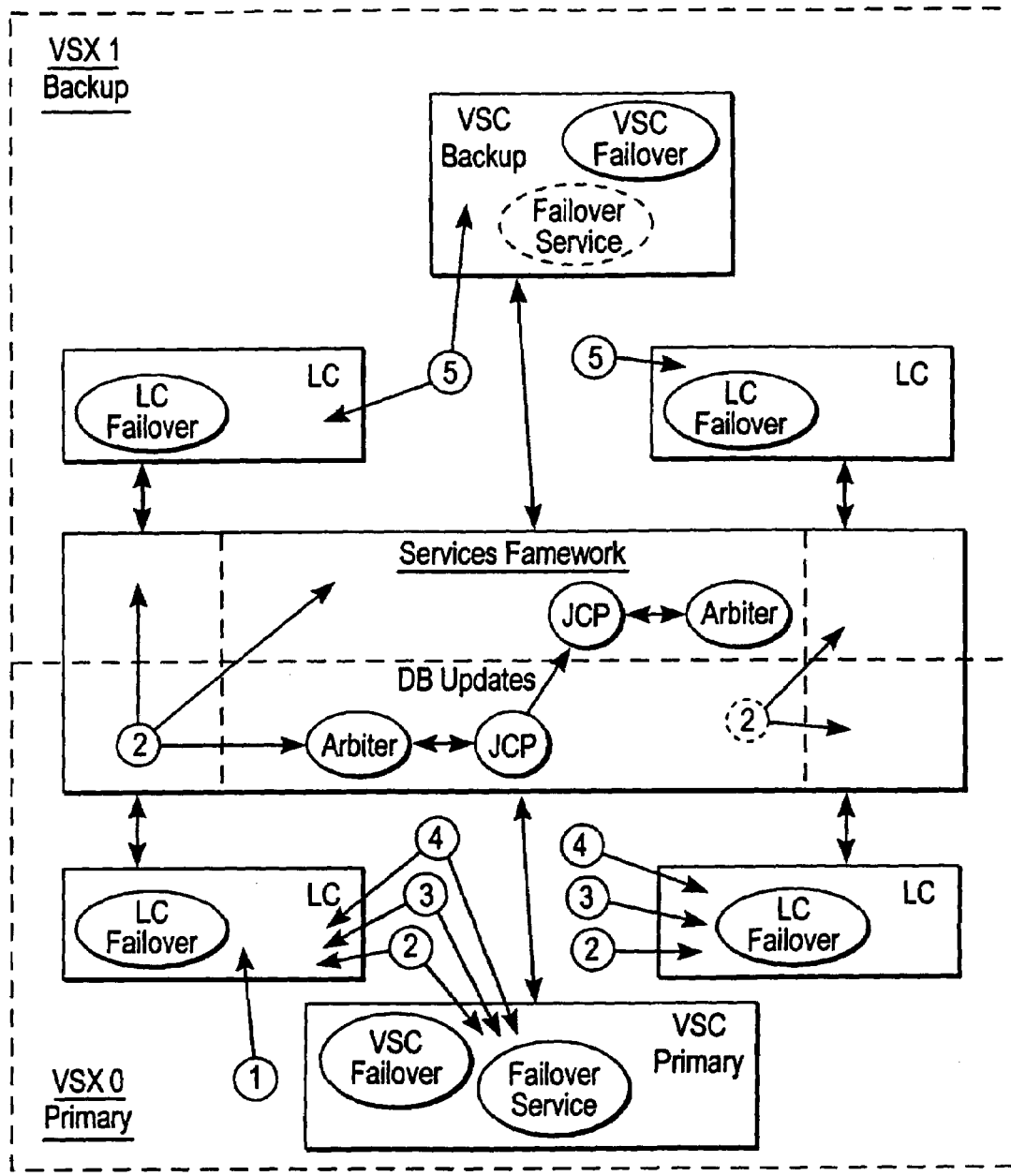
1. LC Crashes (Host Processor)
2. Rest of system detects LC crash
3. Error Analysis determines IO Path fails for all devices (server and storage) on LC
4. Upstream hLUNs report CHECK CONDITION for all devices connected to ports on failed LC. RCON and FORMAT aborted, if necessary.
5. Restart RCON and FORMAT, if necessary
FIG. 33  IO Path Failover - LC Fails

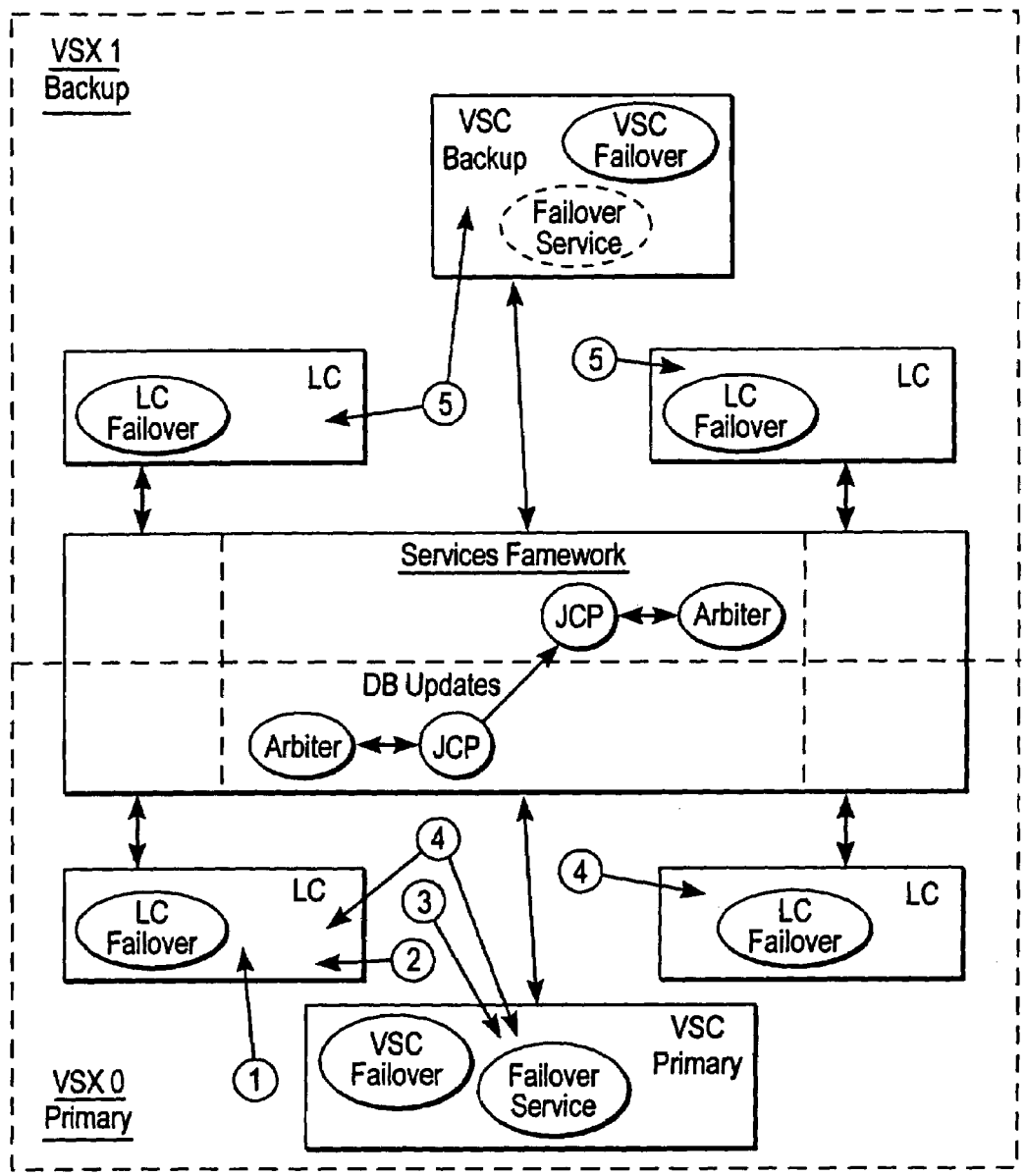
1. FC ASIC Crashes
2. LC detects FC ASIC crash
3. Error Analysis determines IO Path fails for all devices (server or storage) on FC ASIC
4. Upstream hLUNs report CHECK CONDITION for all devices connected to failed FC Ports. RCON and FORMAT aborted, if necessary.
5. Restart RCON and FORMAT, if necessary
FIG. 34   IO Path Failover - FC Port Fails

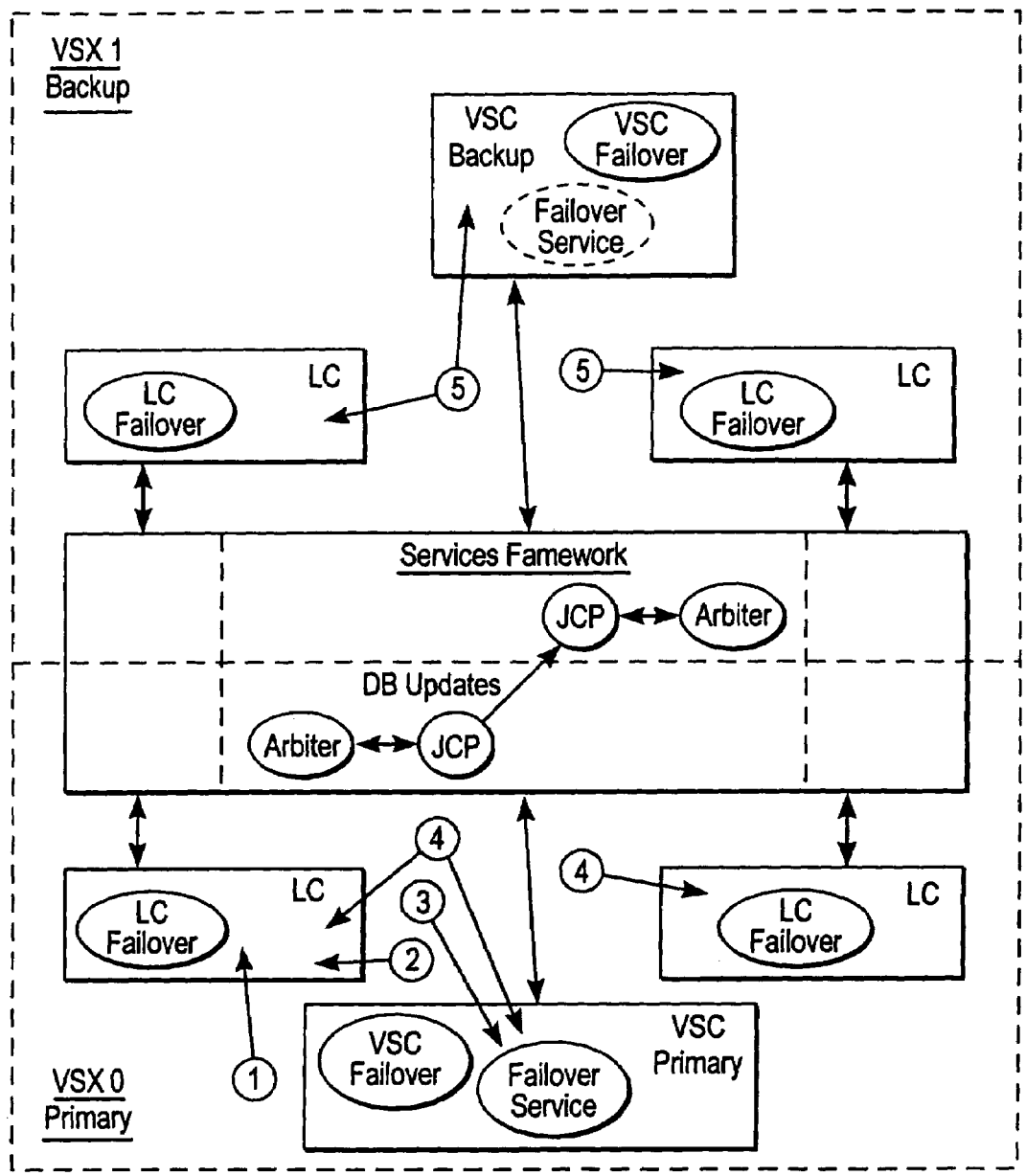
1. Link down on port
2. LC detects FC Port link down
3. Error Analysis determines IO Path fails for all devices (server or storage) on FC Port
4. Upstream hLUNs report CHECK CONDITION for all devices connected to FC Port. RCON and FORMAT aborted, if necessary.
5. Restart RCON and FORMAT, if necessary
FIG. 35  IO Path Failover - Link Down

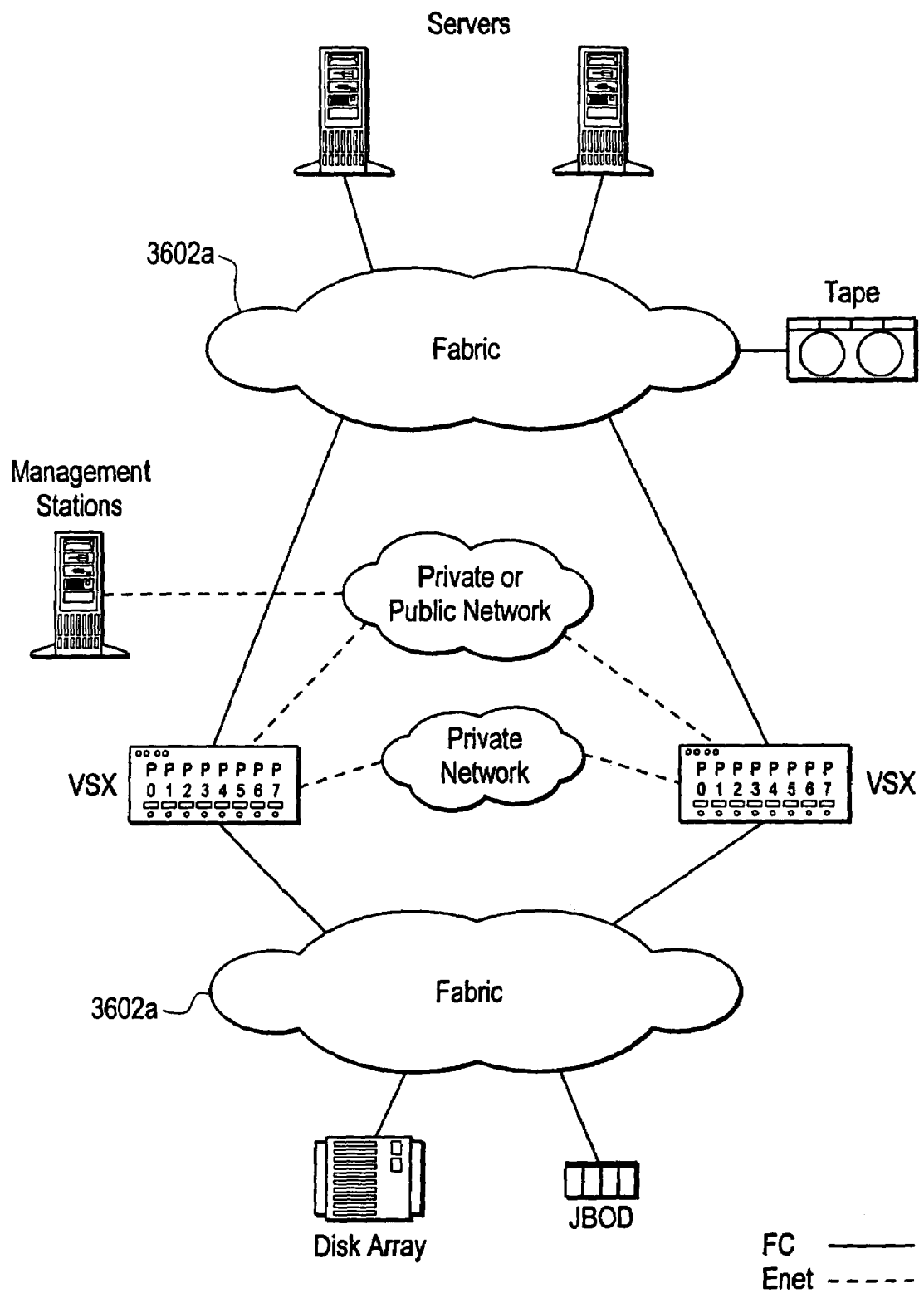
FIG. 36A Physical Setup for VSX-HA — Variation 1

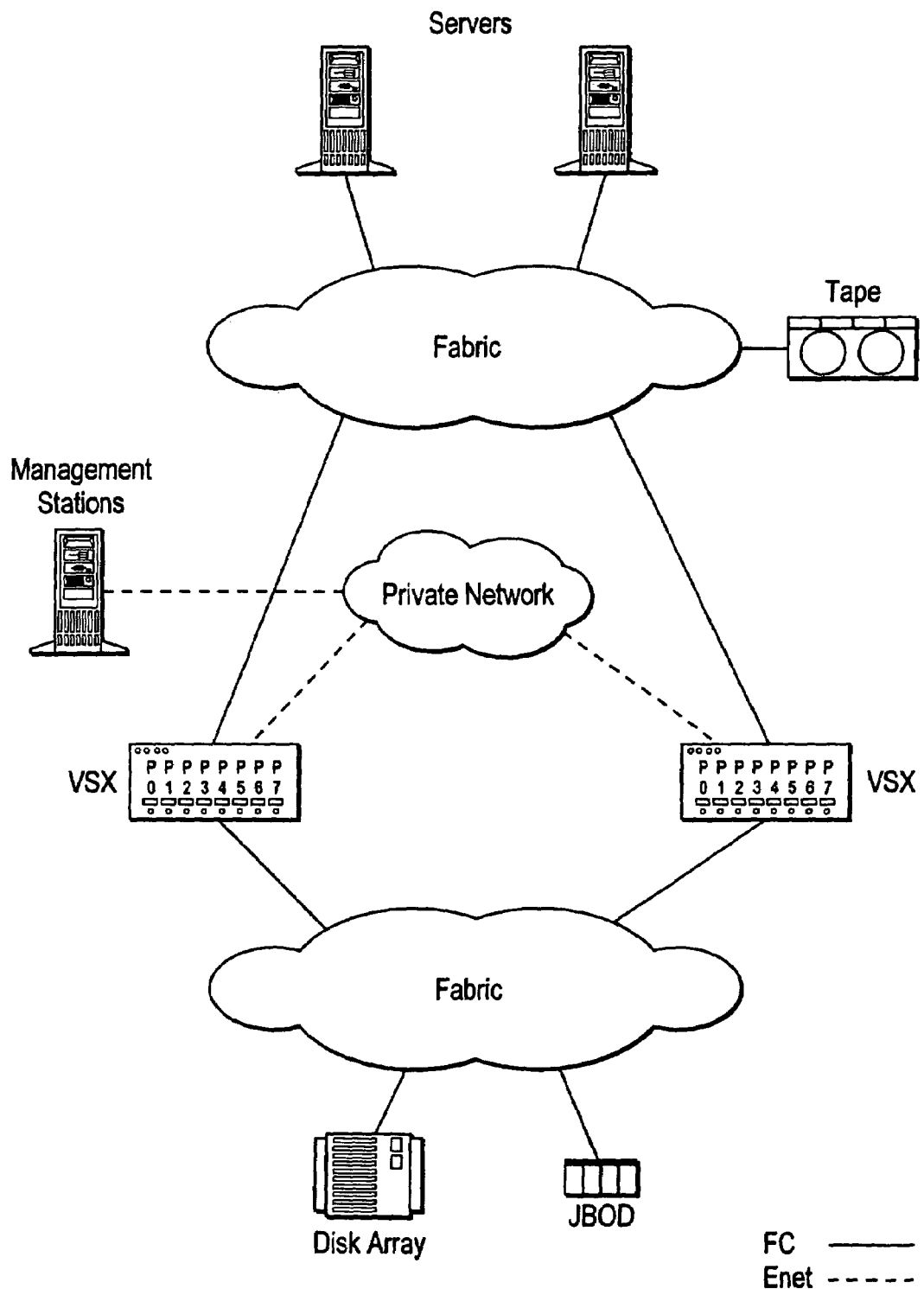
FIG. 36B  Physical Setup for VSX-HA — Variation 2

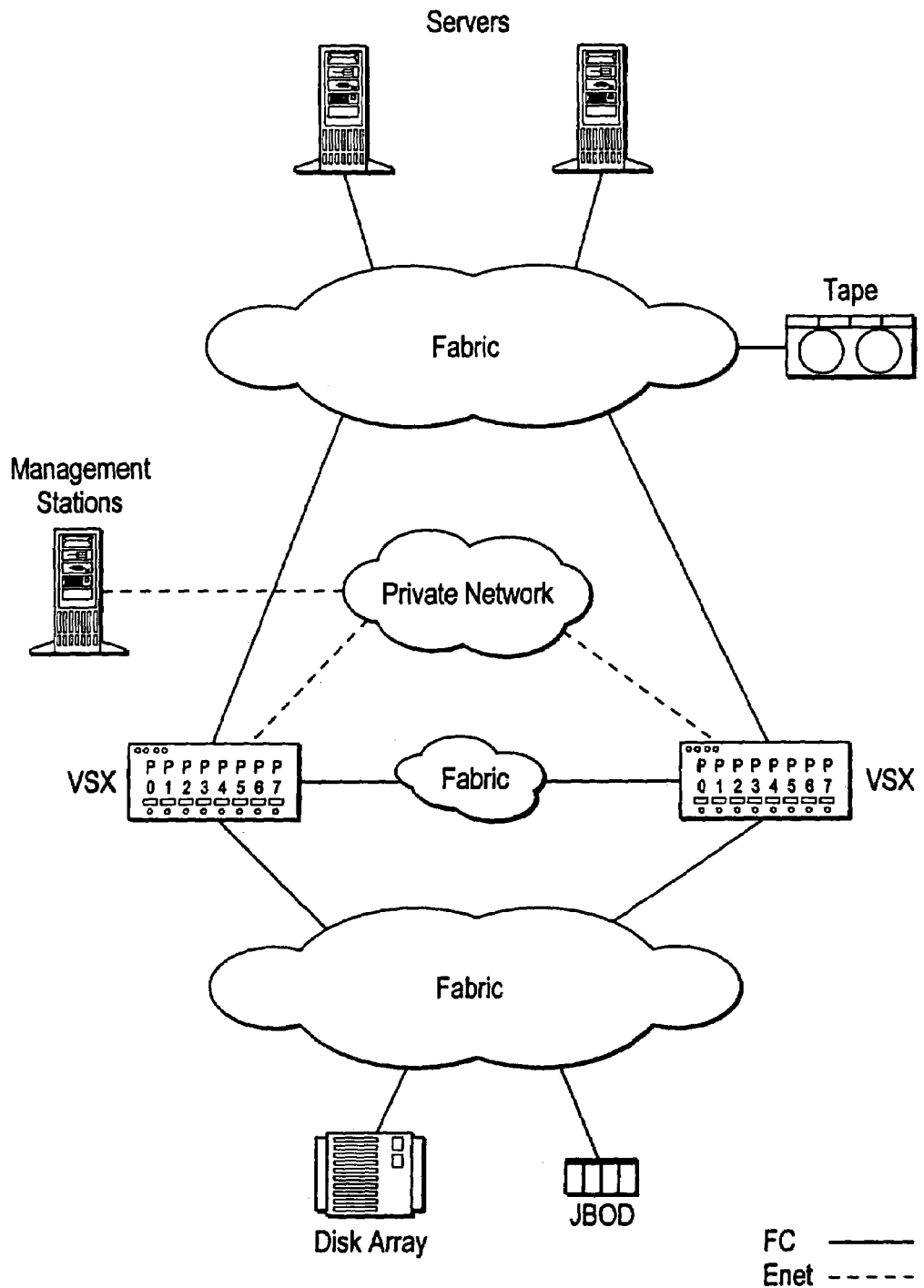
FIG. 36C  Physical Setup for VSX-HA — Variation 3

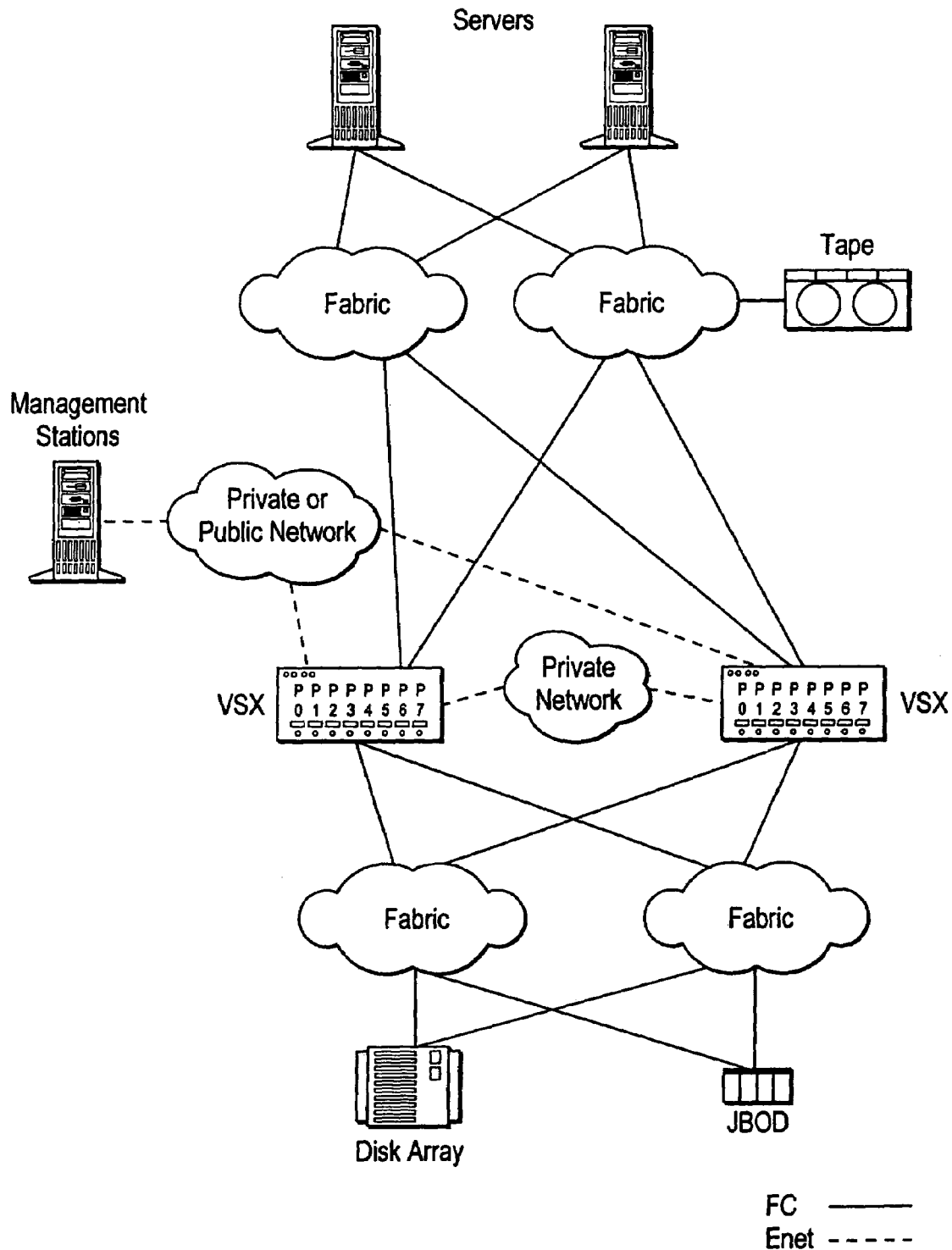
FIG. 36D  Physical Setup for VSX-HA — Variation 4

FAILOVER PROCESSING IN A STORAGE SYSTEM

CROSS-REFERENCES TO RELATED APPLICATIONS

This is a continuation of U.S. patent application Ser. No. 10/076,906, filed on Feb. 13, 2002 and entitled, "Failover Processing in a Storage System," which claims the benefit of U.S. provisional patent application No. 60/268,694, filed on Feb. 13, 2001 and entitled "Virtual Storage Systems," both of which are incorporated herein by reference.

FIELD OF THE INVENTION

The present invention relates generally to failover in a storage area network and, more particularly, to in-band virtualization devices arranged in a cluster.

BACKGROUND

Knowledge is an important competitive advantage for any business. The drive to develop knowledge stores and improve storage hardware capacity leads to explosive growth in storage and computing resources. As a consequence of businesses depending increasingly on applications and their underlying data, continuous, reliable, and rapid access to data becomes critical. It is important to be able to guarantee online access and quick restores of lost data. Mass storage systems are becoming increasingly complex as developments in storage technology continue to meet the demands of the market.

It is necessary to assure reliability and maintain availability of storage systems.

SUMMARY OF THE INVENTION

Embodiments of a storage server system in accordance with the present invention provide user-configurable levels of fault tolerance and high availability using policy-based management software. Failover software in the storage server system uses policies for managing fault tolerant (FT) and high availability (HA) configurations called Failover Sets.

A Failover Set imposes an organization upon a collection of components in order to provide a configuration, which contains characteristics not necessarily present in a single component. The collection, or set, can be organized in a variety of ways and tuned to emphasize various features of the components such as reliability and/or availability.

An individual component is a named entity with a single type of organization. There may be several components under the control of a single Failover Configuration. It is in this context the component is referred to as a Member. A member can be a single resource such as a port or a card in a chassis. A member can also be a complex hierarchy of physical components such as several boxes in a stack, or an entire chassis. In the most general case, a member can be another Failover Set.

The Member Composition of a Failover Set understands the way that the Members are combined. For example, a hierarchical composition enables combining failover within a network storage server system as well as outside a network storage server system. The Composition consists of the rules pertaining to the way that the Set is built from underlying network storage server systems or Failover Sets. The Member Units identify the components that participate.

Members in a Failover Set play a Primary, Backup, or Alternate Role. Within Failover Sets, there is only one Primary Member and one Backup Member. There can be any number of Alternate Members. When the Primary Member is lost, failover occurs, and the Backup Member becomes the new Primary Member. A new Backup Member is elected from the set of Alternates. When the Backup Member fails, a new Backup Member is selected from the set of Alternate Backup Members. When the Alternate fails, error reporting is triggered.

Failover software employs a rules-based engine in order to provide policy management. Rules are established for Member configuration, Member compatibility, Member fault detection and agreement, corrective actions for Member faults, Member restart, replication of configuration data across all Members, elective Member failover, Member resource management, and the Failover Set Fail-Stop policy encapsulates the knowledge of failover recovery between components within a storage system and between storage systems. This knowledge includes information about what components are participating in the Failover Set, how they are configured for failover, what is the Fail-Stop policy, and what are the steps to perform when "failing-over" a component. A Fail-Stop policy is the policy by which a component, in response to a failure, changes to a state that permits other components to detect that a failure has occurred and then stops.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 1 shows a high level diagram of an error recovery architecture in accordance with an embodiment of the present invention;

FIG. 2 illustrates a general block diagram of a non-fault tolerant configuration;

FIG. 3 illustrates a general block diagram of a fault tolerant configuration in accordance with embodiments of the present invention;

FIG. 4 shows a general block diagram of a high availability configuration in accordance with embodiment of the present invention;

FIG. 5 illustrates the components of a failover set;

FIG. 6 shows a member unit state transition diagram;

FIG. 7 illustrates typical processing according to an embodiment of the present invention to create a failover set;

FIG. 8 shows a member state diagram;

FIG. 9 illustrates an arbitration sequence for a cold boot;

FIG. 10 illustrates an arbitration sequence for a warm boot;

FIG. 11 illustrates an arbitration sequence for a mixed boot;

FIG. 12 shows a 2-member state transition diagram in accordance with an embodiment of the present invention;

FIG. 13 shows the actions of the state transition diagram of FIG. 12;

FIG. 14 shows a served failover set state machine;

FIG. 15 illustrates a general block diagram of fault detection and analysis in accordance with embodiments of the present invention;

FIG. 16 illustrates an example of the heartbeat algorithm in a no fault situation;

FIG. 17 illustrates an example of the heartbeat algorithm in a transmitter-fault situation;

FIG. 18 illustrates an example of the heartbeat algorithm in another transmitter-fault situation;

FIG. 19 illustrates an example of the heartbeat algorithm in a receiver-fault situation;

FIG. 20 illustrates an example of the heartbeat algorithm in another receiver-fault situation;

FIG. 21A shows a general block diagram of a failover service architecture in accordance with an embodiment of the present invention;

FIG. 21B shows general block diagram of services framework processing;

FIG. 22 illustrates a general block diagram for an arbiter of the database;

FIG. 23 illustrates a shared link configuration;

FIG. 24 shows typical message passing between VSXs in accordance with embodiments of the present invention;

FIG. 25 show a management link configuration;

FIG. 26 illustrates a shared disk configuration;

FIG. 27 shows typical message passing between VSXs using a shared disk in accordance with embodiments of the present invention;

FIG. 28 shows node hub adapter configuration;

FIG. 29 shows a hierarchical hub adapter configuration;

FIG. 30 shows an N+1 node configuration;

FIG. 31 shows an N node configuration;

FIG. 32 shows typical failover processing of a failed primary, according to an embodiment of the present invention;

FIG. 33 shows typical failover processing of a failed LC, according to an embodiment of the present invention;

FIG. 34 shows typical failover processing of a failed Fibre Channel (FC), according to an embodiment of the present invention;

FIG. 35 shows typical failover processing in a link down condition, according to an embodiment of the present invention;

FIGS. 36A-36D illustrate typical configurations of a storage server system according to embodiments of the present invention.

DETAILED DESCRIPTION

Figure 36:
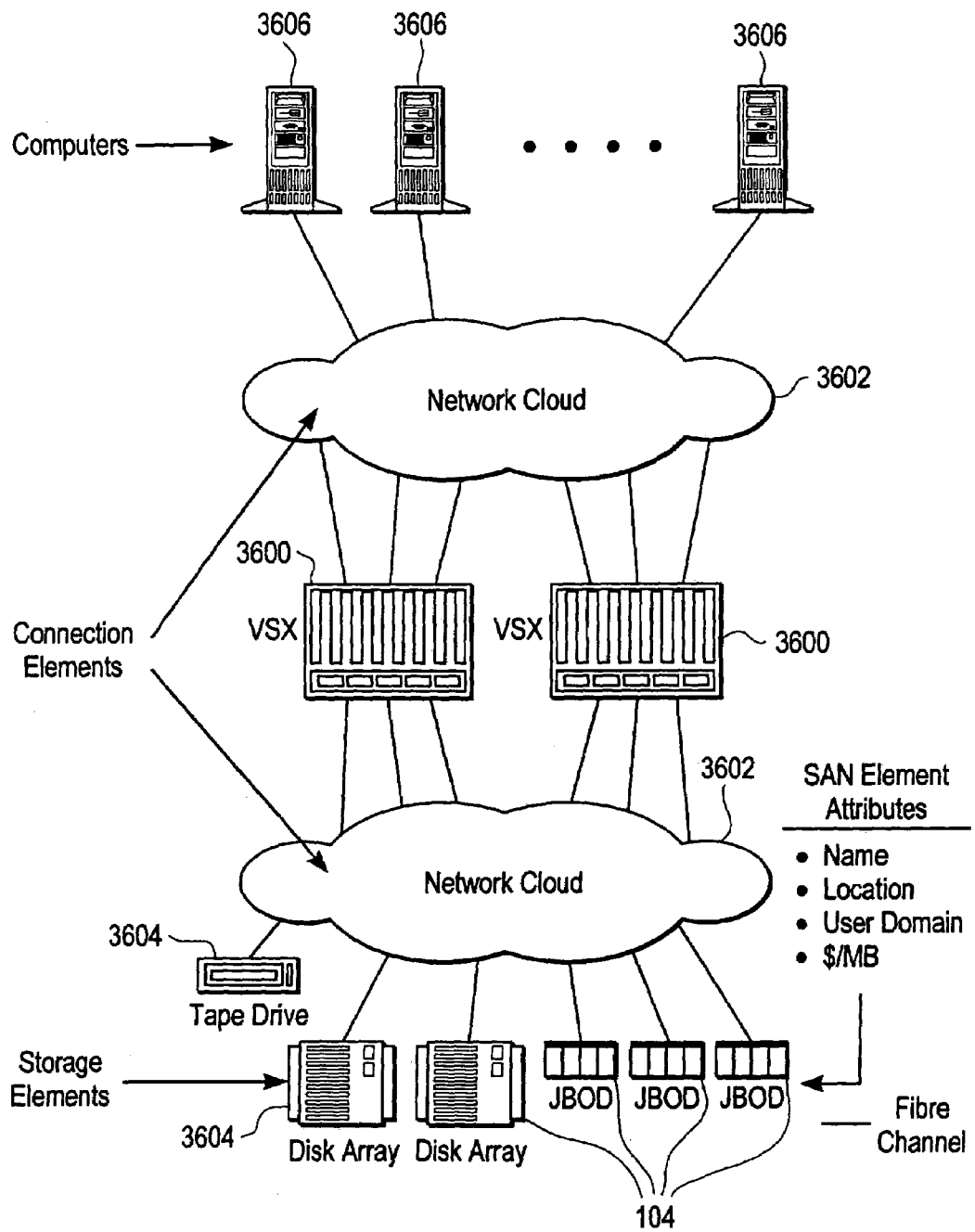
FIG. 36 shows a high level system architecture of a storage server system in accordance with an embodiment of the present invention.

FIG. 36 shows a generalized block diagram of an embodiment of a storage area network (SAN) in accordance with the present invention. The SAN includes one or more storage servers 3600. The figure also shows communication networks (switching fabrics) 3602, a number of physical storage devices 3604, and a number of host computers 3606. The storage server 3600 is also referred to as a Virtual Storage Exchange (VSX) and is further detailed in FIG. 37. The primary function of VSX is to centralize the management layer in the SAN. VSX organizes the connections, storage elements, and computer systems into abstract relationships in order to facilitate secure and robust data transfer. This device is referred to as an in-band virtualization device. In-band virtualization devices offer functions or services that are in the data path. In a system that implements in-band virtualization, virtualization services such as address mapping are performed by the same functional components used to read or write data.

The physical storage devices 3604 include tape drives, disk arrays, JBODs ("just a bunch of disks"), or other types of data storage devices. The physical storage devices 3604 can be connected directly to the host computers 3606 via the SAN 3602 or can be indirectly connected to the host computers 3606 via the SAN 3602 and the storage server 3600. It has been observed that management of storage virtualization is burdensome when the storage devices 3604 are directly connected to the host computers 3606 via the SAN 3602. The present invention improves management of storage virtualization by using the storage server 3600 to indirectly connect the storage devices 3604 to the host computers 3606.

FIG. 36A shows a typical configuration in which two VSXs are cabled together for high availability (VSX-HA) operation. There are several variations of such a configuration. In FIG. 36A, the VSXs are connected together using a private network. A Fibre Channel connection between the VSXs and the host computers (e.g., servers) uses the customer's fabric 3602A. A management station is connected to the VSX via an Ethernet connection using a public or a private network.

FIG. 36B shows a similar configuration, except that the management station is connected to the VSX using the same network that connects the VSXs together.

The configuration of FIG. 36C shows a management station connected via a private network to the VSX. However, the VSXs are connected to each other using a point-to-point Fibre Channel, or a Fibre Channel switch fabric.

The configuration of FIG. 36D is similar to the configuration of FIG. 36A except that the fabrics are separated into redundant fabrics. The storage devices and the computer servers are dual-ported.

Figure 37:
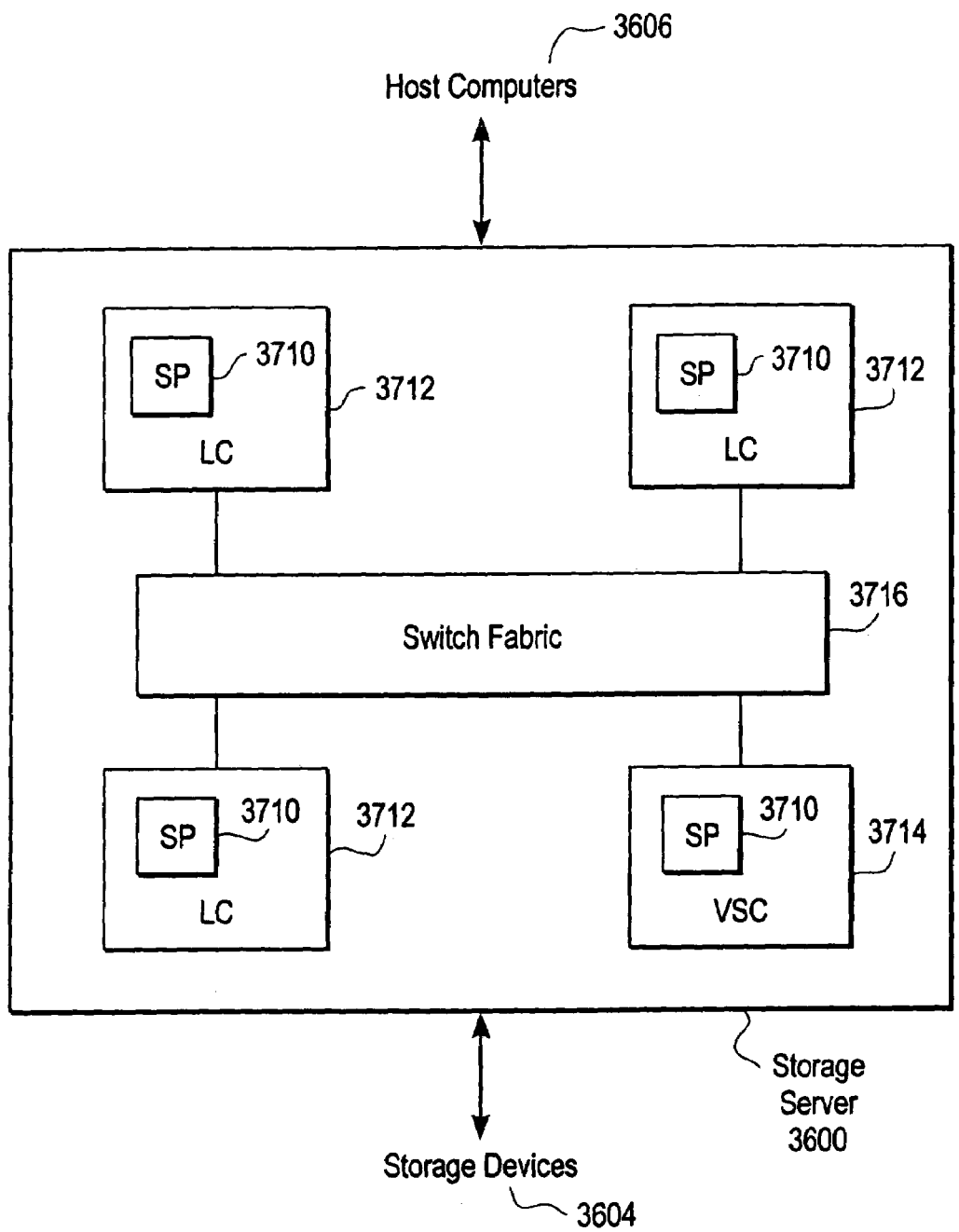
FIG. 37 shows additional detail of components of FIG. 36.

FIG. 37 is a generalized block diagram of the storage server 3600 showing the hardware components related to embodiments of the present invention, including a storage processor 3710, a line card 3712, a virtual server card 3714, and a switch fabric 3716.

The storage server 3600 may include one or more storage processors 3710 (SP). The storage processors 3710 process the storage commands and data to be stored as information flows between the host computers 3606 and the storage devices 3604. One or more of the storage processors 3710 may be included on each line card 3712 (LC). The storage server 3600 includes space for numerous line cards 3712, so the capabilities of the storage server 3600 can be modularly increased by adding more line cards 3712 or more storage processors 3710. Each storage processor 3710 is associated with one or more ports of the storage server 3600.

The storage server 3600 may include one or more virtual server cards 3714 (VSC). The virtual server cards control the operation of the storage server 3600 and control the line cards 3712, which perform the actual work of transferring commands and data.

The switch fabric 3716 connects the storage processors 3710. The switch fabric switches information received at one port to another port of the storage server 3600. For example, when a host computer 3606 wants to read data stored on the storage area network 3602, its request is processed by the storage processor 3710 associated with the port associated with that host computer 3606. That storage processor 3710 is referred to as the upstream storage processor 3710. The upstream storage processor 3710 communicates with a downstream storage processor 3710 associated with the port associated with the storage device 3604 storing the data to be read, via the switch fabric 3716. Then the switch fabric 3716 transfers the data read from the storage device to the host computer 3606, via the downstream and upstream storage processors 3710.

Additional details of the storage sever 3600 are disclosed in U.S. provisional patent application No. 60/268,694 and in the following co-pending, commonly owned U.S. patent applications: U.S. patent application Ser. No. 10/077,696, filed on Feb. 13, 2002 and entitled, "Silicon Based Storage Virtualization Server," U.S. patent application Ser. No. 10/076,855, filed on Feb. 13, 2002 and entitled, "Storage Virtualization and Storage Management to Provide Higher Level Storage Services," U.S. patent application Ser. No. 10/076,909, filed on Feb. 13, 2002 and entitled, "Method and Apparatus for Identifying Storage Devices," U.S. patent application Ser. No. 10/077,482, filed on Feb. 13, 2002 and entitled, "System and Method for Policy Based Storage Provisioning and Management," U.S. patent application Ser. No. 10/077,181, filed on Feb. 13, 2002 and entitled, "Virtual Data Center," U.S. patent application Ser. No. 10/076,906, filed on Feb. 13, 2002 and entitled, "Failover Processing in a Storage System," U.S. patent application Ser. No. 10/077,199, filed on Feb. 13, 2002 and entitled, "RAID at Wire Speed," and U.S. patent application Ser. No. 10/076,878, filed on Feb. 13, 2002 and entitled, "Method for Device Security in a Heterogeneous Storage Network Environment," all of which are herein incorporated by reference for all purposes.

Following is a discussion of the failover handling in accordance the foregoing described illustrative embodiment of the invention.

Error Recovery

Failover is the recovery action taken when a redundant component is removed from service. Failover can be voluntary, as in the case of a live code update, or involuntary, as in the case of a hardware failure. Generally, the user is responsible for initiating voluntary failover. Voluntary failover is an orderly operation. In contrast, involuntary failover is sudden, and is always internally initiated by the storage system software.

Involuntary failover is a recovery action that occurs within a larger context of error recovery and recovery management. The Failover Service provides an infrastructure to manage the objects that can fail-over, how they are configured for failover, the steps to take when a failover occurs, and what constitutes a "failover-able" event. The decision to recover from an error by "failing-over" is the result of error analysis.

For the purpose of Error Recovery, a Resource is defined to be an entity that is capable of error tracking, error analysis, error statistics collection, and error recovery. In general, a resource is a hardware object, but a resource can also be a software construct, such as a RAID group. The resource manager is responsible for defining the error types and recovery actions for its managed resources.

Error collection is loosely layered software found throughout the entire VSX. It provides a standard mechanism for collecting error events from the various software layers and routing the events to the resource manager. The resource manager requests help from Error Analysis to decide what to do with error events.

Error Analysis records the error event and its associated data and starts an Error Recovery Sequence. An Error Recovery Sequence is defined to be a sequence of error codes and corrective actions, such that, if error code, e1 causes recovery action, a1, at time t1, which then causes another error code e2, with recovery action a2, at time t2, then t1<t2, and t1 occurs before t2 in time. The sequence is ended when a recovery action completes successfully. If the recovery action is unsuccessful, the sequence goes to the next level of error recovery and attempts a more drastic recovery. Nested recoveries are limited by the underlying fault tolerance of the resource. When all recovery actions have been unsuccessful for a given error the sequence terminates with a Fail-Stop paradigm.

Errors are recorded as a statistic for a given resource. The reliability Rating of a hardware resource can be calculated based on the error statistics. Error Analysis can use thresholds with which to initiate a recovery action only after the occurrence of an error for a certain number of times Within a time interval. Error Analysis uses an Error Recovery Table to determine the recovery action for a given error code and Error Recovery Sequence. An Error Recovery Table can be used by more than one resource.

Recovery Management is a repository of corrective actions. It synchronizes corrective action requests so that conflicting corrective actions are resolved or serialized. The corrective action operations contain the resource-specific procedure to use to recover from a given Error Recovery Sequence. One corrective action can be used by many error recovery sequences.

Error Reporting encompasses the logging of errors into the customer Log, the generating of SNMP Traps, and the setting of Alarms. Error reporting is based on error analysis, and brings an error to the attention of the user.

Finally, the Resource Manager is responsible for changing the state or status of a resource, based on the outcome of the corrective action. The Error Analysis and Recovery Management Architecture is shown in FIG. 1—Error Recovery Architecture.

Fault Tolerance and High Availability

Each VSX model can be configured to provide certain levels of fault tolerance. Redundancy at the Virtual Storage Controller (VSC), Line Card (LC), Switch Fabric (SF), Storage Processor (SP), or Fibre Channel port means a longer time before the VSX as a whole can fail. Duplication of components within the VSX improves the VSXs overall Mean Time Between Failure (MTBF). Such configurations are fault-tolerant (FT) because they allow the VSX to operate correctly even with the loss of some of its components. However, such configurations do not provide high availability, only greater reliability. If there were a fire on a rack, data availability would be lost. To continue data availability under this circumstance requires additional VSXs configured to work as a highly available set.

Most enterprise class storage configurations that are being used today need high levels of availability. Because of this demand, the base VSX system requires a number of features that help to eliminate single points of failure. The High Availability (HA) VSX configuration features hardware and software redundancy, which provides added protection against catastrophic failures not found with the single VSX. Several configurations are possible when organizing VSXs into High Availability (HA) sets. These include 2-Node, 4-Node, N+1 Node, and N-Node HA sets.

The Failover Service plays an important role in providing both fault tolerance (FT) and high availability (HA). It encapsulates the knowledge of failover recovery between components within a VSX and between VSXs themselves. This knowledge includes information about what components are participating in the Failover Set, how they are configured for failover, what is the Fail-Stop policy, and what are the steps to perform when "failing-over" a component.

For example, a "Director" model VSX has eight Line Cards. Each Line Card is configured for redundancy so that the loss of any one Line Cards results in a "failover" to the partner Line Card. The "Director" architecture is chassis-based, where all eight cards occupy a slot within the chassis.

In another example, a stacked-based VSX comprises one or more boxes connected together using a network, such as Fibre Channel or InfiniBand. The boxes are combined into a logical "chassis" such that one or more boxes function in exactly the same way as a chassis-based model. In a stackable architecture, the VSC is in a box and each LC is in a box.

The following table summarizes the difference between fault tolerance and high availability as applies to the VSX architecture:

| Duplicated Component | Failure Characteristics |
|---|---|
| VSX | Provides High Availability |
| Virtual Storage Controller | Provides Fault Tolerance |
| Line Card | Provides Fault Tolerance |
| Switch Fabric | Provides Fault Tolerance |
| Storage Processor | Provides Fault Tolerance |
| Fibre Channel Port | Provides Fault Tolerance |

The Failover Service's main responsibility is to maintain data availability within a set of redundant components. Data availability is defined to be the ability for a Server to access its storage when needed. For VSX, this requires a means by which two or more components can arrive at exact mutual agreement on the following information:

Aspect1. When a failover can and cannot occur

Aspect2. What conditions will cause a failover

Aspect3. What resources are owned by each component

No explicit assumptions are made for the behavior of a faulty component. A failed component can do anything it likes. It can behave very strangely. It can alter information relayed through itself. It can block such information being relayed. It can incorrectly route the information. And, in the worst case, it can send conflicting information to different parts of the system.

Obviously, some limit is needed on the number of faults a VSX can tolerate. Upper bounds on fault tolerance are necessary in the formulation of all fault-tolerant systems. Otherwise, the cost of such a system would be prohibitive as component upon component is duplicated. In terms of hardware component errors, the upper bound on any one board is assumed to be one. If a 2-Member Failover Set contains more than one hardware error on each component, it no longer matters what component is used. The Fail-Stop policy should be applied.

To satisfy the need for agreement in design aspects 1-3 above the following strategies were adopted:

Aspect1. For deciding when a failover can or cannot occur:
  A failover can only occur when a component is a valid Member of a Failover Set.

Aspect2. When detecting what conditions will cause a failover:
  Event reports that use thresholds can request a failover.
  Functional code (e.g., device drivers) that can detect faulty hardware can request a failover.
  Heartbeat protocol failures can request a failover.

Aspect3. For deciding what resources are owned by each member:
  The Member state machine will determine the resource ownership.

Objectives

The objectives of the Failover Service are to achieve interactive consistency in design aspects 1-3 mentioned in the previous section made up of the following two general conditions:

1. Consistency. Every correctly functioning component agrees on exactly the same information.

2. Meaningfulness. The information corresponding to a correctly functioning component shall be the actual information of that component.

Condition 1 and 2 need not reveal which component is faulty. They allow the non-faulty components to come to a consistent view of the information held by all other members in the failover Set. Once interactive consistency has been reached, each non-faulty member can apply a decision function to the information. Since each non-faulty member applies the decision function to the same information, an exact agreement is necessarily reached.

Supported Configurations

This section will describe the various supported configurations for failover. NOTE: These diagrams are meant to be instructive only. In general, any alarm raised on a component causes another alarm to be flagged on the containing component.

Basic with No Failover Support

FIG. 2 shows a general block diagram of a lowest-availability configuration. The only redundancy provided by this configuration is protection against disk failure via RAID algorithms.

TABLE 1

Data Availability is a non-Fault Tolerant Configuration

| Failing Component | Continued Data Availability | Recovery Steps |
|---|---|---|
| VSX | No | VSX is down. One VSC, LC, PS, or SF failure causes a VSX failure. After field service replaces failed component, data availability is restored. |
| External Disk | Yes | GUI reports failed disk. VSX rebuilds data onto spare disk (assume RAID). User or field service replaces the disk promptly. |
| VSC | No | VSX is down. After user or field service replaces VSC, data availability is restored. |
| LC | No | VSX is down. After user or field service replaces VSC, data availability is restored. |
| SF | No | VSX is down. Data availability is restored after field service replaces switch fabric. |
| SP on VSC | Yes | SP is down, but data availability is unaffected. User or field service replaces VSC. |
| SP on LC | No | SP is down. After user or field service replaces LC, data availability is restored. |
| FC Port on SP | No | FC Port is down. After user or field service replaces card, data availability is restored. |
| Power Supply | No | User or field service replaces failed power supply. Availability is restored. |
| Fan Module | Yes | System is not impacted until over-temperature is reached. |
| Host FC Adapter | No | Data access is lost. Host computer system must be serviced. |
| Host FC Port | No | Data access is lost. Host computer system must be serviced. |
| Storage FC Adapter | No | Data access is lost. Storage system must be serviced. |
| Storage FC Port | No | Data access is lost. Storage system must be serviced. |
| FC Cable | No | Data access is lost. Cable must be serviced. |

Single Host, Single Storage, Single VSX, Multi-Pathing

FIG. 3 illustrates a configuration that builds on the "Basic Configuration" illustrated in FIG. 2 by adding multi-pathing on both the upstream and downstream ports. If a path fails, the data is available via the redundant path.

TABLE 2

Data Availability in a Fault Tolerant Configuration

| Failing Component | Continued Data Availability | Recovery Steps |
|---|---|---|
| VSX | No | VSX is down. At least two VSX components of the same type have failed. After field service replaces failed component, data availability is restored. |
| External Disk | Yes | GUI reports failed disk. VSX rebuilds data onto spare disk (assume RAID). User or field service replaces the disk promptly. |
| VSC | Yes | Data availability is maintained through VSC failover. Field service replaces VSC. |
| LC | Yes | Data availability is maintained through multi-path policy. Field service replaces LC. |
| SF | Yes | Data availability is maintained by failing over to the standby switch fabric. Field service replaces the failed switch fabric. |
| SP on VSC | Yes | SP is down. Data availability is unaffected due to VSC failover. Field service replaces VSC. |
| SP on LC | Yes | SP is down. Data availability is maintained using a multi-path policy. Field service replaces LC. |
| FC Port on SP | Yes | Data availability is maintained using one of the following multi-path policies:<br>1. Impersonation - Surviving port assumes identity of the failed port, and any LUNs failover to the surviving port. Data is served to the host system after port and process login.<br>2. Active/Active - The Host knows of an alternate path to the LUNs because the LUNs are multi-ported. One path is failed and the alternate path is used.<br>3. Active/Passive Host Directed - This is also referred to as "Preferred Path". The Host knows of both paths to the storage, but only one path us used at any one time.<br>4. Active/Passive Storage Directed - The Host knows of the alternate path and requests a failover of the VSX. The VSX fails over the LUNs to the alternate path. The Host restarts any I/Os in progress. GUI reports that port has failed. User or field service replaces the failed VSC. |
| Power Supply | Yes | User or field service replaces failed power supply. Availability is restored. |
| Fan Module | Yes | System is not impacted until over-temperature is reached. |
| Host FC Adapter | Yes | Data access is maintained using one of the multi-port policies. Host computer system must be serviced. |
| Host FC Port | Yes | Data access is maintained using one of the multi-port policies. Host computer system must be serviced. |
| Storage FC Adapter | Yes | Data access is maintained using one of the multi-port policies. Storage system must be serviced. |
| Storage FC Port | Yes | Data access is maintained using one of the multi-port policies. Storage system must be serviced. |
| FC Cable | Yes | Data access is maintained using one of the multi-port policies. The user or field service replaces the cable. |
| Hub or Switch | Yes | If one hub or switch is used data access is lost. Hub or switch must be serviced before data will be available again. |

Single Host, Single Storage, Dual Adapter, Dual VSX

The configuration shown in FIG. 4 builds on the "Basic Configuration" by adding another VSX for high availability. If the VSX fails, the data is available via the redundant VSX. The configuration shown in FIG. 4 features hardware and software redundancy, which provides added protection against catastrophic failures not found with the single VSX. Several configurations are possible when organizing VSXs into high availability sets. These include 2-Node, 4-Node, N+1 Node, and N-Node. Customers can select the amount of availability they want by simply selecting the number of VSXs in the HA configuration.

The clustering of VSXs provides a number of benefits over independent VSXs. One important benefit is that cluster software, which is run on each of the VSXs in a cluster, automatically detects application failures or the failure of another VSX in the cluster. Upon detection of such failures, failed applications and the like can be terminated and restarted on a surviving VSX.

Other benefits include the ability for administrators to inspect the status of cluster resources, and accordingly balance workloads among different VSXs in the cluster to improve performance. Dynamic load balancing is also available. Such manageability also provides administrators with the ability to update one VSX in a cluster without taking important data and server applications offline. As can be appreciated, VSX clusters are used in critical database management, file and intranet data sharing, messaging, general business applications and the like.

Thus, the failover of an application from one VSX to another in the cluster may be automatic in response to a software or hardware failure on the first VSX, or alternatively may be manually initiated by an administrator. Manual failover permits live servicing of equipment, thereby eliminating downtime.

TABLE 3

Data Availability in a High Availability Configuration

| Failing Component | Continued Data Availability | Recovery Steps |
|---|---|---|
| VSX | Yes | VSX is down. VSX HA software fails over the VSX. After field service replaces the failed components, data availability is restored. |
| External Disk | Yes | GUI reports failed disk. VSX rebuilds data onto spare disk (assume RAID). User or field service replaces the disk promptly. |
| VSC | Yes | Data availability is maintained through VSC failover. Field service replaces VSC. |
| LC | Yes | Data availability is maintained through multi-path policy. Field service replaces LC. |
| SF | Yes | Data availability is maintained by failing over to the standby switch fabric. Field service replaces the failed switch fabric. |
| SP on VSC | Yes | SP is down. Data availability is unaffected due to VSC failover. Field service replaces VSC. |
| SP on LC | Yes | SP is down. Data availability is maintained using a multi-path policy. Field service replaces LC. |
| FC Port on SP | Yes | Data availability is maintained using one of the following multi-path policies:<br>1. Impersonation - Surviving port assumes identity of the failed port, and any LUNs failover to the surviving port. Data is served to the host system after port and process login. |

TABLE 3-continued

Data Availability in a High Availability Configuration

| Failing Component | Continued Data Availability | Recovery Steps |
|---|---|---|
| | | 2. Active/Active - The Host knows of an alternate path to the LUNs because the LUNs are multi-ported. One path is failed and the alternate path is used. |
| | | 3. Active/Passive Host Directed - This is also referred to as "Preferred Path". The Host knows of both paths to the storage, but only one path us used at any one time. |
| | | 4. Active/Passive Storage Directed - The Host knows of the alternate path and requests a failover of the VSX. The VSX fails over the LUNs to the alternate path. The Host restarts any I/Os in progress. GUI reports that port has failed. User or field service replaces the failed VSC. NOTE: The VSX is the Host for downstream multi-pathing. |
| Power Supply | Yes | User or field service replaces failed power supply. Availability is restored. |
| Fan Module | Yes | System is not impacted until over-temperature is reached. |
| Host FC Adapter | Yes | Data access is maintained using one of the multi-port policies. Host computer system must be serviced. |
| Host FC Port | Yes | Data access is maintained using one of the multi-port policies. Host computer system must be serviced. |
| Storage FC Adapter | Yes | Data access is maintained using one of the multi-port policies. Storage system must be serviced. |
| Storage FC Port | Yes | Data access is maintained using one of the multi-port policies. Storage system must be serviced. |
| FC Cable | Yes | Data access is maintained using one of the multi-port policies. The user or field service replaces the cable. |
| Hub or Switch | Yes | If one hub or switch is used data access is lost. Hub or switch must be serviced before data will be available again. |

Failover Service Architecture

The Failover Service architecture is made up of a Service's Framework, a virtual service, a local service on each card, an Arbiter, and a database Journal Control Process. A sample 2-Way Hierarchical composition is show in FIG. 21A.

Services Framework

The architecture illustrated in FIG. 21A shows a Services Framework element. Referring to FIG. 21B, the Services Framework is in essence a software bus that glues together all VSX services into a single homogenous environment potentially distributed across several processors, cards, and VSX systems. Instances of the framework execute on top of the OS at every logical location (processor, card, VSX) within the environment, as depicted in FIG. 21B and glue multiple distributed pieces together.

The framework provides the following functionality:

A robust module injection/ejection scheme allows new services to be integrated and unused ones to be removed at compile time.

An established way to create efficient single task software modules that execute in a multitasking environment thus elevating all multitasking-related issues from the service development process. Additionally, the framework provides a means for controlling the number of services that are executed on the same task to avoid thrashing if necessary.

A system-wide standard for controlling service state orchestration sequences, facilitating boot and shutdown type of processes.

Inter-service communication mechanisms. The framework facilitates two conceptually distinct communication schemes: "Request-Reply" and "Publish-Subscribe". The former one enables service instances to invoke methods on other instances that require a reply, while the latter one enables service instances to deliver unsolicited notifications (events) to interested parties.

Fault-Tolerant Naming Service that can resolve which service can fulfill a given request at run-time. Essentially, the Naming Service provides required functionality to design both Location-bound and Location-independent services. The former type defines services whose functionality is physically bound to the location they run on, for instance a piece of hardware they manage/control, while the latter one is used to represent fault-tolerant services that can potentially execute at any location and perform service-level failover.

A system-wide standard to design and implement redundant services capable of surviving a card failure and performing a service-level failover.

A standard way to model and develop objects that can be automatically marshaled to/from the embedded database and queried for using a powerful filter-based query mechanism.

In addition to object marshaling and built-in Query support, the framework provides the Standard Event Service—a robust mechanism to auto generate events that reflect changes to a service's data model.

An IPC mechanism that enables communication between multiple logical locations (processor, card, VSX) in the framework.

Request and event flow control mechanisms that provide services with an ability to control request/event flows dynamically.

The Failover Service is responsible for the creating Failover Sets and managing Served Failover Sets. The local Failover Service runs the Member state machine. The Member state machine communicates changes made to the members in a Failover Set to the Services Framework through the Arbiter. The Arbiter interfaces with the Services Framework and JCP (Journal Control Process) to inform them of changes in the member's state and subsequent database role changes. User requests go directly to the Virtual Failover Service via the Management Service. Recovery Management requests go to the local Failover service.

The Failover Service works in combination with the Services Framework and Database software to manage VSX failover. During normal operation, the nodes (e.g., devices, communication paths, and other such components) in the HA Set offer services to clients or data paths between servers and storage devices. In the event of a planned shutdown, or failure of a node, the services that are running on this node are transferred to another node in the configuration and offered to the same client again as the same logical entity. To the client, the service appears to be identical before and after failover. During a failover, a service is not available for a brief period. After failover occurs, the Host is responsible for redirecting I/O requests to the surviving VSX member.

Failover Service

The Failover Service controls overall failover processing. The Failover Service provides the following:
1. Creates Failover Sets
2. Manages Member composition changes to Failover Set
3. Failover Coordinator
   a. Coordinates failover as a recovery action
   b. Coordinates failover as an elective operation
4. Other user interface operations including status and alarm reporting
5. Enables and Disables failover VSC Failover Service The VSC Failover Service manages the following:
1. Member Management
   a. Member Configuration
   b. Member state management
2. Starts and Stops the Heartbeat operations for VSC
3. Listens for Recovery Management events
4. Interface between Failover Service and the VSC with regard to Member role changes
   a. Instructs Arbiter to change database mode
   b. Interfaces to SPs on VSC
5. Performs Fail-Stop processing LC Failover Service The VSC Failover Service manages the following:
1. Member Management
   a. Member Configuration
   b. Member state management
2. Starts and Stops the Heartbeat operations for LC
3. Listens for Recovery Management events
4. Interface between Failover Service and the LC with regard to Member changes
   a. Interfaces to SPs on LA
5. Performs Fail-Stop processing Arbiter FIG. 22 shows an Arbiter for the database. The Arbiter must hook into the failover functionality provided by the Failover Service, and in cooperation with it, provides the arbitration service for the database via the Journal Control Process (JCP). The Arbiter is the essential component of the database Fault-Tolerant configuration because it tells the Standby when to change its status to Master and go live. The Arbiter participates in an internal Heartbeat. It reports heartbeat failures to error analysis. It is also responsible for informing the Services Framework when member state changes occur.

As mentioned above, the software module that is responsible for failover-related configuration and management functionality in the VSX is the Failover Service. The Failover Service is a Virtual Service.

Virtual Services are enabled on the Primary VSC, and disabled on the Backup and Alternate VSCs. As such, management requests always go to the Primary VSC. In contrast, I/O requests can go through any VSC or LC in the collection. As such, the I/O Path model works independent of the Management model and treats all members as active, or primary.

The Services Framework uses the Arbiter to determine when to enable or disable virtual services on a VSC. The Services Framework enables and disables virtual services based on the Member's state. When a Member is in the PRIMARY state, the virtual services are enabled on that node. When the Member is in the BACKUP or ALTERNATE state, the virtual services are disabled on that node. Whenever a Member transitions from or to the PRIMARY state, the virtual services on that Member are affected. This enabling and disabling of Virtual Services is important during services boot and during elective failover, after the VSX is operational.

The Service Framework boot should use the startup parameter block as described in the VSX Configuration Functional Specification to determine what mode to start the database. During services boot, the Services Framework is responsible for initializing and enabling all services on that location. Before that happens, the database must be started. In order to start the database the Member's state must already be determined. There's a problem here. We need to start the database in order to determine the Member's state in order to determine the database role. Consequently, the services boot must be a two-phase boot since the database requires a restart.

The Services Framework boot will examine the startup parameter block to determine if the Member's state has been arbitrated. If the state is already arbitrated, it can start the database according to the following rules:
   a) PRIMARY state means start database as Master
   b) BACKUP state means start database as Standby
   c) ALTERNATE state means start the database as Replica
Afterwards the services for that VSC location can be initialized and enabled as follows:
   a) PRIMARY state means enable virtual services
   b) BACKUP state means do not enable virtual services
   c) ALTERNATE state means do not enable virtual services If the state has not been arbitrated, then the first services boot phase will set the database mode to Master, with no fault tolerance, and then start only the VSC Failover service. The VSC Failover service will then execute the state machine in 3.8.3 following the rules in 3.8.1 to determine the Member role. After the Member's role is decided, the state must be saved into the startup parameter block as described in the VSX Configuration Functional Specification. The last step is to restart the VSC with the new parameter block.

The Framework also manages the internal Framework heartbeat. It informs Error Analysis whenever a connection to other Service Framework locations is lost.

Failover Set Management

A Failover Set imposes an organization upon a collection of like components in order to provide a configuration, which contains characteristics not necessarily present in a single component. The collection, or set, can be organized in a variety of ways and tuned to emphasize various features of the components such as reliability and availability. An individual component is a named entity with a single type of organization. There may be several components under the control of a single Failover Configuration. It is in this context the component is referred to as a Member.

A Member can be a card, such as a VSC, or it can be an entire VSX. Members in a HA Set play a Primary, Backup, or Alternate Role. Within HA and FT type Failover Sets there is only one Primary Member and one Backup Member. There can be any number of Alternate Members. When the Primary Member is lost failover occurs. The Failover service automatically switches over the Database, IO Path, and Services Framework to the new Primary Member. When the Backup Member fails, a new Backup Member is selected from the set of Alternate Backup Members. When the Alternate fails, error reporting is triggered.

All cards in the Failover Set share the same database. Database fault tolerance is configured as a Master, a redundant Standby, and a redundant Replicated database server in a cluster. The Master database is the primary system to which client applications are reading and writing. The standby database is kept up to date with the changes that occur in the Master database via the Journal Control Process (JCP). The replicated database is configured to receive updates from the Master, or the Standby. The Standby database can become the Master, if the Master fails. The Replicated database can become the Backup, should the Backup fail or should the Backup become the Master. The database is under the direction of the Failover Arbiter. Any configuration data maintained outside the database must be made part of the database in order to maintain configuration integrity.

Each VSC in the VSC population contained in a Failover Set belongs to one of three sets, Primary, Backup, and Alternate. Exactly one VSC acts as the Primary and one VSC acts as the Backup, while the remaining VSCs act as Alternates. The VSX that houses the Primary VSC is considered the Primary Member and is the database Master. The VSX that houses the Backup VSC is considered the Backup Member and is the database Backup. The VSX that houses the Alternate VSC is considered the Alternate Member and is the database Replica. If a VSX houses both the Primary and Backup VSC, it shall be considered to be the Primary Member. If more than one VSC is housed in a VSX and they are both operational, and one of the VSCs is the Primary VSC, then the other VSC shall be the Backup. If more than one VSC is housed in a VSX and they are both operational, and one of the VSCs is the Backup VSC, then the other VSC shall be a Primary or an Alternate. The decision method for determining the VSC set is a Failover function. The VSC set can be manually changed for planned maintenance and shutdown.

Virtual Services are enabled on the Primary VSC, and disabled on the Backup and Alternate VSCs. As such, management requests always go to the Primary VSC. In contrast, I/O requests can go through any VSC or LC in the collection. As such, the I/O Path model works independent of the Management model and treats all members as active, or primary.

The Failover Service works in combination with the Services Framework and the database software to manage VSX failover. During normal operation, the nodes in the HA Set offer services to clients or paths from servers to storage devices. In the event of a planned shutdown, or failure of a node, the services that are running on this node are transferred to another node in the configuration and offered to the same client again as the same logical entity. To the client, the service appears to be identical before and after failover. There is a period of time a service is not available during the failover. After failover occurs, the Host is responsible for redirecting I/O requests to the surviving VSX member.

Note that Line Cards, Storage Processors, FC ASICs, and FC Ports are not Failover Sets because their failure recovery is managed using a multi-path policy. See 7, IO Path Failover.

Policies for Failover Sets

Each Failover Set is subject to its own rules and policies with regard to the following:
1. Member Configuration—What components are participating in the Set and how are they identified and configured for failover? What reconfiguration options are supported?
2. Combining Condition—What conditions are required for compatibility between the components?
3. Fault Detection—What methods will be used to detect component failures? How can hard faults be separated out from soft faults?
4. Failure Analysis and Agreement—What conditions will cause a component failure and how does all of the correctly operating components agree on the failure?
5. Corrective Action—What recovery actions are taken when a component is removed from service?
6. Restart Policy—What circumstances permit a failed component back into the Failover Set? How is a member of an HA Set repaired and re-integrated? Is auto failback of resources supported after re-integration? Is re-integration automatic or manual?
7. Configuration Replication—What configuration information is required to be duplicated on the Failover Set members to support member replacement?
8. Elective Failover—What are the methods and algorithms used to remove a member of a Failover Set from service in an orderly way? How is a member removed from service re-integrated into the Failover Set?
9. Resource Management—What resources must be arbitrated for when splitting shared resources between Failover Set members?
10. Fail-Stop Policy—When the last remaining member of a Failover Set fails before the previously failed member(s) can be repaired. A Fail-Stop policy is the policy by which a Member, in response to a failure, changes to a state that permits other components to detect that a failure has occurred and then stops.

Types of Failover Sets

As previously mentioned, Failover Sets fall into two categories, Fault Tolerant Failover Sets, and High Availability Failover Sets. In addition to these categories, Failover Sets are also distinguished by their behavior. Some sets follow an Active/Standby behavior while others follow an Active/Active behavior.

All Failover Sets are t-fault tolerant. That is, a Failover Set is t-fault tolerant if it can sustain t failures and still meet its operational requirements.

Fault Tolerant Failover Sets

VSC Failover Set:
A VSC Failover Set is two VSCs configured in Active/Passive mode. The VSCs are located within the same VSX. T=1.

Switch Fabric Failover Set:
A switch fabric Failover Set is two switch fabrics configured in Active/Passive mode. The SFs are located within the same VSX. T=1.

High Availability Failover Sets

VSX Failover Set:
A VSX Failover Set is two or more VSXs configured in Active/Active mode. The VSXs are physically connected together and to a common set of storage devices. Each VSX can have one or more VSCs. T=n, depending on the HA Set configuration. See Section 6 below.

Member Composition

The Member Composition of a Failover Set understands the way that the Members are combined. The composition of a Failover Set contains some of the following information:
1. Type (2-Way, 4-Way, N-Way, Hierarchical)
2. Count of Members Found
3. Count of Members configured
4. Redundancy Limit (Number of sustainable Member failures)

A hierarchical composition enables combining failover within the VSX (Fault Tolerance) as well as outside the VSX (High Availability). As stated before, the Member Role is determined by the VSC in a hierarchical composition.

FIG. 5 shows the components of a Failover Configuration. The Composition consists of the rules pertaining to the way that the Set is built from underlying VSXs or Failover Sets.

The Member Units identify the components that participate as members of the Composition. Member Units identify all of an underlying component. This prevents a single component from participating in more than one configuration.

The object of distinguishing between a Failover Set and its composition is to isolate their behavior. For instance a HA Set may be able to respond to user requests even if one of its member VSXs cannot. The method of composition of the HA Set is isolated from the functionality of the VSX.

The Member Unit

Component states represent the state of the component. However, they do not reflect the state of the Member that is mapped onto them by a failover configuration. This task is accomplished by the Member Unit, which reflects the condition of the Member.

States

Member Units do not require a thread. Processes that affect the condition of the Composition such as component failures or replacements act them upon. FIG. 6 shows the Member Unit state diagram.

Unmapped

This state indicates that the Member Unit is not mapped onto any underlying component. This condition occurs after a failure of the underlying component has occurred. In this state the database replicated within the Member is invalid and is no longer used. No IO services will be available through an Unmapped Member. This is a permanent state until field service replaces the failed component.

Partially Mapped

In this state the Member Unit is mapped to part of the member that is allocated to it. This occurs when previously failed component is replaced and the database/configuration from the Primary Member is being written onto the replacement component. All configuration data on the partially mapped Member is invalid until the database synchronization operation is complete.

Mapped

In this state all database configuration on the Member Unit is available for access. IO Services can be performed through the Member. Some important Member states are as follows:
1. Primary—Member's Virtual Services are performing active call processing (enabled). Database is in Master mode.
2. Backup—Member's Virtual Services are not performing active call processing (disabled). Database is in Slave mode.
3. Alternate—Member's Virtual Services are not performing active call processing (disabled). Database is in Replica mode.

Member states are fully discussed in 3.8.

Events

TABLE 4

Member Unit Events

| Event | Description |
| --- | --- |
| Member Replaced | Component has been replaced |
| DB Replication Complete | Replication of configuration information on the new member is complete |
| Member Failed | Error analysis has determined a component failure |

Creating a Failover Set

Configuration is the settings for all parameters of the Failover Set in the Failover Service. This includes the arrangement of the parts of the Failover Set and its composition as well as all of the individually manageable settings that govern the behavior of the Members.

The creation phase of the Failover Set accepts parameters from the "user" and creates data structures and permanent database entries for the Failover Configuration. The user may be real or automated. This process does not understand the difference. FIG. 7 shows a possible state machine for creating a Failover Set.

States

State descriptions of the states, which comprise the state machine shown in FIG. 7 are found in the following sections.

Creating Failover Set

This state determines the resources needed for this Failover Set, allocates the resources, and initializes the failover Set data.
1. Allocate and initialize the Failover Set structures according to the parameters.
2. Generate "Failover Set Initialized"

Undefined

This state indicates the Failover Set has failed verification. Modifications are needed to the definition.

Verifying Failover Set

This state verifies the Failover Set definition is complete as defined by the user.
1. Validate Failover Set composition and type
2. Validate Member count and default roles
3. Validate Member compatibility
4. Validate storage visibility
5. Validate Node and Port World Wide Names
6. If valid Generate "Definition Complete". Otherwise Generate "Definition Incomplete"

Failover Set Defined

This state indicates the Failover Set has been defined correctly and exists in memory. It can be modified by the user at this time or committed to the database.
1. Wait for Commit or Update Adding Component This state allocates and initializes the Member Composition Unit.
1. Allocate and initialize the Member Composition Unit
2. Generate "Component Added"

Removing Component

This state removes and de-allocates the Member Composition Unit.
1. De-allocate the Member Composition Unit and update the structures
2. Generate "Component Removed"

Updating Failover Set Definition

This state indicates the user has changed some attributes for the Failover Set. For example, the user might want to change the default Primary Member. It does not include changes to the composition.
1. Update all attributes from the user-supplied parameters
2. Generate "failover Set Updated"

Completing Creation

This state commits the in-memory copy of the Failover Set to the database.

1. Commit transaction
2. Generate "Definition Committed"

Creation Complete

This is the delete state for the thread that creates the Failover Set. When done force the Failover Set to be brought up from the data in the database.

1. De-allocate the Failover Set formative structures
2. Generate "Failover Set Found"

Events

This section describes the events in the Create State machine.

TABLE 5

Create Failover Set Events

| Event | Description |
|---|---|
| Create Failover Configuration | New failover Set requested |
| Failover Set Initialized | Data structures have been allocated and initialized |
| Add Component Requested | Add this Member to the Failover Set |
| Component Added | Member has been validated and added into Failover Set |
| Remove Component Requested | Remove this Member from the Failover Set |
| Component Removed | Member removed from the Failover Set |
| Verify Definition | Request to verify configuration |
| Definition Incomplete | Configuration not complete for Failover Set type |
| Definition Complete | Configuration is valid for Failover Set type |
| Commit Definition | Make configuration permanent |
| Definition Committed | Database transaction done |
| Update Failover Set Parameter | Request to modify a Failover Set parameter |
| Failover Set Updated | Failover Set modification complete |

Reconfiguring a Failover Set

It might be desirable to allow customers to change a Failover Configuration. For example, a customer might want to upgrade from a single VSX to a HA Set. Reconfiguration governs the process of modifying existing Failover Configurations while the storage is online to clients.

Increasing Components

One of the more intriguing features of Fault Tolerant Configurations is its, ability to add redundancy while the Failover Set is online. All that is required is that the Member is not being accessed and that the user understands that the operation will make the affected configuration data accessible from more than one Member.

Reducing Components

Reducing the number of members in a Failover Set is also a desirable feature. This allows the user to set up a HA Set before knowing exactly how much availability they need. Later, after mapping user data to the HA Configuration, the user may be able to reduce the size of the HA Set to make room for something else. To reduce the size of the HA Set, all that is required is that the VSX being permanently removed is not being accessed and that the user understands that the operation will make the affected configuration data inaccessible on the Member being deleted.

Bringing up a Failover Set

Bringing up a Failover Set is achieved from the bring-up of each individual Member. Each Member must:

1. Successfully pass hardware and software initialization and compatibility checks
2. Determine it's role in the Failover Set
3. Announce itself to the Failover Set The purpose of the bring-up process is to create a relationship between a Failover Set and a Member. The scope of the bring-up is the time between when a Failover Set is first discovered by the VSX and the time when all of the components of the failover Set are located and recognized. The reason for this limited scope is to reduce the complexity of the state machine that controls the operational functions of the Failover Set—the Served Failover Set state machine. Once the Bring-up process is complete, control of the Set is turned over to the Served Failover Set state machine.

Member bring up is described in the next section. The Served Failover Set state machine is described in section 3.10.

Member States

Members, whose composition units are in the Mapped state, use the following failover states for VSX and VSC based Failover Sets. The state diagram shown in FIG. 8 is explained by the following table.

TABLE 6

Member Failover States

| State | Description |
|---|---|
| Unavailable | The Member is initializing after reboot or restart. |
| Available | The Member is checking configuration and arbitrating for its configuration role (Primary, Backup, Alternate). |
| Primary | The Member is performing active call processing. |
| Backup | The Member is standing by to take over from the Primary should the Primary fail. |
| Alternate | The Member is standing by waiting to take over from the Standby, should the Standby fail. |
| Maintenance | The Member has been commanded to go out of service for maintenance. |

All Members are initially assigned to the Unavailable state. As Members pass bring-up diagnostics, boot, and initialize successfully, they are removed from the Unavailable state and placed in the Available state. After a Member passes configuration and compatibility checks, it determines if it will be the Primary, Backup, or Alternate in the Failover set.

A Member being removed from the Unavailable state and placed in the Available state is caused by the repaired event. The event is defined to be the successful startup of the Member, including passing go, no-go diagnostics, OS initialization, and application initialization.

A Member is removed from the Available state and placed in the Primary, Backup, or Alternate state by the configured event. The configured event is implies the following:

All hardware and software initialization completes successfully, and
All configurable parameters are valid, and
Hardware and software revisions are compatible
Member's database configuration has been determined to be Primary, Backup, or Alternate A Member being removed from the Primary or Backup state and placed in the Unavailable state is caused by the failed event. The failed event is defined to be a condition, which prevents the Member from providing data availability. The failed event implies an error.

Some common failure conditions are:

A hardware failure renders the Member inoperable.

A software inconsistency causes temporary unavailability because of a crash.

The Member is not configured, yet.

Bring-up diagnostics detects an unrecoverable error.

The member is powered off, and possibly removed from the chassis.

For scheduled maintenance, the remove event is used. After the maintenance operation is complete the Add event is used to restart the Member.

A Member assigned to the Unavailable state cannot failover and is not expected to be able to failover in the near future. A Member assigned to the Available set cannot failover but will be able to failover in the near future after configuration is verified and Member role is determined. Only Members assigned to the Primary or Backup states can failover.

Primary/Backup Role Determination

There are two basic cases to handle when determining the Member's Role. First, there's already a Primary Member, and second, no Primary Member has been determined. The first case is simple. When a Primary Member already exists in the Failover Set any new Member automatically becomes a Standby Member. If the Standby Member already exists, then the Member becomes an Alternate. The second case requires a somewhat complicated algorithm to decide which Member should be the Primary Member. The details are found in the following sections.

Single Member Boot

A single Member Failover Set automatically becomes the Primary Member when configured as such. The following sections discuss cases where a single Member is booting as part of a failover configuration.

Booting into a Live System

After scheduled maintenance or shutdown a Member will restart and again join the Failover. Set. A Primary Member should already exist. In this case the Member can become a Backup Member. If the Backup already exists, then the Member can become an Alternate.

Booting After a Failure

After a catastrophic error it's possible for a Member to attempt to rejoin the Failover Set. Should the error be a persistent hardware error, the Member should simply remain in the "Unavailable" state and wait to be replaced. If a software error caused the restart, the Member can be allowed to rejoin the Failover Set.

Multiple Member Boot

It's possible for both Members in a 2-Node HA set to be booting simultaneously. In order to understand these conditions let's first define some new terms.

COLD boot is defined to be a restart from a power cycle condition. Power cycle conditions include:
1. Hard Reset button pushed
2. Power switch toggled from OFF to ON
3. Orderly Shutdown COLD boots are typically characterized as a jump to PROM code, reloading the OS and functional code, and completely reinitializing the hardware. The Member must have been a full Member at the time of the power-off.

WARM boot is defined to be a restart from any other condition including:
1. System trap or exception
2. Soft Reset button pushed WARM boots are typically characterized as reloading the OS and the functional code, and partially re-initializing the hardware. WARM boots may also require recovery of operations in progress at the time of the restart; e.g., Data in cache, RAID writes-in-progress. The Member must have been a Full Member at the time of the restart to qualify for WARM reboot recovery. If not, a COLD boot is declared.

There exist three basic boot conditions.
1. MEMBER 'A' is COLD booting and MEMBER 'B' is COLD booting (COLD boot)
   a. Both MEMBERs should assume their default Member state.
2. MEMBER 'A' or MEMBER 'B' is WARM booting and the other MEMBER is COLD booting (WARM boot)
   a. The WARM booting MEMBER should assume it's previous Member state and the COLD booting MEMBER should assume what's left over.
3. MEMBER 'A' is WARM booting and MEMBER 'B' is WARM booting (MIXED boot)
   a. Both MEMBERs should assume their Previous Member state The following sequence diagrams shown in FIGS. 9-11 illustrate the arbitration algorithm. FIG. 9 shows the arbitration algorithm for a COLD boot. FIG. 10 shows the arbitration sequence for a WARM boot. FIG. 11 shows the sequence for a MIXED boot.

Alternate Role Determination

Alternate role determination is simple. Any Member joining the Failover Set after the Primary and Backup Members are identified becomes an Alternate. Selection of a new Backup could use a simple scheme, such as ordering all Alternates based on a numeric identifier, or Member number.

Sample 2—Node State Machine

The state machine of FIG. 12, shown in tabular form, is valid for a 2-Node Failover set which follows the Primary/Backup behavior. The action routines are summarized in the action table shown in FIG. 13. NOTE: State 5 is split into 5a and 5b depending on the resultant Primary or Backup state determination.

Compatibility Checking

Prior to determining a Member's Role (i.e. determining which Member is "Primary" and which is "Standby"), the Member must be checked for compatibility with all the other Members in the configuration. For each Member the following categories of information are checked:

HW-HW

The memory must be the same in all Members. This condition can be relaxed a bit to say the memory must be capable of containing the database and the SAN Elements, and capable of supporting all operations on both Members.

The number of ports must be the same on all Members. Again, this condition can be relaxed. As long as the devices are visible from both systems the number of ports doesn't really matter.

The hardware version of each Member must be compatible with the hardware version of every other Member All the storage must be connected and visible to all Members. A policy will be provided to override the "All Storage" clause should the customer so desire. Options available will be to:
Raise an alarm
Prevent the LUN(s) from coming online
Prevent the component from becoming a Member
The port configuration must match in Members. Fibre Channel must be matched with Fibre Channel and iSCSI must be matched with iSCSI.

SW-HW
The SW version must be compatible with the HW version both locally and remotely.

SW-SW
The SW version must be compatible with the SW version both locally and remotely.

Clocks must be synchronized within some margin of error between Members. The maximum difference between Member clocks will be determined by the Heartbeat protocol.

Managing a Failover Set

After the Member state machine has determined a Member's role, then a Served Failover Set object is created to define the relationship between the Failover Set and the Member. The Member State Machine determines when the Failover Set becomes committed to a particular component and causes the creation of the Served Failover Set to control this exclusive relationship.

The Served Failover Set has several responsibilities. First is to maintain the integrity of the configuration. This is accomplished through careful handling of events, control of configuration changes, and timely synchronization of the database. The Served Failover Set is also responsible for fielding all failure notifications to the Served Failover Set and managing the Failover Set Composition updates properly.

Served Failover Set must also manage all modifications to the set's parameters. The current state machine does not implement this feature, but will attempt to in the future. Modification of the Failover Set parameters will require understanding of their affect on the Set state and will require synchronization of the metadata as well. Modification such as increasing or reducing capacity must also be managed through this path.

States

FIG. 14 shows a Served Failover Set state machine which accomplishes the foregoing tasks. The states are discussed below.

Creating Served Failover Set

This state allocates and initializes Served Failover Set resources.
1. Allocate and initialize Served Failover Set resources
2. Generate "Served Failover Set Created"

Offline

This state presents an offline failover Set to all interested clients. Failover is disabled in the Offline state.
1. Generate "Failover disabled"

Verifying Online

This state verifies the Failover Set can go online to clients.
1. If redundancy left<redundancy limit Generate "Online Failure"
2. Set Failover Set state=Online
3. Commit changes to database Online This state presents an online Failover Set to all interested clients. This is the only valid state a failover recovery action can be serviced.
1. Generate "Failover Enabled"

Removing Lost Component

This state removes a lost Member from the composition and updates the database.
1. Generate "Member Lost" to remove component from composition
2. Update Failover Set sequence number
3. Commit changes to database
4. If Lost component is Primary Member Generate "Primary Failed"
5. If Lost component is Backup Member Generate "Backup Failed"
6. If Lost component is Alternate Member Generate "Alternate Failed"

Transition to Offline

This state transitions the Failover Set to offline.
1. Complete any current requests
2. Update the sequence number and state
3. Commit changes to database Deleting Served Failover Set This state deletes the Served Failover Set.

Events

Event descriptions for the Served Failover Set are found below.

TABLE 7

Served Failover Set Events

| Event | Description |
| --- | --- |
| Create Served Failover Set | Failover Set read from database and Member states determined |
| Served Failover Set Created | Failover Set resources allocated and initialized |
| Transaction Complete | Database transaction complete |
| Online Requested | Put the failover Set online |
| Offline Requested | Put the Failover Set offline |
| Online Failure | Failover Set failed online verification |
| Member Lost | Member is failed |
| Failover Set Removed | Served Failover Set is destroyed |

Fault Detection Architecture

One of the main challenges with constructing a reliable distributed storage system is timely detection of "failover-able" conditions. Detection is time-critical, since requests to store or retrieve data can be outstanding at the time of the failure. The detection problem is further aggravated when conflicting errors are reported from different parts of the system, making error-specific recovery difficult. Given a certain error, it might not be possible to decide if a failover should be requested. But, given a combination of errors, failover might be the only possible recovery. The detection of a failover-able condition should not take more than five to ten seconds.

Once the decision to failover a component has been made, conceptually, the task at hand is a relatively straightforward sequential programming problem. Once started, the time it takes to do the failover is as critical as detection time itself. If it's takes too long to failover, host file systems, volume managers, and applications can timeout and hang. This section outlines a general approach for reliably detecting faults for failover. FIG. 15 shows a generalized block diagram of fault detection and analysis according to an embodiment of the invention. Fault detection is distributed throughout the VSX. In general, two fault detection scenarios prevail:
1. Self-detected faults—These are faults in which the detecting software is running on the Member about to be failed. Self-monitoring algorithms are the main cause of these failures:
   a. Hardware errors
   b. IO Path errors
   c. Task Monitoring
   d. RTOS Extensions
   e. Local Diagnostics Test results
   f. Board-level heartbeat
2. Partner-detected faults—These are faults in which the partner detects the fault.
   a. Partner-level heartbeat
   b. Services Framework IPC failures
   c. Database JCP to JCP failures
   d. Partner Diagnostics Test results These fault detection methods are described in more detail in the following sections.

Hardware Errors

Hardware errors are detected by a variety of sources, most notable device drivers. Any device level error coming from a board-level device should request a failover.

IO Path Errors

IO path errors typically involve only IO path failover. However, a combination of IO path errors can often point to a board-level fault. Pathing faults can also be caused by board errors. When such a fault occurs, a failover should be requested. In general, a hardware error on a module-level component should request a failover.

There's another IO path error, a link error, which needs to be handled differently. For example, if some one pulls out a Fibre Channel cable from a downstream port, only the IO path should failover, not the entire VSX.

Task Monitoring

Tasks and threads on all processors (PPC, ePPC, PICO, and FC) should be monitored for correct operation. For VxWorks, the two most common task level errors are infinite loops in the code and exceptions that cause the task to be suspended by the RTOS. Some examples are
1. A task freeing memory that is already on the free list.
2. A divide by zero.
3. A page fault.
4. A loop exit condition that is never met.

Mechanisms should be put into place to check for these specific scenarios. In an embodiment, the recovery can be to request a reboot.

RTOS Extensions

Error Analysis is responsible for analyzing and tracking errors on resources. It is important that all errors come to Error Analysis. But, this is not always possible, as some errors cause hardware exceptions and traps and therefore cannot be dealt with at task level. For these kinds of errors an interface into the RTOS is required.

RTOS Exception Handler

Whenever an exception happens on a processor that causes the processor to enter its exception handler, the exception needs to be analyzed to determine if a permanent or transient error has occurred. Such analysis might require scheduling a diagnostic to do further testing so that the error can be correctly characterized as permanent or transient.

Initially, any permanent error detected should result in a failover recovery action. Any permanent error should result in the Member being removed from the Failover Set. If the error is transient, then the Member should not be permanently removed from the Failover Set. This information should be communicated to Error Analysis so that the resulting heartbeat failure is ignored.

Diagnostic Test Results

Diagnostic tests resulting in detection of permanent hardware errors on a card should tie directly into a request for failover. Any card level hardware error should result in requesting a card level failover. Later, more sophisticated error recovery can be added, such as disabling an SP.

Fault Reporting

The Failover Service reports faults to the UI through the Alarm Manager and Log Service. The surviving Member reports the failure of the partner Member. The logs of the failed Member will be retrieved.

The state of the partner will be available as follows:

TABLE 8

Partner Status Visible to UI

| Partner State | Status |
| --- | --- |
| Primary, Alternate, Backup | Operational + Member Role |
| Unavailable | Failed or Rebooting |
| Available | Configuring |
| Maintenance | Out of Service |

It's possible for a failover to occur due to software errors. But, a Member should be replaced only for hardware failures. Software errors causing failover should not be cause to replace the Member. This requires the fault reporting mechanism to be capable of recording the error in persistent storage so that the Arbiter can read the record.

Failover Alarms

When failover occurs, the Failover service automatically switches over the database and Services Framework to the new Primary Member. The following conditions are cause for failover:

Planned maintenance and shutdown—One of the best benefits of a Failover Set is the ability to migrate services off a member to perform routine maintenance without disrupting services to clients. For example, this allows you to upgrade your software to the latest release or add memory to your system while keeping your site operational.

System crash—When a Member crashes and it's the Primary Member, another Member should immediately be made the Primary Member so that service and data availability are maintained. If it can be determined that a software error lead to the crash then the Member should not be permanently removed from the configuration. If the crash was due to a hardware failure, the Member can be permanently removed.

Communication failure—Each Member participates in a heartbeat protocol, which establishes the member's health. The protocol should run over redundant, bidirectional lines that inter-connect every Member in the configuration. The protocol can conclude there is a failure when the communication method(s) between the Members fails. Communication failure can occur due to:

Adapter failure
  The systems are connected to a common hub or switch that fails
  The communications cable fails
  System hang
System hang—System hangs cause communication failures, but they also open the door to database corruption. In order to protect against data integrity compromises (i.e., system crashes or invalid data) a Member must, before taking over services of a failed node, ensure that the failed node cannot modify the database. This is commonly referred to as I/O Fencing or I/O Barrier.
Software-Defined Threshold Reached—Certain threshold conditions might be cause for Member failure. A Member that restarts over and over again is an example of a threshold that leads to failing the Member.
Hardware Failure—Sometimes it is possible for software to detect hardware failures directly. When this occurs the Member might need to be replaced, depending on the scope of the failure. A SP or FC Port failure could be managed independently and need not cause a Member failure. However, an IDE drive failure on a VSC would render the entire Member unusable.
Database Failure—The fault tolerance support provided by the database is designed to tolerate only a single point of failure. These are categorized below:
  Software Faults
    The following software faults are tolerated by the system:
      RTRDB terminates unexpectedly.
      RTRDB hangs.
    Certain instances of the following faults are tolerated:
      RTRDB exhibits an erroneous internal state.
  Hardware Fault
    The following hardware faults are tolerated by the system:
      Processor halts.
      Disk error.
      Network error.
  System Faults
    The following system faults may be tolerated by the system:
      Dynamic storage exhaustion—insufficient memory.
      Stable storage exhaustion—insufficient disk space.
    These faults can only be tolerated if they are transient faults, and, in particular, do not manifest themselves immediately on the standby system.
  Framework Failure—The fault tolerance provided by the Services Framework is also designed to sustain only a single point of failure. These are categorized below:

Heartbeat Algorithms

Characterizing hardware errors is a difficult process. This can be simplified in VSX when faulty behavior is reduced to the inability of a processor to complete a protocol. This is the purpose of the heartbeat protocol.

Each card in the VSX will run its own independent heartbeat algorithm. A multi-card Heartbeat is not needed; since the JCP and Services Framework will each have its own heartbeat algorithm. Heartbeat failures should be reported to error analysis.

Heartbeat Algorithm Within a Board

The heartbeat protocol uses the notion of signed messages and is essentially the following:

The processors on each card are divided into two groups: transmitters and receivers. The transmitter group contains one processor and the receiver group contains the rest of the processors. The transmitter starts the heartbeat by sending a value to each receiver. Each receiver then sends the value it got from the transmitter to every other receiver. Lastly, each receiver decides on the value sent by the transmitter, such that:
  IC1. All non-faulty receivers obtain the same value.
  IC2. If the transmitter is non-faulty, then every non-faulty receiver uses the transmitter's value.

The algorithm completes synchronously. Every participating processor reaches agreement at the same time.

The heartbeat algorithm assumes a function majority applied to a set of values with the property that if a majority of the values vi equals v then majority $(v1, \ldots, vn-1)$ equals v. Actually, it assumes a sequence of such functions, one for each n. If no majority value exists then majority equals 0.

In the following descriptions let n be the number of processors participating in the protocol. Let m be the number of faults tolerable. Assume $n >= m$.

Algorithm HB(0)
  1. The transmitter signs and sends its value to each receiver.
  2. Each receiver uses the value it gets from the transmitter, or uses the value, 0, if it gets no value or the value can't be authenticated.

Algorithm HB(m), m>0
  1. The transmitter signs and sends its value to each receiver.
  2. For each receiver, let vi be the value receiver i gets from the transmitter, or else 0 if receiver i got no value from the transmitter, or the value cannot be authenticated. Receiver I then acts as the transmitter using Algorithm HB(m−1) to send the value vi to each of the n−2 other receivers.
  3. For each receiver, let Vj be the value receiver i got from receiver i in step 2, or else 0 if it got no such value or the value cannot be authenticated. Receiver i uses the value majority $(v1, \ldots, vn-1)$.

The proof of algorithm HB(m) for arbitrary m, can be found in the references.

An authenticator, a, is constructed by a processor, p, for a data item, d, such that a=Ap[d]. When processor, p communicates its value to r, the message consists of the triple <p,a,v>, where a=Ap[v]. When the receiver, r, gets the message it checks that a=Ap[v]. In practice, any function, A, which suitably randomizes the data, will suffice, since faults within a card will be due to random errors rather than malicious intelligence. A simple authentication algorithm, such as "shift left" or "rotate right", should be chosen in keeping with the PICO processor's instruction set.

Implementation of HB(1) will use timers to drive external events into the algorithm as follows:
  Step 0:
    Synchronize clocks (see 4.9.2). Then set timer to start algorithm. (Step 1, C), where C=a certain time of day determined algorithmically.
  Step 1:
    Timer pops: If transmitter, then sign and transmit a value, v, to the [(n−1)=2] other processors. If receiver, do nothing. Set timer (Step 2, 1 sec)
  Step 2:
    Timer pops: If a receiver read all received messages. For each message received validate the signature, record the value sent in the message, and sign and relay the message to the [(n−1)=1] other processors. For each message not received or authenticated, substitute a default value and send a default message in place of the relay message. Set timer (step 3, 1 sec)

Step 3:
> Timer pops: Validate the relayed values. Compute interactive consistency vector using majority (v1, ..., vn-1). If 0, generate appropriate fail event to the failover state machine. Otherwise, zero vector and set timer again (Step 1, 1 sec)

The single second between phases should be programmable.

Implementation Examples

To understand how the algorithm works in the non-faulty case, let's consider the case m=1, n=3. Let PPC=Power PC, EPPC=embedded Power PC, and PCIO=Network Processor. FIG. 16 illustrates the message history. In the first step of HB(1), the transmitter, PPC, sends v to all receivers, ePPC and PICO. In the second step, ePPC sends the value v to PICO and PICO sends the value to ePPC using the simple algorithm HB(0). In step three, PPC, ePPC, and PICO all have a1=a2=a3=v, so they all obtain the correct value v=majority (v,v,v).

Next, let us see what happens when the transmitter is faulty. FIG. 17 shows the message history if a faulty processor sends values x and y, which do not authenticate. Each receiver obtains V1=x or y, V2=0, V3=0, so they all obtain the same value majority(x or y,0,0) in step (3), regardless of whether or not any of the values x and y are equal.

Another scenario involving a faulty transmitter occurs when the transmitter fails to send a message. FIG. 18 show the message history if a faulty processor fails to send a message. Each receiver uses the value 0 as the value got from the transmitter. Hence, V1=0, V2=0, V3=0, so they all obtain the same value majority(0,0,0) in step (3).

To understand how the algorithm works in the presence of a faulty receiver consider the message history in FIG. 19. In the first step of HB(1), the Transmitter, T1, sends v to all the receivers as before. In the second step, the ePPC relays the value y using the simple algorithm HB(0). In step three, PPC and PICO have V1=V3=v and V2=y, so they obtain the correct value v=majority(v,v,y).

The next example shown in FIG. 20 is a variation on the previous example. ePPC fails to relay T1's value, v.

Database Heartbeat Algorithm

The arbitrator and JCP periodically exchange a protocol via messages to determine if the database is functioning correctly. If the stream between the arbitrator and the JCP is closed or broken, the arbitrator is entitled to assume the JCP—together with the database it controls—has stopped. If no heartbeat messages are received for some time—say, twice the heartbeat interval—an arbitrator service could assume that the JCP is dead. However, the arbitrator is at liberty to ignore the heartbeat messages or set the heartbeat interval to zero or to a very large value.

When an error is detected in the JCP heartbeat, an error event should be generated on the component (VSC) for error analysis. Error analysis will use the alternate path in order to determine if the member should be removed from the Failover Set.

Framework Heartbeat Algorithm

The Services Framework will maintain a platform between locations for service-to-service communications. There will be a heartbeat, or otherwise similar algorithm for detecting communication failures.

When an error is detected in the Services Framework heartbeat, an error event should be generated on the location component (VSC, or LC) for error analysis. For a VSC location failure, error analysis will use the alternate path in order to determine if the member should be removed from the Failover Set.

Clock Synchronization

Interactive consistency requires processors maintain clocks that are synchronized with one another within some margin of error. Physical clocks do not keep perfect time. They can drift with respect to one another. Hence, they must be periodically re-synchronized.

Two physical clocks in a VSX need to be synchronized. First, a Real Time clock (RTC) exists on each board in a VSX system. Second, within each board itself are two components used for generating the hardware timer interrupt. All of these clocks need to be synchronized to within some maximum difference for interactive consistency to occur. This section discusses the strategies for doing so.

The clock synchronization algorithm makes the following assumptions:
1. The values of the Real Time clocks on any two cards differ from one another respectively by at most maximum clock difference.
2. The two cards are full Members in a HA set as described in section 3.3.

Real Time Clock Synchronization

The algorithm assumes that the difference between RTC values used by any two Members cannot initially exceed maximum clock difference seconds.

Let M1 be Member #1 and M2 be Member #2. Assume M1 is Primary and M2 is Backup.

The method for synchronizing the Real Time Clock between M1 and M2 is as follows:
> To read M1's clock M2 sends a clock request message to M1 after both Members are fully accessible and the Failover Set is Online. M2 eventually responds to this message with its current RTC value. Then, M1 will take the average of two values, its own clock and M2's clock. If M1's value differs from its own value by more than maximum clock difference, then it replaces its own value with M1's clock value when forming the average.

To see why this works, let us assume that no errors can occur while executing the algorithm. In other words both Members must be Full Members in the Failover set as described in section 3.3. Should a Member be removed from the failover set, the algorithm is aborted.

Let M1 and M2 be the Members in a Failover Set, and let CM1 and CM2 be the RTC clock values used by M1 and M2 at the beginning of the algorithm for their RTCs, respectively. From M1's perspective, if CM1=CM2 then (CM1+CM2)/2=CM1 and the algorithm completes. If CM1>CM2 or CM1<CM2 then (CM1+CM2)/2=CM1+n, where n=(CM1−CM2)/2 and the algorithm completes. Each successive iteration the algorithm brings the clocks closer together by a factor of (CM1−CM2)/2.

Therefore, we can keep clocks synchronized to within maximum drift of one another by re-synchronizing often enough, so that clocks, which are initially within maximum clock difference of each other never, drift further than maximum drift apart.

This synchronization algorithm can be run after boot synchronization and thereafter, at programmable intervals such as once every 24 hours.

Tic Counter Synchronization

Synchronizing the tic counters is a simpler process than synchronizing the RTCs. This is because the tic values are kept in the shared memory. Hence, they are can be read directly by either processor. No message passing is needed.

The algorithm assumes that the difference between initial tic values used by the PPC and ePPC to program their respective clock components are the same and the drift rate cannot have already exceeded maximum clock difference tics per second. It is assumed that the PPC and ePPC are programmed to tic at the same number of tics per second. The maximum drift rate should not exceed a quarter of a second.

The algorithm for synchronizing clock tics is essentially the following:
1. p="other" processor's tic counter. Set timer (q tics)
2. Timer pops. r="other" processors' tic counter. s=|r−p|
3. if (maximum clock difference>(q−s)>maximum drift) then decrease t by (q−s)/2 and reprogram the clock chip with a new t.
    where t=the number of tics/sec used to program the clock chip.

To see why this works, let us assume that no errors can occur while executing the algorithm. Should a processor be removed from the active set, the algorithm is aborted by canceling the timer. (There's no need to synchronize clocks with an unavailable processor).

Let HP and EP be the Host Processor and Embedded Processor respectively, and let $C_{HP1}$ and $C_{EP1}$ be the values used by HP and EP at the beginning of the algorithm for their tic counters. Let $HP_n$ and $EP_n$ be the number of tics per second used to program the DUART chip. Let $C_{EP2}$ and $C_{HP2}$ be tics counter value when the timer pops.

If $((C_{EP2}-C_{EP1})-(C_{HP2}-C_{HP1}))$>maximum drift then $C_{HPn}=C_{HPn}-((C_{EP2}-C_{EP1})-(C_{HP2}-C_{HP1}))$. If the frequency at which the DUART chip tics is reduced by $((C_{EP2}-C_{EP1})-(C_{HP2}-C_{HP1}))/2$ then the algorithm succeeds at bringing the two clocks closer together. Therefore, we can keep clocks synchronized to within maximum drift of one another by re-synchronizing often enough so that clocks, which are initially within maximum clock difference of each other never drift further than maximum drift apart.

It appears that by repeated resynchronizations, each one bringing the clocks closer together by a factor of $((C_{EP2}-C_{EP1})-(C_{HP2}-C_{HP1}))/2$, this algorithm can achieve any desired degree of synchronization. However, two factors have been ignored:
1. The time taken to execute the algorithm
2. The error in reading the other processor's clock These two factors limit the closeness with which clocks can be synchronized. As such, the maximum drift value must include the error in reading clocks and the time it takes to execute the algorithm.

For example: In order to have a three second failover, we want to have a one second heartbeat. Assuming the DUARTs are programmed for 60 tics/sec, the maximum drift value could be safely set at 30 tics. The synchronization algorithm can be run after boot synchronization and thereafter, once every 24 hours.

VSX and VSC Failover

This section will describe failover between VSX boxes. As previously mentioned, failover between VSX boxes is for high availability. As such, the members of the failover set are two or more VSX chassis or stacks. This type of failover set is also known as a High-Availability (HA) Set.

Except where noted, the steps outlined in the following sections apply to VSX Failover.

System Requirements

This section describes the physical setup between two VSXs when creating a HA Set. In an HA pair configuration, the following traffic types have been identified. The traffic between the VSX pair is classified according to the bandwidth requirements.
  Low Bandwidth Applications
  Services Framework messages
  Database Updates
  Heartbeat Messages
  High Bandwidth Applications
  Reserve, Release, Reset, Ordered Tag
  Cache Data
  Cascading VSX-to-VSX Connections The two VSXs in an HA Set will be connected using redundant high-speed interconnects. InfiniBand, Fibre Channel, or GIGe would serve this purpose. This interconnect unifies the disjoint switch fabrics on each VSX chassis. The receiving SP acts as a relay processor with which to send messages from one switch fabric to another. In an embodiment of the invention Fibre Channel will be used in a shared link configuration as shown in FIG. 23.

Transport Mechanisms

The I/O path could use a proprietary Extended Link Service (ELS) command to transport a message to a remote SP. ELS will provide a high performance path for small amounts of data. An ELS command payload is limited to 2 k of data.

For larger transfers, the SCSI protocol can be used. Either mechanism will work across all Fibre Channel topologies as well as SAN to WAN topologies. SEND DIAGNOSTICS command will be used to transport a message between VSXs. Recovery from errors will follow the appropriate standards.

Each port on either end of the inter-link will be configured to be both an initiator and a target. The Discovery Agent in the network layer will perform port and process login. Only LUN 0 will be supported and it will be a management LUN. The Confluence Management VLUN will be added by the services into the SPs, which connect the VSXs together. The SCSI Device Manager will respond to SCSI commands from the partner VSX.

The standard INQUIRY data for a CNI VSX device should be:
  Peripheral qualifier=LUN Connected (0)
  Peripheral device type=Storage Array Controller Type (0xC)
  Removable Medium Bit=0
  ISO/IEC version=0
  ECMA version=0
  ANSI version=SCSI-3 (3)
  Asynchronous Event Reporting Capability=0
  Terminate Task Supported=1
  Normal ACA Supported=0
  Response data format32 2 (SCSI-3)
  Additional length (n−4)
  Enclosure Services Support=0
  Multi-Port=0
  Medium Changer=0
  ACKREQQ† Addr32† Addr16†=0
  Relative Addressing Supported=0
  Wbus32† Wbus16† Sync†=0
  Linked Command Support=0
  TranDis†=0
  Command Queuing Support=0
  VS=0
  Vendor identification (8 Bytes)="CNI"
  Product identification (16 Bytes)="VSX nnn"
  Product revision level (4 Bytes)=SW revision level from SW Image Service Vendor-specific (8 Bytes)=ASCII spaces Vendor-specific parameters=ASCII spaces Vendor-specific=ASCII spaces The complete protocol for sending a command and receiving a reply is illustrated in the sequence diagram shown in FIG. 24.

The message-passing interface could be implemented in as simple a fashion as writing to a pLUN on the remote VSX port.

Fail-Safe Communications

Normal communications between VSX software entities takes place through the shared link. Database transactions will also use the shared link for normal communications. When the shared link fails, an alternate path is needed to determine the problem between the VSXs.

The additional interconnect between VSX boxes will be used only for error recovery to determine the correct recovery action for inter-link failure. Database transactions will not be re-routed through the failsafe path, should the database link fail. The alternate inter-link is only used to verify the partner VSX is operational should the inter-link fail. Another heartbeat path or message passing method over the VSX inter-link could be implemented in the future.

The failsafe command will specify a "SELF-TEST" operation only. When this command is delivered to error analysis, the inter-link will be tested for correct operation. If the link is operational, the command will return GOOD status. If the link is non-operational, the command will return BAD status. If the commands times out or otherwise fails, it will be assumed that the VSX is non-operational and the results event will be made available to error analysis.

Failsafe Techniques

There are two basic ways to provide this failsafe connection. FIG. 25—Management Link, uses the management port from each VSX to connect the VSXs together. FIG. 26—Shared Disk, can only work between two VSXs for which the storage devices are dual-ported.

Management Link Approach

Each VSC card should be equipped with an Ethernet port for management. A logical TCP connection established by the Services Framework should remain unaffected by loss of one of the physical links connecting the two VSXs. A fully redundant interconnect will utilize two Ethernet ports and switches, two Ethernet switches and two independent paths.

Shared Disk Approach

The shared disk approach uses READ BUFFER and WRITE BUFFER commands with which to pass messages between the VSX systems. A software entity on each VSX polls an agreed upon device location for incoming messages. If a message is found, it is delivered to the destination entity, which then causes the Ethernet link status to be determined. The Ethernet link status is written to the shared disk. The polling entity on the other VSX retrieves the Ethernet link status and disseminates it to error analysis. The protocol is shown in the sequence illustrated in FIG. 27.

The following table summaries the two approaches. Management Link is more scalable and more flexible. Shared disk requires using dual-ported storage.

TABLE 9

Summary of Management Link and Shared Disk Approaches

| | Management Link | Shared Disk |
|---|---|---|
| Communication Model | Command/Reply | Mailbox |
| Scalable | Y | N |
| SAN Infrastructure Independent | Y | N |
| General Purpose | Y | Y |
| Requires Setup and/or Configuration | N | Y |
| Requires Timeout | Y | Y |
| Requires a Hub or Switch | Y | N |
| Includes discovery protocol | Y | N |

Node Name and Port Names

The HA Set WWN will be selected from one of the WWNs of its Members, since the HA Set is logically one node. All ports in an HA Set should use the same Node Name in their port configuration. When creating a HA Set, the FC Port's PLOGI information will need to be reprogrammed with the HA Set WWN as the Node Name.

VSX HA Configurations

This section describes some HA configurations, shown in FIGS. 28-31. As mentioned before, a HA Set is special kind of Failover set. A HA Set is created from the logical combination of VSXs or from other Failover Sets.

Constraints on HA Configurations

The limits on the number of supported HA configurations are as follows:
1. Port Name limit—Each port is an HA Set uses the Port Name IEEE Extended format as specified in the standards. This supports 4096 ports per node. If each HA Set is presented as one Node, then the limit is 4096 ports. For a 32-port box, this is a limit of 128 boxes.
2. There's a limit on the number of message passing and heartbeat "connections" the Services Framework will support between locations. For a three card VSX, 6 connections are required. For 2 3-card VSXs that is 30 connections.
3. Size limit—The database is an in-memory database. The size of the database is restricted by how much main memory is on a card.
4. Replica limit—The database software may have a limit on the number of database replicas.
5. Multiple instance limits—There might be a restriction on the number of databases supported on a single processor.

Given these restrictions, the following sections present some HA configurations, which appear feasible in the not too distant future.

The most general configuration, N-Node, is recommended to design first, since 2-Node and 4-Node are special cases of N-Node. The hierarchical configuration can be designed after N-Node is complete.

2-Node HA Configuration

The 2-node topology shown in FIG. 28 requires the VSXs to be configured in partner pairs. All storage is physically attached to both VSXs. Only one VSC exists within the VSX. Failover is only possible between the partners. One VSX acts as the Primary VSX and the other VSX acts as the Backup. The number of faults, t=1.

2-Node Hierarchical

The Hierarchical topology shown in FIG. 29 requires the VSXs to be configured in a pair. The VSX itself contains 2

VSCs. One VSC is primary, one VSC is backup, and the other two VSCs are Alternate. The number of faults, t=1.

4 Node HA Configuration

This configuration can support 2, 3, or 4 node organizations. All storage is physically attached to exactly all nodes. Only one VSC exists within the VSX. A single VSX is designated as the backup and a single VSX is designated as Primary. All other VSXs are considered Alternate. Failover cascading is possible in this configuration. The number of faults, t=3.

VSX N Node

In this configuration all storage is accessible to all VSXs in the HA Configuration. The topology can be constructed using switches. Only one VSC exists within the VSX. All VSXs have access to the database. Failover can occur from one node to any other node in the HA Configuration. It is also possible to configure cascading failover, with a VSX failing over to another VSX, and then to another VSX, until the HA Set size is one. The number of faults, t=n−1.

Assigning Storage to an HA Set

It is possible to have more than one HA set in a SAN. For example, given N=10, the N-Node configuration could be split into two 5-Node HA Sets. If the storage were physically connect to both HA Sets, it would need to be assigned for exclusive use to a given HA Set. Otherwise, there would be some potential data corruption.

If storage is divided between HA Sets at the physical level, a user could assign the HA Set ID to each discovered storage device, much in the same way the user domain is assigned to the storage device. The management server could then be used to distribute the list of devices "owned" by a given-HA Set to all HA Sets in the configuration.

In an embodiment, switch-level port zoning or LUN masking could be used to isolate HA Set storage.

Corrective Actions

This section lists the steps to take for certain key Member state machine events. It is important to note these actions are not all taken by the Failover Service, but represent the actions required from the entire VSX.

NOTE: In the algorithms that follow, if a Member is a VSX, made of 2 LC and 1 VSC, then both VSC Failover Service and the LC Failover Service perform the actions of the Member. For example, "Primary Fails" calls for "FC Ports go offline". VSC and LC Failover services will both initiate putting the FC Ports offline.

Primary Fails

Referring to FIG. 32, the following take place in accordance with embodiments of the invention when the Primary fails.

When the Primary fails, the Primary performs the following actions:
1. Validate fail event
2. Record fail reason code
3. Fail-Stop, if possible
   a. De-activate JCP
   b. FC Ports go offline When the Primary fails, the Backup performs the following actions:
1. Record failover In progress
2. Record number of failover attempts
3. If number of attempts exceeds threshold then Fail-Stop
4. Activate the JCP in Master mode
5. Enable all Virtual Services on new location
6. Reset all downstream devices affected by the failover
7. Clean up Reserve/Release for affected devices
   a. Upstream—Clear upstream reservations
   b. Downstream—Reset will clear reservations
8. Clean up Persistent Reservations for affected devices
   a. Upstream—Preempt and Clear service actions
   b. Downstream—Use Preempt and Clear service actions
9. Clean up Span Write locks for affected devices
10. All affected dual-ported vLUNs should set unit attention with Power-on Reset condition on their hLUNs (0x29)
11. Restart any management requests
12. Restart long-running operations such as reconstruction or format
13. Record successful failover
14. Update the Member state
15. Select new Backup
    a. If no other Backup exist generate "Failover Disabled"

When the Primary fails, the Alternate performs the following actions:
1. Reconfigure for Backup, if selected
   a. Activate the JCP in Standby mode
2. Generate "Configured for Backup"
3. Update the Member state Backup Fails When the Backup fails, the Primary performs the following actions:
1. Instruct JCP that standby database is failed
2. Select new Backup
   a. If no other Backup exist generate "Failover Disabled"

When the Backup fails, the Backup performs the following actions:
1. Validate fail event
2. Record fail reason code
3. Fail-Stop, if possible
   a. De-activate JCP
   b. FC Ports go offline When the Backup fails, the Alternate performs the following actions:
1. Reconfigure for Backup, if selected.
   a. Activate the JCP in Standby mode
2. Generate "Configured for Backup"
3. Update the Member state Alternate Fails When the Alternate fails, the Primary performs the following actions:
1. No action necessary When the Alternate fails, the Backup performs the following actions:
1. Stop Replicating to the failed Alternate When the Alternate fails, the Alternate performs the following actions:
1. Validate fail event
2. Record fail reason code
3. Fail-Stop, if possible
   a. De-activate JCP
   b. FC Ports go offline Configured for Backup When the Backup is configured, the Primary performs the following actions
1. Instruct JCP that standby database is activated
2. Synchronize clocks with Backup
3. Generate "Failover enabled"

When the Backup is configured, the Backup performs the following actions:
1. Activate JCP in standby mode. This will copy the database and historian files to the Backup.
2. Move site-specific database information like IP address from the database into the new Member.
3. Update the Member state.

When the Backup is configured, the Alternate performs the following actions:
1. Determine next Backup to select, if Backup should fail.

Elective Failover

This section details the methods and algorithms used to remove a member of an HA Set from service in an orderly way.

Depart Primary

When the Primary is removed, the Primary performs the following actions:
1. Quiesce all Management requests involving the Primary.
2. Stop all long running processes on the Primary such as reconstruction or format and any other internal IO.
3. Quiesce the FC Ports on the Primary. This should rundown all the host IO.
4. Make the FC Ports go offline.
5. Unexport all vLUNs.
6. Disable all Virtual Services.
7. Deactivate the JCP.
8. Update the Member state.

When the Primary is removed, the Backup performs the following actions:
1. Switch the JCP to Active mode
2. Enable all Virtual Services
3. Select a new Backup
   a. If no other Backup exist generate "Failover Disabled"
4. Update Member state When the Primary is removed, the Alternate performs the following actions:
1. Reconfigure for Backup, if selected
   a. Activate the JCP in Standby mode
2. Generate "Configured for Backup"
3. Update the Member state Depart Backup When the Backup is removed, the Primary performs the following actions:
1. Instruct JCP that standby database is failed
2. Select new Backup
   a. If no other Backup exist generate "Failover Disabled"

When the Backup is removed, the Backup performs the following actions:
1. Quiesce all Management requests involving the Backup.
2. Stop all long running processes on the Backup such as reconstruction or format and any other internal IO.
3. Quiesce the FC Ports on the Backup. This should rundown all the host IO.
4. Make the FC Ports go offline.
5. Unexport all vLUNs.
6. Deactivate the JCP.
7. Update the Member state.

When the Backup is removed, the Alternate performs the following actions:
1. Reconfigure for Backup, if selected
   a. Activate the JCP in Standby mode
2. Generate "Configured for Backup"
3. Update the Member state Depart Alternate When the Alternate is removed, the Primary performs the following actions:
1. No action necessary When the Alternate is removed, the Backup performs the following actions:
1. Stop Replicating to the failed Alternate When the Alternate is removed, the Alternate performs the following actions:
1. Quiesce all Management requests involving the Alternate.
2. Stop all long running processes such as reconstruction or format and any other internal IO involving the Alternate.
3. Quiesce the FC Ports on the Alternate. This should rundown all the host IO.
4. Make the FC Ports go offline.
5. Unexport all vLUNs.
6. Deactivate the JCP.
7. Update the Member state.

Fail-Stop Policy

In general, the number of persistent faults a HA Set can tolerant is n−1, where n is the number of members in the HA Set. In the event of n failures, the HA Set can no longer be trusted to operate correctly. The policy should be to fail, then stop.

In a 2-Way HA Set, if the Primary VSX fails, the Backup VSX takes over control of the configuration. Should that new Primary VSX then fail, the redundancy limit is exceeded. What constitutes a VSX failure is subject to Error Analysis. Some ideas are mentioned in.

Fail-Stop processing will partially depend on the exact nature of the error and what capabilities remain on the VSX. The following goals should serve as guidelines when considering possible recovery actions:
1. The first responsibility is to the Host. The external interfaces should be put offline. Check conditions should be reported on all outstanding IO and any new IO requests.
2. The database should be committed to disk. Transactions in progress should be rolled back. Changes to the database should be prevented.
3. All traces and logs should be committed to permanent storage
4. The GUI should reflect a fatal condition.

IO Path Failover

As stated previously, failover is the recovery action taken when a redundant component is removed from service. The previous section discussed failover between VSXs, and to some extent, VSCs. This section will present failover between Line Cards, Storage Processor, FC ASICs and FC Ports.

Technically speaking, failover doesn't really occur between Line Cards, SPs, or ASICs directly. But, it occurs indirectly, through the IO requests that execute using the ports associated with these components. Each of these components can be viewed as a collection of (i.e., one or more) ports. Because the port is the "common denominator", LC failover, SP failover, FC ASIC failover, and FC port failover can all be viewed in the same way; one or more ports failing-over. It is the IO requests that fail-over using some multi-port policy, not the components. This kind of failover is sometimes called multi-pathing.

There are two basic types of multi-pathing; Active-Passive and Active-Active. Active-Passive multi-pathing requires the initiator to use only one path to the storage device at any one time. Active-Passive multi-pathing is sometimes referred to as Preferred Path. Active-Active multi-pathing doesn't restrict the initiator in any way. The initiator can send simultaneous IO requests using either path to the storage device.

Using multi-pathing, it is not necessary to fail the entire VSX when a Line Card, Storage Processor, FC ASIC, or FC Port is removed from service. In fact, it is highly undesirable to do so. For example, why would the entire VSX failover just because a cable has been removed between the VSX and a downstream device?

In general, to support multi-pathing all that is required is the following:

1. The initiator must know about IO Path groups to storage devices.
   a. This could be done through dynamic discovery.
   b. This could also be done with a user-supplied static table.
2. The initiator must be able to detect path errors.
3. The initiator must be able to deactivate the failed path, activate the redundant path, and re-issue the IO requests to the newly activated path even if it requires using Vendor-unique commands to activate the Passive path.
4. The initiator should monitor the failed path and reintegrate it when it gets repaired.

In a VSX the initiator can be internal or external. When a port fails the main task at hand is for the VSX software to inform the initiator of the path failure.

Path Failures

LC, SP, FC ASIC, and FC Port failures can be handled using the following algorithms.

Algorithm 1: Upstream port failure algorithm:
1. Put the port offline, if possible
2. If not possible, re-nit the port
3. If re-nit doesn't work, reset the port.

Algorithm 2: Downstream port failure algorithm:
1. Abort any internal IO to any devices attached to the failed port. Services initiating internal IO should reissue the IO request on the alternate path.
2. Set CHECK CONDITION for all affected upstream hLUNs, which have downstream pLUNs attached to the failed port.
3. Put the failed port offline, if possible.

When an ASIC fails:
1. For each upstream port on ASIC do:
   a. Perform Algorithm 1
2. For each downstream port on the ASIC do:
   a. Perform Algorithm 2

When an SP fails:
2. For each upstream port on SP do:
   a. Perform Algorithm 1
3. For each downstream port on the SP do:
   a. Perform Algorithm 2

When a Line Card fails:
4. For each SP on LC do:
   a. For each upstream port on the SP do:
      i. Perform Algorithm 1
   b. For each downstream port on the SP do:
      i. Perform Algorithm 2

FIGS. 33-35 illustrate various IO Path failover scenarios.

What is claimed is:

1. A method of operating a storage server, the method comprising:
   communicating data with a host computer on a storage area network;
   communicating data with a storage device on a storage area network on behalf of the host computer;
   defining a failover set to include a plurality of members, each member representing at least one resource on the storage area network, wherein a first member of the failover set is designated to provide a service provided by a second member of the failover set in the event of a failure of the second member; and
   implementing policies to control run-time fault tolerance behavior of the members of the failover set including fault characterization detection, member restart and re-integration, and policies to control a member failure limit exceeded condition.

2. A method as recited in claim 1, further comprising repeating said defining a failover set, to define a plurality of different failover sets, each of which includes a plurality of members, each member including a resource on the storage area network.

3. A method as recited in claim 1, wherein the failover set includes as a member a resource which is internal to the storage server.

4. A method as recited in claim 1, wherein the failover set includes as a member a resource which is external to the storage server.

5. A method as recited in claim 1, wherein the failover set includes as members a resource which is internal to the storage server and a resource which is external to the storage server.

6. A method as recited in claim 1, wherein the failover set includes as a member another failover set that is defined to include a plurality of members.

7. A method as recited in claim 1, wherein the failover set includes as a member a hierarchy of devices.

8. A method as recited in claim 1; further comprising:
   enabling the failover set to be defined so that a member of the failover set can be any of:
   an entire chassis-based device;
   a component within a chassis-based device; or
   a plurality of chassis-based devices.

9. A method of supporting failover of networked storage systems, the method comprising:
   identifying a plurality of processing resources on a storage area network as member candidates for a failover set;
   creating the failover set so that the failover set includes at least two of the member candidates as members;
   storing a configuration for each member candidate in the failover set;
   designating one of the members in the failover set as a primary, designating another one of the members in the failover set as a secondary, and designating each remaining member in the failover set, if any, as an alternate; and
   implementing policies to control run-time fault tolerance behavior of the members of the failover set including fault characterization detection, member restart and re-integration, and policies to control a member failure limit exceeded condition.

10. A method as recited in claim 9, further comprising:
    enabling creation of the failover set, such that a member of the failover set can be specified to be any one of:
    an entire chassis-based device;
    a component within a chassis-based device; or
    a plurality of chassis-based devices.

11. A method as recited in claim 9, further comprising performing said method to: define a plurality of different failover sets including resources on the storage area network; and implement policies to control run-time fault tolerance behavior of members of the plurality of failover sets.

12. A method as recited in claim 9, further comprising:
    establishing a homogeneous environment distributed across a plurality of components at different hierarchical levels on the storage area network.

13. A method as recited in claim 12, wherein the plurality of components include the storage server, a processor within a storage server, and a card within the storage server.

14. A method as recited in claim 9, further comprising performing said method to support failover between components within a single chassis.

15. A method as recited in claim 6, further comprising performing said method to support failover between components within a single stack-based product.

16. A method as recited in claim 6, further comprising performing said method to support failover between two or more separate chassis-based products.

17. A method as recited in claim 6, further comprising performing said method to support failover between two or more separate stack-based products.

18. A method as recited in claim 6, further comprising load balancing user configuration and management requests across all of the member candidates.

19. A method as recited in claim 6, further comprising:
providing a multi-path programming for attached host and storage devices, which is load balanced across all of the member candidates, and which comprises:
a port failover policy which is used to intelligently match server storage requests to compatible storage devices comprising;
an active-active policy where all paths to an exported virtual device can transfer commands and data simultaneously; and
an active-passive policy where only one path to the exported virtual device can transfer commands and data at a time.

20. A storage server comprising:
a plurality of storage processors to communicate data with a plurality of host computers and a plurality of storage devices in a storage area network;
a switching circuit connecting the plurality of storage processors;
first logic to create a failover set comprising at least one device;
second logic to detect a failure of a component belonging to the failure set; and
third logic to select an alternate component which belongs to the first failure set to replace a service provided by the first component; and
fourth logic to define a plurality of different failover sets that each include resources on the storage area network and a policy manager that implements policies to control run-time fault tolerance behavior of the members of the failover set including fault characterization detection, member restart and re-integration, and policies to control a member failure limit exceeded condition.

21. A storage system as recited in claim 20, wherein the failover set includes a resource internal to the storage server.

22. A storage system as recited in claim 20, wherein the failover set includes a resource external to the storage server.

23. A storage system as recited in claim 20, wherein the failover set includes a resource internal to the storage server and a resource external to storage server.

24. A storage system as recited in claim 20, wherein the failover set includes as a member another defined failover set.

25. A storage system as recited in claim 20, wherein the failover set includes as a member a defined hierarchy of devices.

26. A storage system as recited in claim 20, further comprising:
logic to enable creation of a failover set, such that each member of the failover set can be specified to be any one of:
an entire chassis-based device;
a component within a chassis-based device; or
a hierarchy of chassis-based devices.

27. A storage system comprising:
a processor; and
memory coupled to the processor and storing software which, when executed by the processor, causes the system to support failover of storage systems on a network, the software including:
a services framework to provide a single homogeneous environment distributed across a plurality of processing resources located at different hierarchical levels in the network;
a set of configuration and management software that executes on top of the services framework, including:
a discovery service to identify resources on the network as member candidates for failover sets; and
a failover service to organize the member candidates into a plurality of failover sets, including a policy manager to provide policies for run-time member behavior including fault characterization detection, corrective action during failover, member restart and re-integration, and policies to control a member failure limit exceeded condition.

28. A storage system as recited in claim 27, wherein the plurality of failover sets include a single composition, a hierarchical composition and an n-way composition.

29. A storage server as recited in claim 20, wherein said plurality of processing resources located at different hierarchical levels in the network include a storage server, a processor within the storage server, and a card within the storage server.

* * * * *